US012605297B2

(12) United States Patent
Yoo

(10) Patent No.: US 12,605,297 B2
(45) Date of Patent: Apr. 21, 2026

(54) STRETCHING APPARATUS AND METHOD OF ADJUSTING VERTICAL LEVEL OF LEVEL ADJUSTMENT MODULE IN STRETCHING APPARATUS

(71) Applicant: DRAX INC., Anyang-si (KR)

(72) Inventor: Seon Kyung Yoo, Seoul (KR)

(73) Assignee: DRAX INC., Anyang-si (KR)

( * ) Notice: Subject to any disclaimer, the term of this patent is extended or adjusted under 35 U.S.C. 154(b) by 48 days.

(21) Appl. No.: 18/587,178

(22) Filed: Feb. 26, 2024

(65) Prior Publication Data

US 2024/0285459 A1 Aug. 29, 2024

(30) Foreign Application Priority Data

Feb. 27, 2023 (KR) ........................ 10-2023-0026112
Dec. 5, 2023 (KR) ........................ 10-2023-0174677

(51) Int. Cl.
*A61H 1/02* (2006.01)
*A63B 23/00* (2006.01)

(52) U.S. Cl.
CPC ............... *A61H 1/02* (2013.01); *A63B 23/00* (2013.01); *A63B 2023/006* (2013.01); *A63B 2225/093* (2013.01)

(58) Field of Classification Search
CPC .............. A61H 1/02; A61H 2201/0192; A61H 2201/1261; A61H 2201/1284;
(Continued)

(56) References Cited

U.S. PATENT DOCUMENTS 3,675,646 A * 7/1972 Corcoran ............. A61G 15/007 D24/188
3,768,464 A * 10/1973 Greissing ............. A61H 1/0218 602/32

(Continued)

FOREIGN PATENT DOCUMENTS

JP 2020-116131 A 8/2020
KR 10-2022-0098929 A 7/2022

OTHER PUBLICATIONS

Extended European Search Report issued Jul. 30, 2024 in Application No. 24160023.8.

(Continued)

*Primary Examiner* — Garrett K Atkinson
(74) *Attorney, Agent, or Firm* — Sughrue Mion, PLLC

(57) ABSTRACT

A stretching apparatus includes a body frame including a pair of support frames extending in parallel in upward and downward directions at a certain interval and a connection frame connecting the pair of support frames, an upward and downward adjustment module that is movable in upward and downward directions to adjust a level thereof in the upward and downward directions between the pair of support frames and rotatable within a certain angle range based on the upward and downward directions, and a level support fixed to an inner side of each of the pair of support frames and configured to allow upward and downward movements of the upward and downward adjustment module or limit a downward movement of the upward and downward adjustment module depending on a rotation angle of the upward and downward adjustment module.

14 Claims, 36 Drawing Sheets

(58) Field of Classification Search

CPC ...... A61H 2201/1635; A61H 2201/164; A61H 2201/1664; A61H 2201/5043; A61H 2201/5097; A61H 1/0237; A61H 1/0274; A61H 1/0292; A63B 23/00; A63B 2023/006; A63B 2225/093; A63B 21/4027; A63B 21/4035; A63B 21/4045; A63B 71/0622; A63B 2225/09

See application file for complete search history.

(56) References Cited

U.S. PATENT DOCUMENTS

| | | | | |
|---|---|---|---|---|
| 4,688,557 | A * | 8/1987 | Bradstreet | A61H 1/0218 606/241 |
| 5,529,560 | A * | 6/1996 | Davies, III | A61H 1/0244 601/24 |
| 5,637,079 | A * | 6/1997 | Miller | A61H 1/0218 606/241 |
| 5,997,450 | A * | 12/1999 | Wilkinson | A63B 23/0211 601/24 |
| 6,547,704 | B2 * | 4/2003 | Parrillo | A63B 23/035 482/94 |
| 6,835,170 | B2 * | 12/2004 | Ogle | A61H 1/0292 482/145 |
| 7,087,005 | B2 * | 8/2006 | Rouillard | A63B 23/0233 482/142 |
| 7,163,492 | B1 * | 1/2007 | Sotiriades | A61H 1/0237 601/5 |
| 7,648,473 | B1 * | 1/2010 | Peruvingal | A61F 5/3776 601/24 |
| 8,556,787 | B2 * | 10/2013 | Leier | A61H 1/0222 482/144 |
| 9,974,999 | B2 * | 5/2018 | Land | A63B 21/00047 |
| 10,035,039 | B1 * | 7/2018 | Jui | A63B 23/1218 |
| 10,500,119 | B2 * | 12/2019 | Berg | A63B 23/1209 |
| 10,517,787 | B1 * | 12/2019 | Hyams | A61H 1/0237 |
| 11,040,240 | B1 * | 6/2021 | Powers | A63B 21/4039 |
| 2001/0034289 | A1 * | 10/2001 | Parrillo | A63B 23/035 482/94 |
| 2005/0054499 | A1 * | 3/2005 | Davies | A61H 1/0229 482/131 |
| 2007/0225136 | A1 * | 9/2007 | Roman | A63B 21/068 482/142 |
| 2010/0160127 | A1 * | 6/2010 | Bracci | A61H 1/0292 482/143 |
| 2010/0234192 | A1 * | 9/2010 | Oller, Jr. | A63B 21/4047 482/131 |
| 2013/0029812 | A1 * | 1/2013 | Teeter | A61H 1/0292 482/126 |
| 2013/0197403 | A1 * | 8/2013 | Sevy | A63B 23/0494 601/5 |
| 2016/0324712 | A1 * | 11/2016 | Carlin | A61H 1/0229 |
| 2016/0331622 | A1 * | 11/2016 | Haene | A61H 1/0229 |
| 2017/0065477 | A1 * | 3/2017 | Jagger | A61N 5/0613 |
| 2017/0266077 | A1 * | 9/2017 | Mackin | A61G 13/1235 |
| 2020/0376322 | A1 * | 12/2020 | Alvarez | A63B 21/4034 |
| 2022/0096307 | A1 * | 3/2022 | Doran | A61H 1/0266 |
| 2022/0241129 | A1 * | 8/2022 | Berg | A63B 23/1209 |
| 2024/0277549 | A1 * | 8/2024 | Sawyers | A61H 1/0281 |
| 2024/0285460 | A1 * | 8/2024 | Yoo | A61H 1/0244 |
| 2024/0316396 | A1 * | 9/2024 | Pineda, III | A63B 21/16 |

OTHER PUBLICATIONS

Communication issued Apr. 29, 2025 in Korean Patent Application No. 10-2023-0174677.

* cited by examiner

STRETCHING APPARATUS AND METHOD OF ADJUSTING VERTICAL LEVEL OF LEVEL ADJUSTMENT MODULE IN STRETCHING APPARATUS

CROSS-REFERENCE TO RELATED APPLICATION

This application is based on and claims priority under 35 U.S.C. § 119 to Korean Patent Application Nos. 10-2023-0026112, filed on Feb. 27, 2023 and 10-2023-0174677, filed on Dec. 5, 2023, in the Korean Intellectual Property Office, the disclosures of which are incorporated by reference herein in their entireties.

BACKGROUND

1. Field

The disclosure relates to a stretching apparatus for stretching.

2. Description of the Related Art

The joints of the human body have a normal movable range. However, due to lack of exercise, injury, or aging, the movable range of the joints may decrease. When the movable range of the joints decreases, a risk of injuries of the joints may be increased and a motion function may be lowered.

Stretching or stretching movement may be performed to prevent such reduction in a movable range of the joints. Stretching is an exercise that stretches the muscles, joints or ligaments of the body. Through stretching, the movable range of the joints may be increased or the flexibility of the body may be maintained or improved.

SUMMARY

Provided is a stretching apparatus including a stretching member with an adjustable level to be suitable for individual physical characteristics and exercise purpose.

Additional aspects will be set forth in part in the description which follows and, in part, will be apparent from the description, or may be learned by practice of the presented embodiments of the disclosure.

According to an aspect of the disclosure, a stretching apparatus includes a body frame including a pair of support frames extending in parallel in upward and downward directions at a certain interval and a connection frame connecting the pair of support frames, an upward and downward adjustment module that is movable in upward and downward directions to adjust a level thereof in the upward and downward directions between the pair of support frames and rotatable within a certain angle range based on the upward and downward directions, and a level support fixed to an inner side of each of the pair of support frames and configured to allow upward and downward movements of the upward and downward adjustment module or limit a downward movement of the upward and downward adjustment module depending on a rotation angle of the upward and downward adjustment module.

The upward and downward adjustment module may have a fixed state in which the upward and downward adjustment module has a first rotation angle and a downward movement is limited by the level support, and a movable state in which the upward and downward adjustment has a second rotation angle different from the first rotation angle and is movable downward based on the level support.

The level support may include a guide slit extending in the upward and downward directions, and the upward and downward adjustment module may include a stretching member moving in the upward and downward directions and configured to be in contact with a part of a body of a user, a first bearing located at each of both ends of the stretching member to be inserted into the guide slit, and a second bearing located at each of the both ends of the stretching member to be inserted into the guide slit and configured to rotate around the first bearing as an axis within the guide slit when the upward and downward adjustment module rotates.

One of the stretching member and the level support may include a locking protrusion supported in a locking manner and configured to fix a level of the upward and downward adjustment module, and another one of the stretching member and the level support may include a level adjustment groove configured to support the locking protrusion.

The second bearing may be located below the first bearing, and a diameter of the second bearing may be less than a diameter of the first bearing.

The guide slit may include a guide surface extending in the upward and downward directions, the guide surface may include a first guide surface and a second guide surface facing the first guide surface, and a distance between the first guide surface and the second guide surface may be greater than a diameter of the first bearing.

A movable range in which the upward and downward adjustment module is rotatable may be defined based on rotation of the second bearing around the first bearing as an axis within the guide slit when the upward and downward adjustment module rotates.

The movable range may be defined by an angle between a straight line connecting an axis of the first bearing and an axis of the second bearing when the locking protrusion is fixed to the level adjustment groove and the first bearing is in contact with the first guide surface, and a straight line connecting the axis of the first bearing and the axis of the second bearing when the first bearing is in contact with the second guide surface and the second bearing is in contact with the first guide surface, and the movable range may be about 1° to about 15°.

The upward and downward adjustment module may become in a movable state in which the the upward and downward adjustment module is movable in the upward and downward directions when the first bearing is in contact with the second guide surface and the second bearing is in contact with the first guide surface, and become in a fixed state in which the upward and downward adjustment module is fixed when the first bearing is in contact with the first guide surface and the locking protrusion is fixed to the level adjustment groove.

The first bearing may have one side at which a first flange is provided to prevent the first bearing from being separated from the guide slit when the upward and downward adjustment module is in the movable state, and a diameter of the first flange may be greater than a distance between the first guide surface and the second guide surface.

The level support may include a contact surface located to face the upward and downward adjustment module, the contact surface may include a first contact surface connected to the first guide surface and a second contact surface connected to the second guide surface, and the level support may include a first inclination surface provided between the first contact surface and the first guide surface to prevent the first flange from being in contact with the first contact surface when the upward and downward adjustment module is in the movable state.

The second bearing may have one side at which a second flange is provided to prevent the second bearing from being separated from the guide slit when the upward and downward adjustment module is in the movable state, and a diameter of the second flange may be greater than a distance between the first guide surface and the second guide surface.

To prevent the second flange from being in contact with the second contact surface when the upward and downward adjustment module is in the movable state, the second flange may have a second inclination surface in a direction away from the guide slit.

The level adjustment groove may include a plurality of recesses configured to accommodate the locking protrusion, and each of the plurality of recesses may be inclined downward.

According to another aspect of the disclosure, a method of adjusting a level of an upward and downward adjustment module in upward and downward directions in a stretching apparatus including an upward and downward adjustment module that is movable in upward and downward directions to adjust a level thereof in the upward and downward directions between a pair of support frames and rotatable within a certain angle range based on the upward and downward directions, and a level support having a guide slit accommodating a first bearing located at each of both ends of the upward and downward adjustment module and a level adjustment groove configured to support a locking protrusion included in the upward and downward adjustment module includes converting the upward and downward adjustment module from a fixed state to a movable state by rotating the upward and downward adjustment module around the first bearing to separate the locking protrusion from the level adjustment groove, moving the upward and downward adjustment module to an upper side or a lower side of the pair of support frames by moving the first bearing within the guide slit of the level support, and converting the upward and downward adjustment module from a movable state to a fixed state by rotating the upward and downward adjustment module around the first bearing to locate the locking protrusion on the level adjustment groove.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
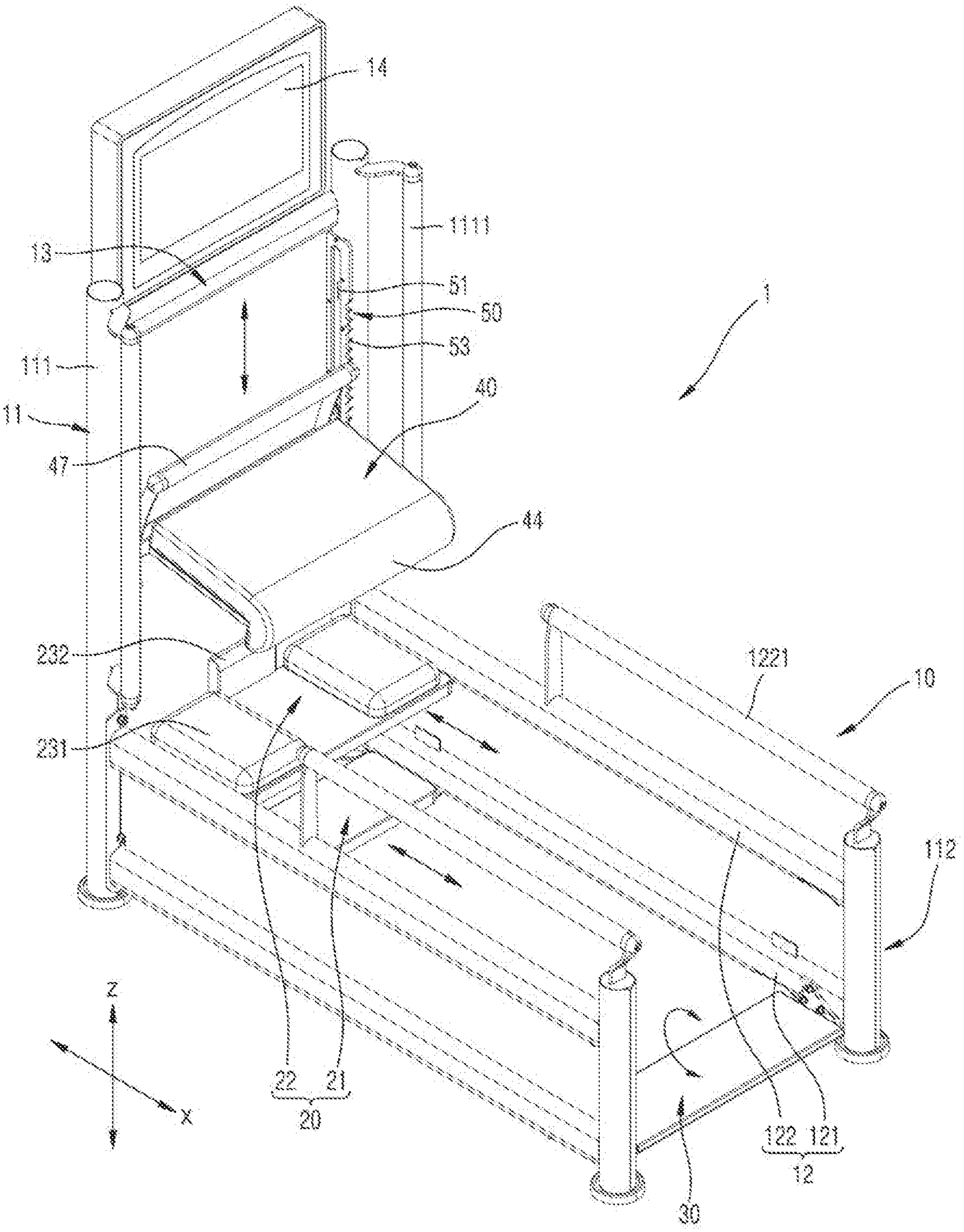
FIG. 1 is a perspective view of a stretching apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, embodiments are described in detail for those of ordinary skill in the art to easily implement with reference to the accompanying drawings.

Figure 2:
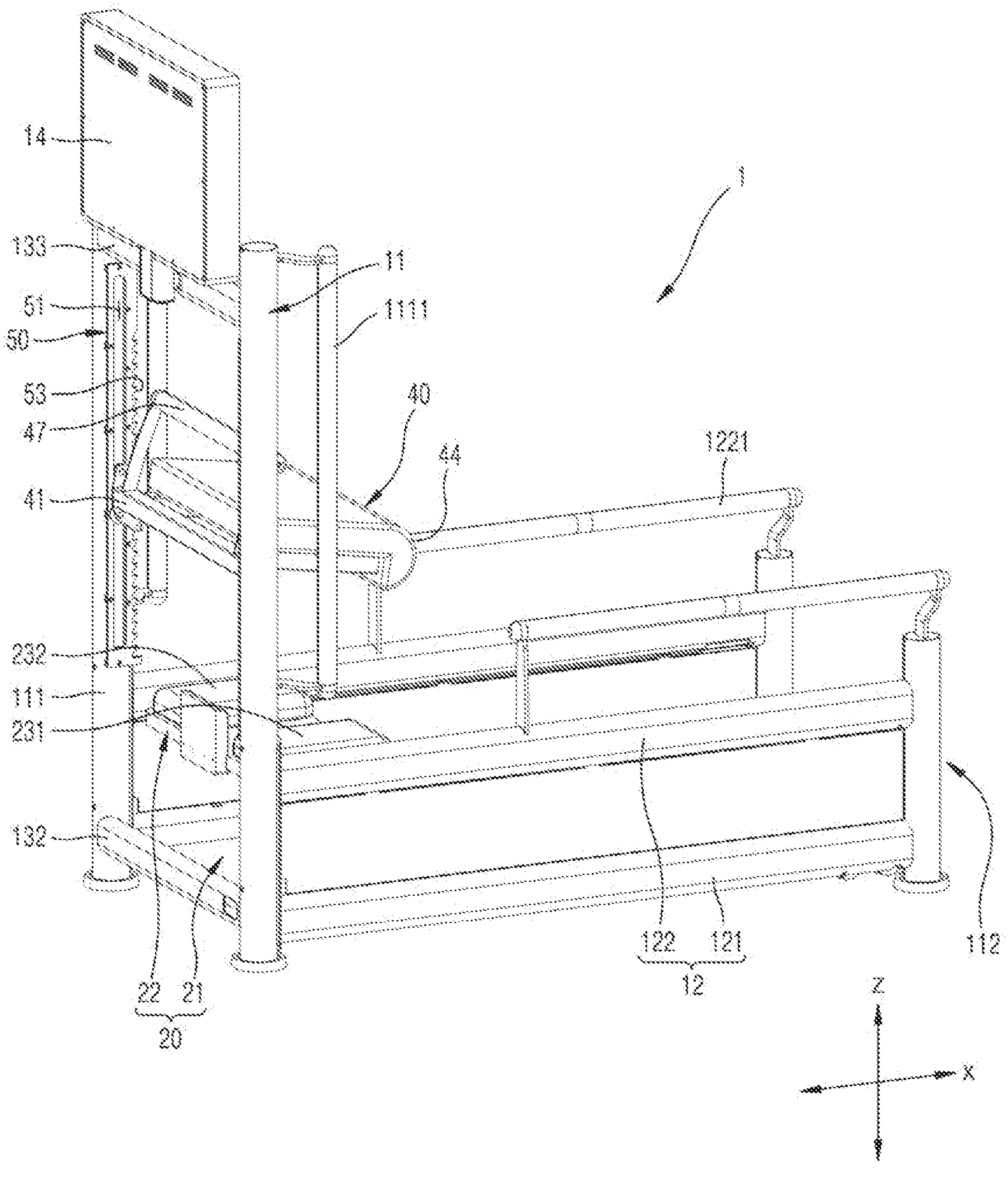
FIG. 2 is a perspective view of a stretching apparatus viewed at another angle, according to an embodiment.
Figure 3:
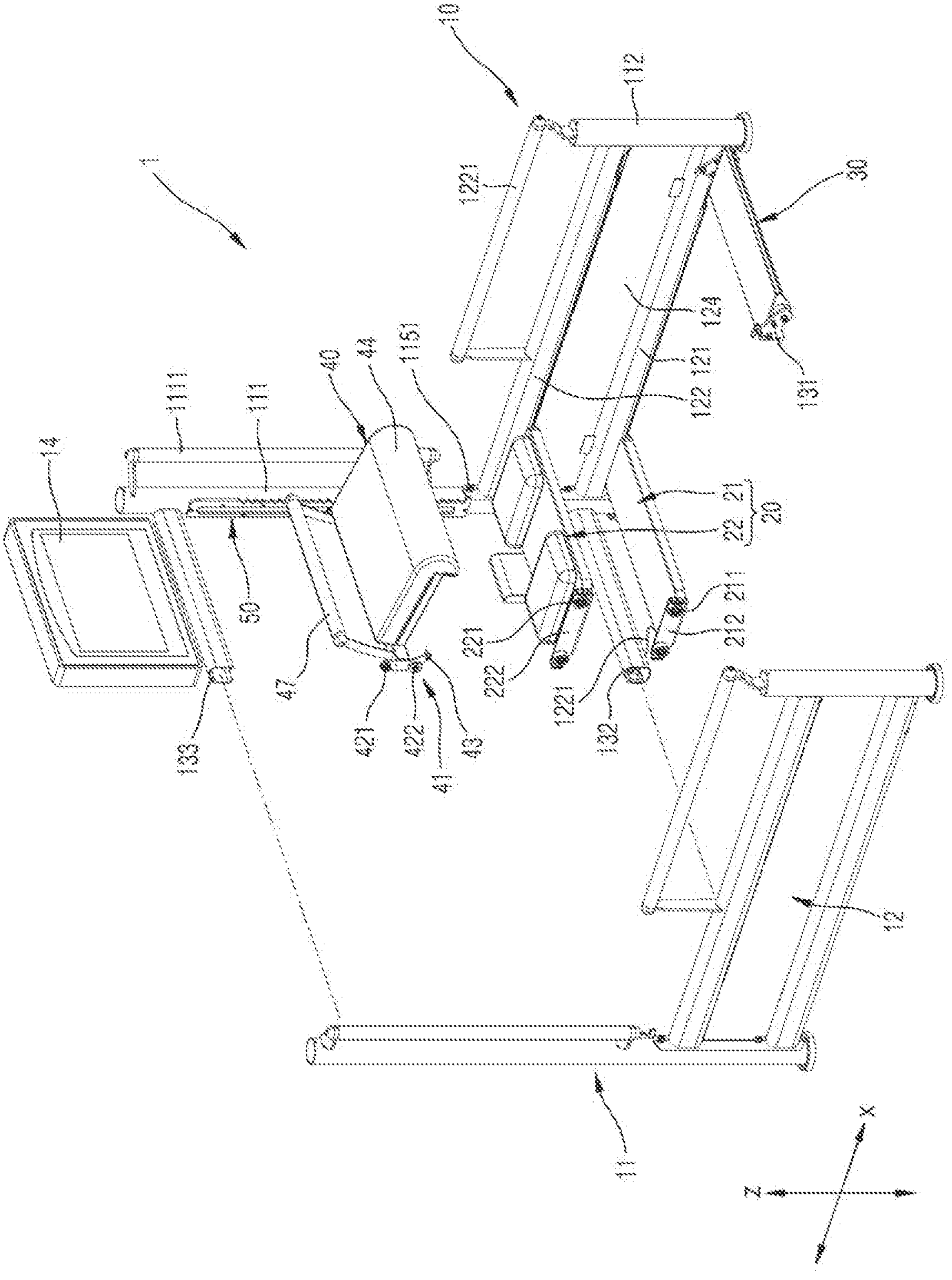
FIG. 3 is an exploded perspective view of a stretching apparatus according to an embodiment.

FIG. 1 is a perspective view of a stretching apparatus 1 according to an embodiment. FIG. 2 is a perspective view of the stretching apparatus 1 viewed at another angle, according to an embodiment. FIG. 3 is an exploded perspective view of the stretching apparatus 1 according to an embodiment.

Referring to FIGS. 1 to 3, the stretching apparatus 1 according to an embodiment may include a body frame 10 and a plurality of stretching members installed in the body frame 10. The body frame 10 may support a self load of the stretching apparatus 1. The plurality of stretching members may include a first stretching member 20, a second stretching member, and a third stretching member, which have different operating characteristics.

The first stretching member 20 according to an embodiment may be provided to slide in forward and backward directions X with respect to the body frame 10. The first stretching member 20 may be supported by the body frame 10 to be moved in the forward and backward directions X. The first stretching member 20 may have a first moving path when moving in the forward and backward directions X. The first moving path may be a straight path that extends in the forward and backward directions X. The first stretching member 20 moves in the forward and backward directions X and has a foremost position and a rearmost position. The first stretching member 20 may be located in the body frame 10 to slide between the foremost position and the rearmost position along the first moving path. The first stretching member 20 may include a plurality of stretching members. For example, the first stretching member 20 may include a 1st-1 stretching member 21 and a 1st-2 stretching member 22 that are arranged in parallel with each other.

The 1st-1 stretching member 21 according to an embodiment may be provided to slide on the body frame 10 in the forward and backward directions X. The 1st-2 stretching member 22 may be located apart from an upper side of the 1st-1 stretching member 21 and may be provided to slide in the forward and backward directions X.

The second stretching member 30 according to an embodiment may be provided such that an angle of the second stretching member 30 is adjusted with respect to the body frame 10. For example, the second stretching member 30 may be provided to rotate around a certain rotation shaft with respect to the body frame 10.

The second stretching member 30 may have a second moving path when the angle of the second stretching member 30 is controlled. The second moving path may be a path in which a rear end of the second stretching member passes when the second stretching member 30 rotates around the rotation shaft.

The second stretching member 30 may be inclined forward. The second stretching member 30 may be a step configured to allow a user to step thereon. However, the configuration of the second stretching member 30 is not limited to the above description.

A third stretching member 40 according to an embodiment may be provided such that a level of the third stretching member 40 is adjusted with respect to the body frame 10. The third stretching member 40 may be configured to adjust the level of the third stretching member 40 in upward and downward directions Z within the body frame 10. The position of the third stretching member 40 may be adjusted in the upward and downward directions Z with respect to the body frame 10.

The third stretching member 40 may have a third moving path along which the third stretching member 40 moves when the level of the third stretching member 40 is adjusted. The third moving path may be the maximum path in which the third stretching member 40 is movable in the upward and downward directions Z. The third stretching member 40 may be an upward and downward adjustment module 40.

The body frame 10 according to an embodiment may include a plurality of support frames 11 and a plurality of horizontal frames 12 supported by the plurality of support frames 11. The body frame 10 may be a structure configured by assembling the plurality of support frames 11 and the plurality of horizontal frames 12 as separate components, but the body frame 10 is not limited thereto and may be configured as one body.

The plurality of support frames 11 may extend in parallel with each other in the upward and downward directions Z at a certain interval. One end of each of the plurality of support frames 11 may be supported by a bottom surface and the plurality of support frames 11 may extend in the upward and downward directions Z. A cross sectional shape of each of the support frames 11 may be circular. However, a cross-sectional shape of the support frame 11 is not limited thereto and may be polygonal or oval.

The plurality of support frames 11 may include a pair of first support frames 111 and a pair of second support frames 112 that are located in front of the pair of first support frames 111 to be apart therefrom. The pair of first support frames 111 may be arranged in parallel with each other at a rear side of the stretching apparatus 1. Each of the pair of first support frames 111 may have a first support level. The pair of pair of second support frames 112 may be arranged in parallel with each other at a front side of the stretching apparatus 1. Each of the pair of second support frames 112 may have a second support level. The first support level may be greater than the second support level. For example, the first support level may be equal to or more than 1.5 times the second support level. For example, the first support level may be about 2 times to about 3 times the second support level. The pair of first support frames 111 may have first handles 1111 extending in the upward and downward directions Z, respectively. However, the arrangement and size of the plurality of support frames 11 is not limited to the above description.

The plurality of horizontal frames 12 may include a pair of first horizontal frames 121 and a pair of second horizontal frames 122. The pair of first horizontal frames 121 may be arranged in parallel with each other in the forward and backward directions X and the pair of second horizontal frames 122 may be arranged in parallel with each other in the forward and backward directions X. The plurality of horizontal frames 12 may have second handles 1221 extending in the forward and backward directions X, respectively.

The first horizontal frames 121 may extend forward in parallel with each other at a certain interval from each of lower ends of the pair of first support frames 111. The second horizontal frames 122 may be apart upward from the first horizontal frames 121 at a certain interval and may extend forward at a certain interval from ends of the first horizontal frames 121, respectively.

The first horizontal frame 121 and the second horizontal frame 122 may be arranged in parallel with each other in the upward and downward directions Z. An extension length of the first horizontal frame 121 and an extension length of the second horizontal frame 122 may be the same. The second horizontal frame 122 may be apart from an upper side of the first horizontal frame 121.

The first horizontal frame 121 and the second horizontal frame 122 may be arranged between the first support frame 111 and the second support frame 112. One end of the first horizontal frame 121 may be supported by the first support frame 111, and the other end of the first horizontal frame 121 may be supported by the second support frame 112. One end of the second horizontal frame 122 may be supported by the first support frame 111, and the other end of the second horizontal frame 122 may be supported by the second support frame 112.

The second stretching member 30 may be located at an end of the first horizontal frame 121. The second stretching member may connect the pair of first horizontal frames 121 to each other at the respective ends of the pair of first horizontal frames 121.

The first horizontal frame 121 and the second horizontal frame 122 may be supported by the first support frame 111 and the second support frame 112, respectively. For example, one end of the first horizontal frame 121 and one end of the second horizontal frame 122 may be fixed to the first support frames 111 by a support plate. The other end of the first horizontal frame 121 and the other end of the second horizontal frame 122 may be directly fixed to the second support frames 112. However, the structure in which the first horizontal frame 121 and the second horizontal frame 122 are respectively supported by the first support frame 111 and the second support frame 112 is not limited thereto and may be changed in various ways.

The body frame 10 may include a connection frame 13. The connection frame 13 may connect a pair of support frames 11 to each other. The connection frame 13 may support the pair of support frames 11 to maintain a certain interval between the pair of support frames 11. The body frame 10 may be a structure in which the plurality of horizontal frames 12, the plurality of support frames 11, and the plurality of connection frames 13 are assembled as separate components but the body frame 10 is not limited thereto and may be one body.

An interval in left and right directions between the plurality of horizontal frames 12 or the plurality of support frames 11 may be maintained by the connection frame 13. For example, the connection frame 13 may include a first connection frame 131, a second connection frame 132 and a third connection frame 133.

The first connection frame 131 may be located between the pair of first horizontal frames 121. For example, the first connection frame 131 may be located at a front side between the pair of first horizontal frames 121. For example, the first connection frame 131 may configure a portion of the second stretching member 30. For example, the first connection frame 131 may provide an axis such that the second stretching member 30 is inclined forward through rotation.

The second connection frame 132 may be located between the pair of first support frames 111. For example, the second connection frame 132 may be located at a lower side between the pair of first support frames 111.

The third connection frame 133 may be located between the pair of first support frames 111. For example, the third connection frame 133 may be located at an upper side between the pair of first support frames 111. A display panel 14 may be located above the third connection frame 133. However, the arrangement and function of the first to third connection frames 133 is not limited to the above description.

Each of the second connection frame 132 and the third connection frame 133 may connect the pair of first support frames 111 to each other such that the pair of first support frames 111 are located in parallel with each other. When the pair of first support frames 111 are located in parallel with each other, the third stretching member 40 may be easily moved up and down between the pair of first support frames 111.

In the stretching apparatus 1 according to an embodiment, the first stretching member 20 may be located between the plurality of horizontal frames 12. For example, the 1st-1 stretching member may be located between the pair of first horizontal frames 121. The 1st-1 stretching member 21 may move in an extension direction of the first horizontal frame 121. The 1st-1 stretching member 21 may move in the forward and backward directions X.

The 1st-2 stretching member 22 may be apart from an upper side of the 1st-1 stretching member 21. The 1st-1 stretching member 21 and 1st-2 stretching member 22 may have a certain interval in the upward and downward directions Z to prevent a user from hitting the 1st-2 stretching member 22 when the user performs stretching using the 1st-1 stretching member 21. For example, an interval in the upward and downward directions Z between the 1st-1 stretching member 21 and the 1st-2 stretching member 22 may be about 15 cm to about 45 cm. However, the interval between the 1st-1 stretching member 21 and the 1st-2 stretching member 22 is not limited to the above description.

The 1st-2 stretching member 22 may be located between the pair of second horizontal frames 122. The 1st-2 stretching member 22 may move in an extension direction of the second horizontal frame 122. The 1st-2 stretching member 22 may move in the forward and backward directions X. A movable distance of the 1st-2 stretching member 22 may be greater than that of the 1st-1 stretching member 21. However, the movable distance of the 1st-1 stretching member 21 is not limited to the above description.

The 1st-2 stretching member 22 may include a pair of pads. The pair of pads may be separated in left and right directions in an upper side of the 1st-2 stretching member 22.

The 1st-2 stretching member 22 may include a footrest provided to support the feet of the user. The user may slide the 1st-2 stretching member 22 in the forward and backward directions X in a state in which the feet of the user is supported by the footrest.

Each of the 1st-1 stretching member 21 and the 1st-2 stretching member 22 may be supported by the body frame 10 to slide in the forward and backward directions X. For example, the 1st-1 stretching member 21 may be supported by the pair of first horizontal frames 121 to move in the forward and backward directions X. For example, the 1st-2 stretching member 22 may be supported by the pair of second horizontal frames 122 to move in the forward and backward directions X. The 1st-1 stretching member 21 may be a first sliding module. The 1st-2 stretching member 22 may be a second sliding module.

Figure 4:
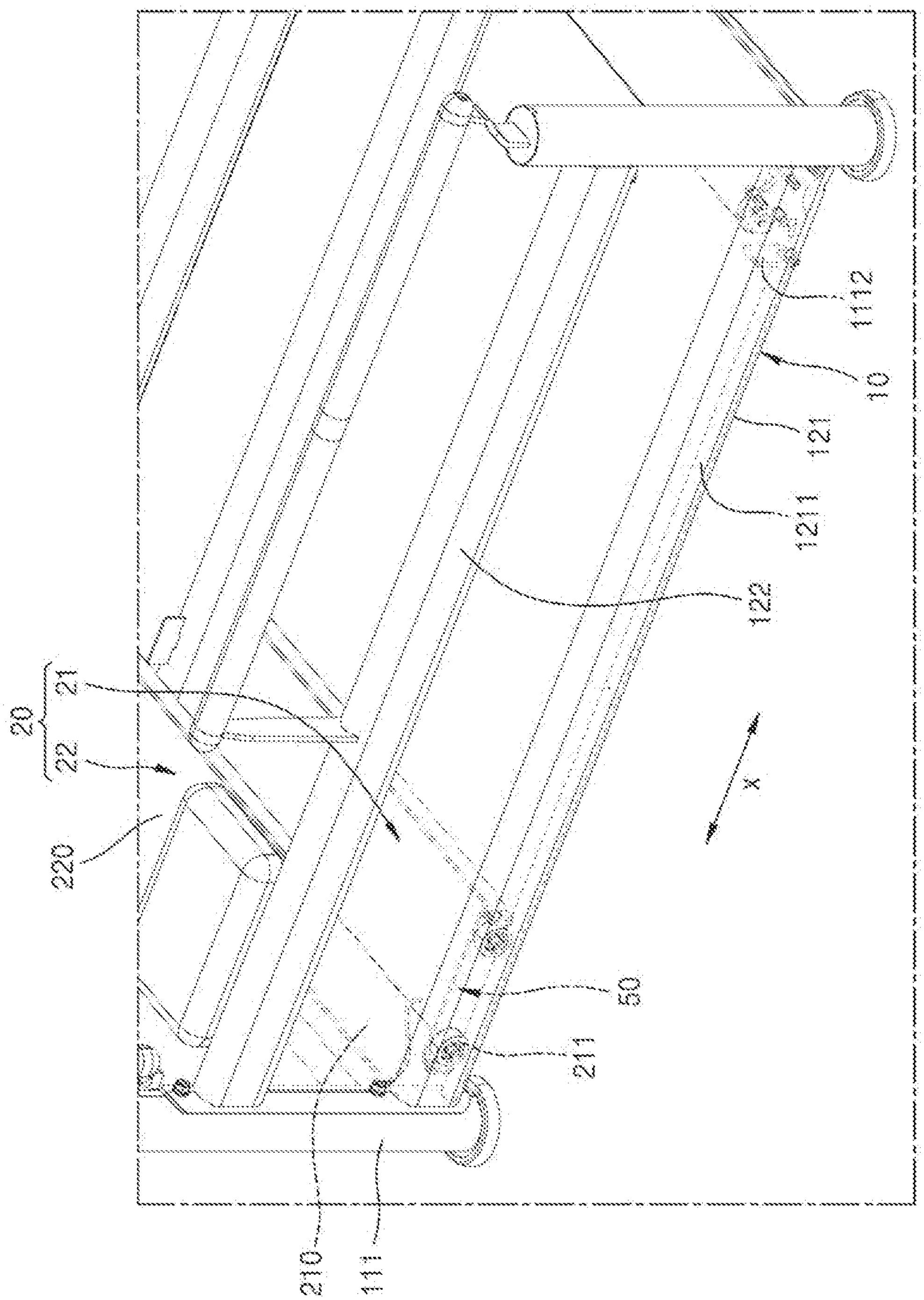
FIG. 4 is an enlarged perspective diagram of a stretching apparatus in terms of a 1st-1 stretching member and a 1st-2 stretching member in the stretching apparatus according to an embodiment.
Figure 5:
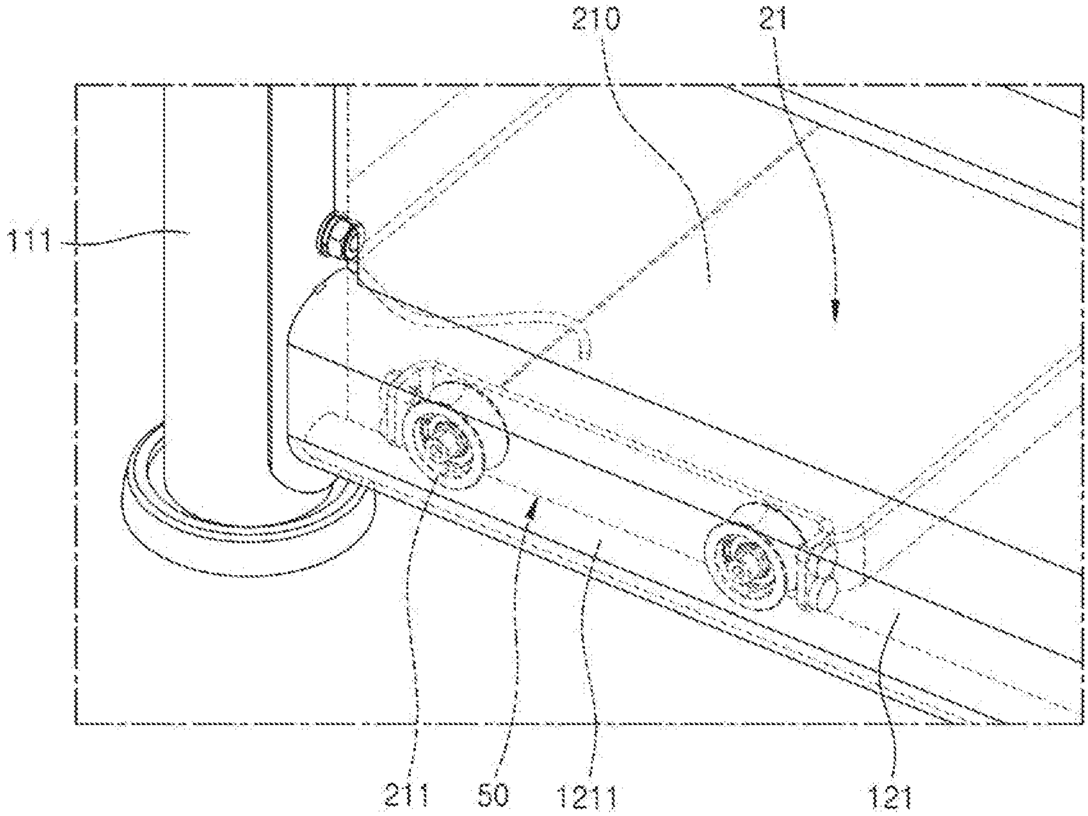
FIG. 5 is an enlarged diagram of a portion of the stretching apparatus of FIG. 4.
Figure 6:
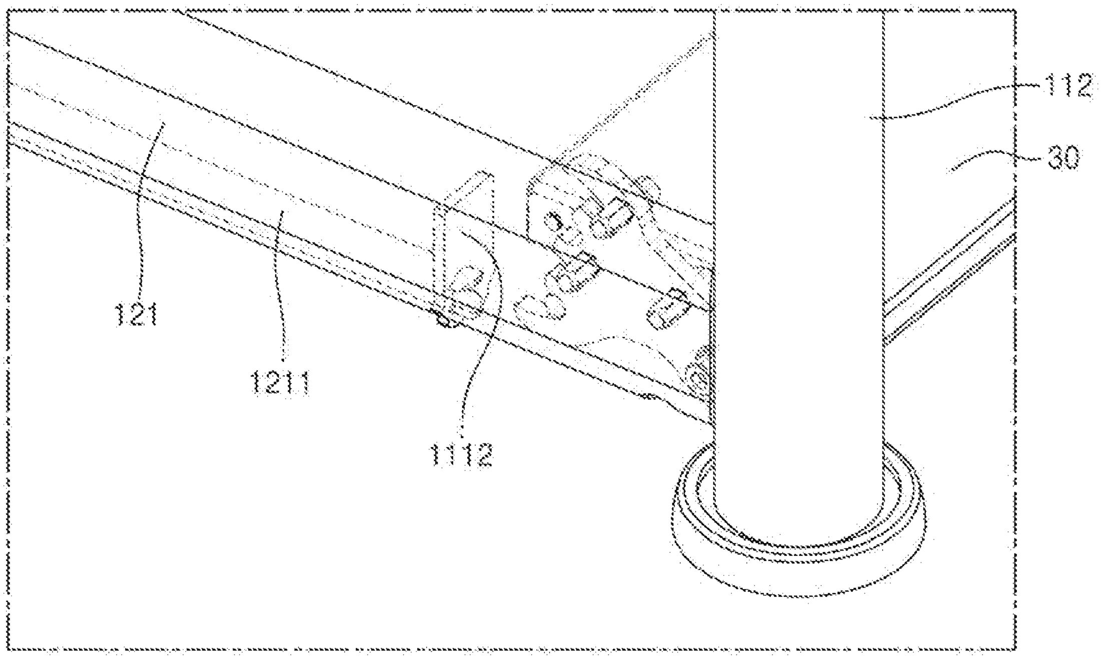
FIG. 6 is an enlarged diagram of another portion of the stretching apparatus of FIG. 4.

FIG. 4 is an enlarged perspective diagram of a stretching apparatus in terms of a 1st-1 stretching member and a 1st-2 stretching member in the stretching apparatus according to an embodiment. FIG. 5 is an enlarged diagram of a portion of the stretching apparatus of FIG. 4. FIG. 6 is an enlarged diagram of another portion of the stretching apparatus of FIG. 4.

Referring to FIGS. 4 to 6, the first horizontal frame 121 may have a first guide rail 1211 for guiding movement in the forward and backward directions X of the 1st-1 stretching member 21. The first guide rail 1211 may extend in the forward and backward directions X. One end of the first guide rail 1211 may be supported by the second support frame 112, and the other end of the first guide rail 1211 may be supported by a first stopper 1112 provided in the first horizontal frame 121.

A first guide wheel 211 may be provided on both ends in left and right directions of the 1st-1 stretching member 21 to move along the first guide rail 1211. The first guide wheel 211 of the first stretching member 20 may be located inside the first horizontal frame 121 and may move in the forward and backward directions X along the first guide rail 1211. A movement distance of the 1st-1 stretching member 21 in a forward direction may be limited by the first stopper 1112. Accordingly, a movement distance of the 1st-1 stretching member 21 in the forward and backward directions X may be less than a length of the first horizontal frame 121.

Figure 7:
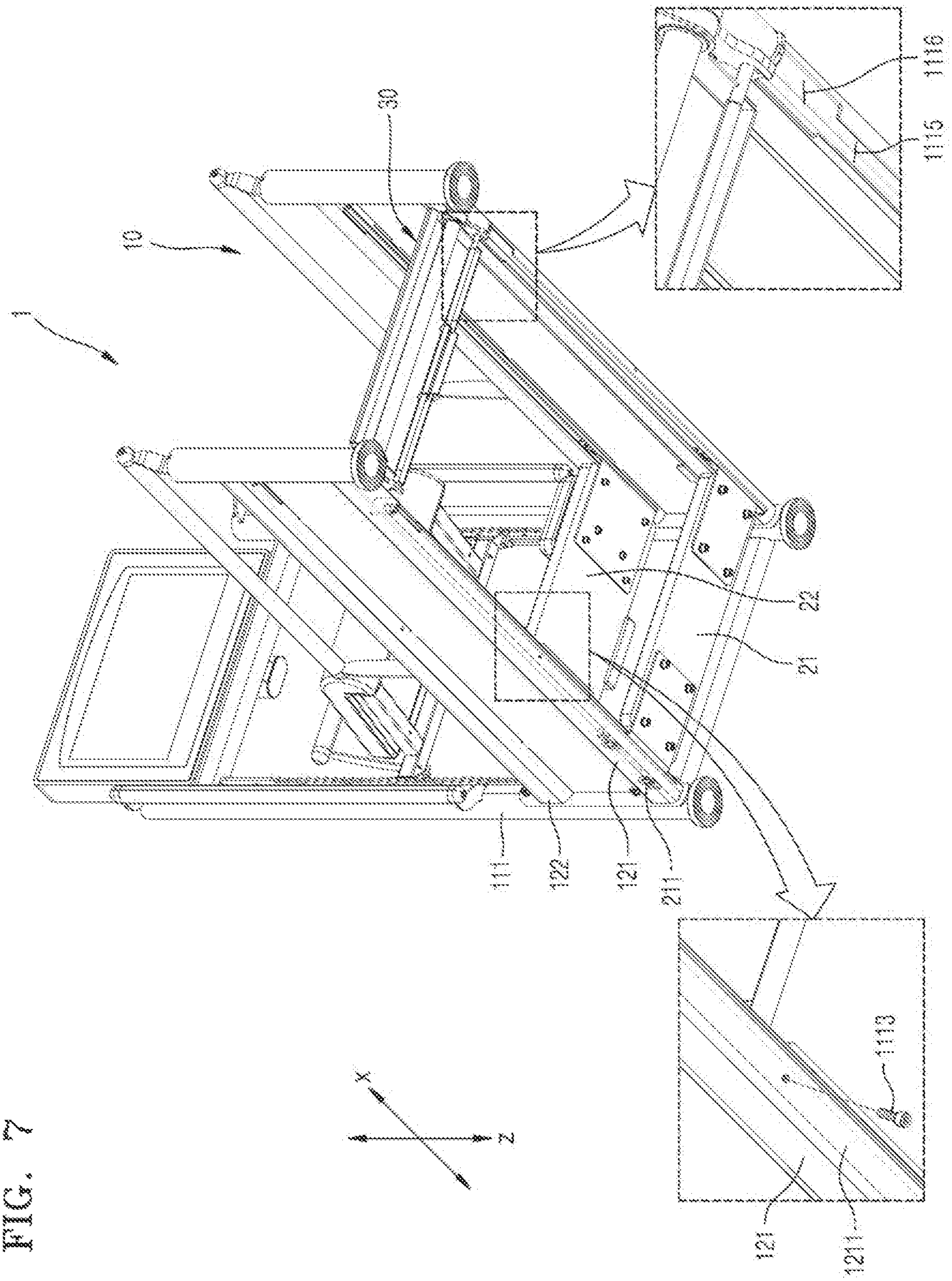
FIG. 7 is a perspective view of a stretching apparatus viewed from below, according to an embodiment.
Figure 8:
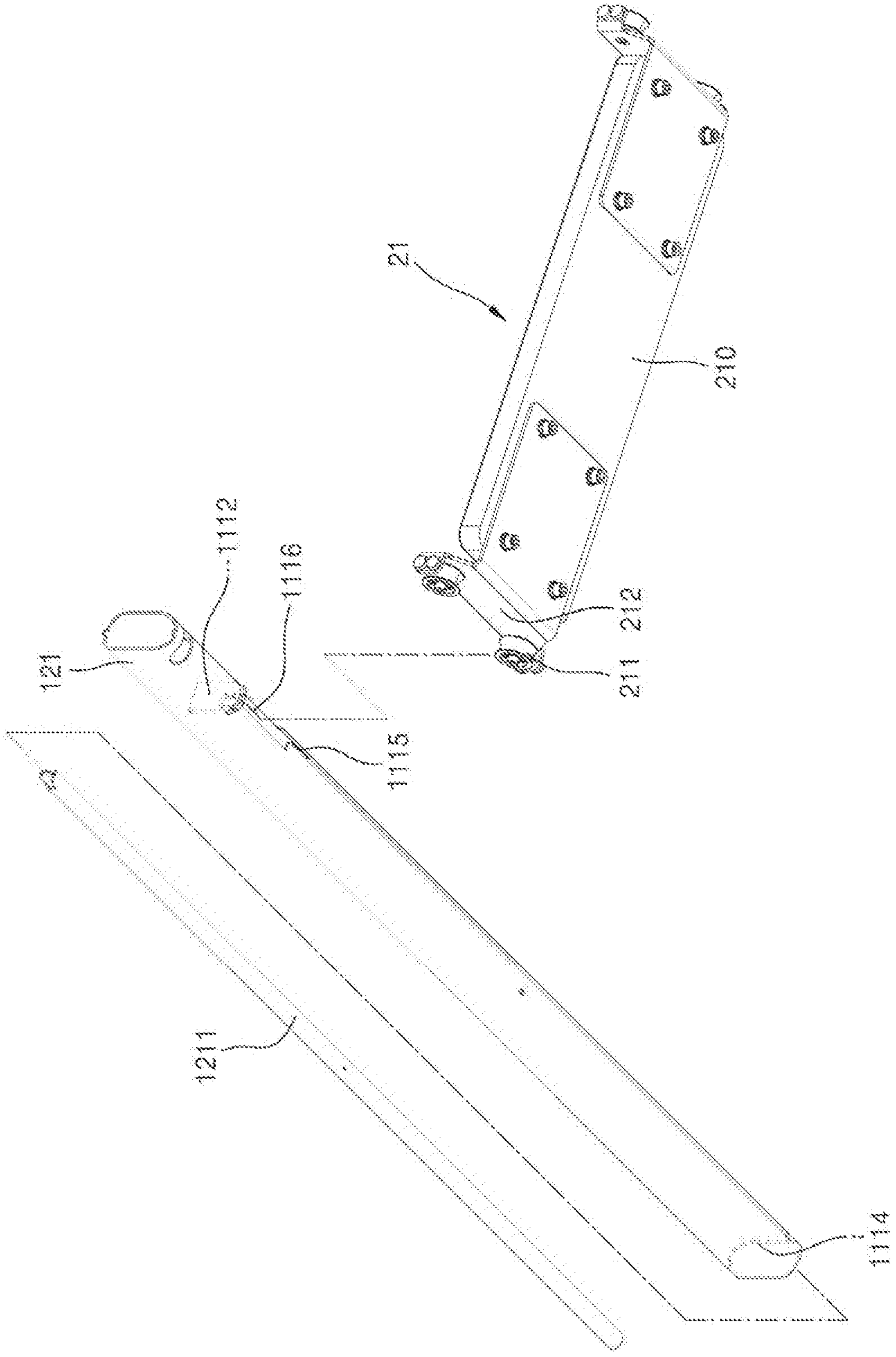
FIG. 8 is a diagram for explaining a process of moveably assembling a 1st-1 stretching member on a first horizontal frame in the stretching apparatus of FIG. 7.
Figure 9:
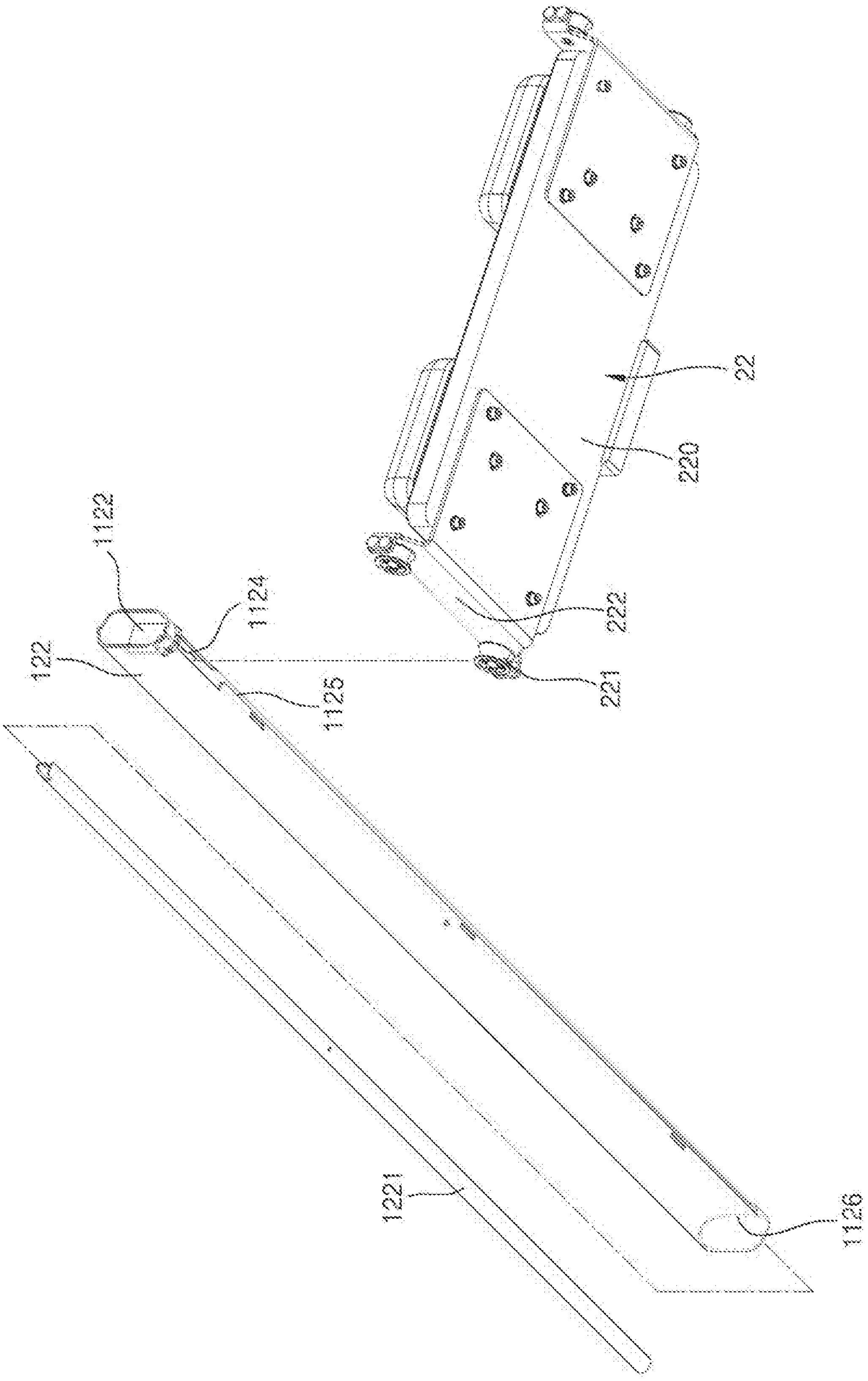
FIG. 9 is a diagram for explaining a process of moveably assembling a 1st-2 stretching member on a second horizontal frame in the stretching apparatus of FIG. 7.

FIG. 7 is a perspective view of a stretching apparatus viewed from below, according to an embodiment. FIG. 8 is a diagram for explaining a process of moveably assembling a 1st-1 stretching member on a first horizontal frame in the stretching apparatus of FIG. 7. FIG. 9 is a diagram for explaining a process of moveably assembling a 1st-2 stretching member on a second horizontal frame in the stretching apparatus of FIG. 7.

Referring to FIG. 7, the first guide rail 1211 may be fixed to the first horizontal frame 121 by a fixing member 1113. The first guide rail 1211 may be prevented from moving in the forward and backward directions X in the first horizontal frame 121 by the fixing member 1113. However, the fixing member 1113 is an optional component, and thus may be omitted as needed. For example, both ends of the first guide rail 1211 may be supported by the second support frame 112 and the first stopper 1112, and fixed inside the first horizontal frame 121 without the fixing member 1113.

The first horizontal frame 121 may include the first guide rail 1211 and a component for insertion of the first guide wheel 211. For example, a first opening 1114 that is open to insert the first guide rail 1211 thereinto may be provided in at least one end of both ends of the first horizontal frame 121 in the forward and backward directions X. A first guide hole 1115 through which a first wheel support 212 supporting the first guide wheel 211 is formed to pass may be provided in a lower side of the first horizontal frame 121, and a first insertion hole 1116 through which the first guide wheel 211 is to be inserted into the first horizontal frame 121 may be provided at one end of the first guide hole 1115.

Referring to FIG. 8, in a process of manufacturing a multifunctional stretching apparatus 1, the first guide wheel 211 may be inserted into the first horizontal frame 121 through the first insertion hole 1116 of the first horizontal frame 121. Then, the first guide rail 1211 is inserted into the first horizontal frame 121 through the first opening 1114 of the first horizontal frame 121. Inside the first horizontal frame 121, the position of the 1st-1 stretching member 21 may be adjusted such that the first guide wheel 211 is accommodated on the first guide rail 1211. One end of the first guide rail 1211 inserted into the first horizontal frame 121 may be supported by the first stopper 1112. The first guide wheel 211 accommodated on the first guide rail 1211 may maintain a position thereof in the forward and backward directions X by gravity, and move along the first guide rail 1211 in the forward and backward directions X.

Referring to FIG. 9, the second horizontal frame 122 may include a second guide rail 1221 and a component for inserting the second guide wheel 221. For example, a second opening 1124 that is open to insert the second guide rail 1221 thereinto may be provided in at least one end of both ends of the second horizontal frame 122 in the forward and backward directions X. An end of the second guide rail 1221 inserted through the second opening 1124 may be fixed by a second stopper 1122.

A second guide hole 1125 through which a second wheel support 222 supporting the second guide wheel 221 is formed to pass may be provided in a lower side of the second horizontal frame 122, and a second insertion hole 1126 through which the second guide wheel 221 is to be inserted into the second horizontal frame 122 may be provided at one end of the second guide hole 1125.

Similar to a process in which the first guide wheel 211 is inserted into the first horizontal frame 121, the second guide wheel may be inserted into the second horizontal frame 122.

Figure 10:
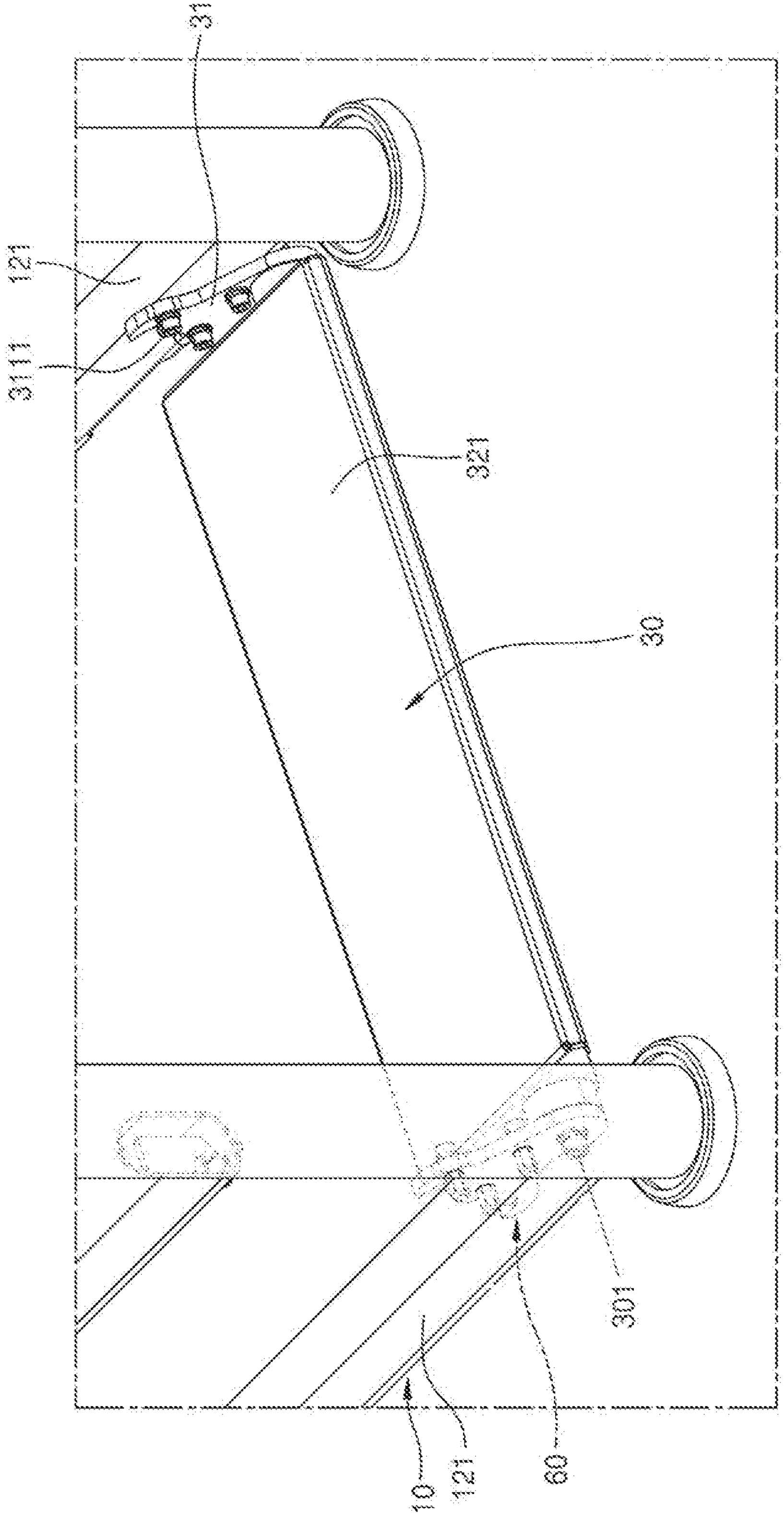
FIG. 10 is an enlarged perspective view of a second stretching member in a stretching apparatus according to an embodiment.
Figure 11:
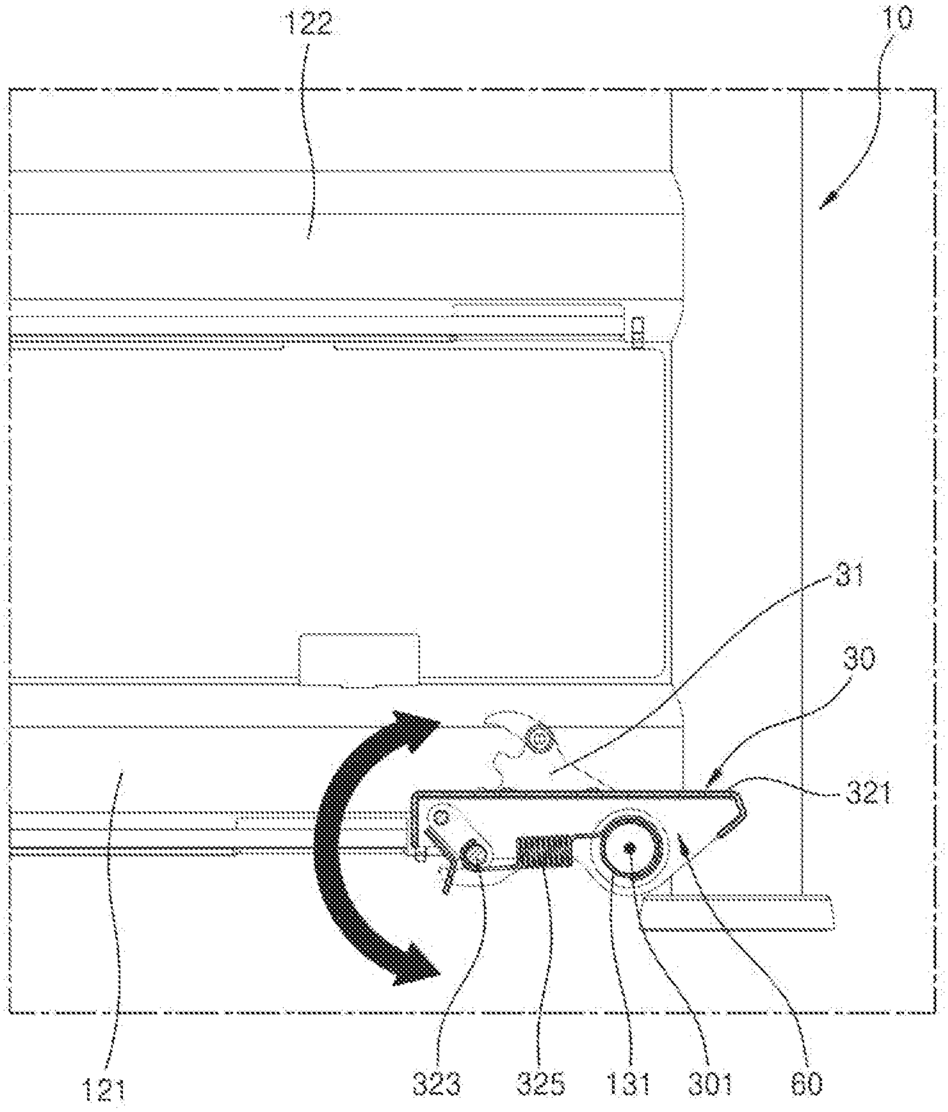
FIG. 11 is a cross-sectional view of a second stretching member in a stretching apparatus according to an embodiment.
Figure 12:
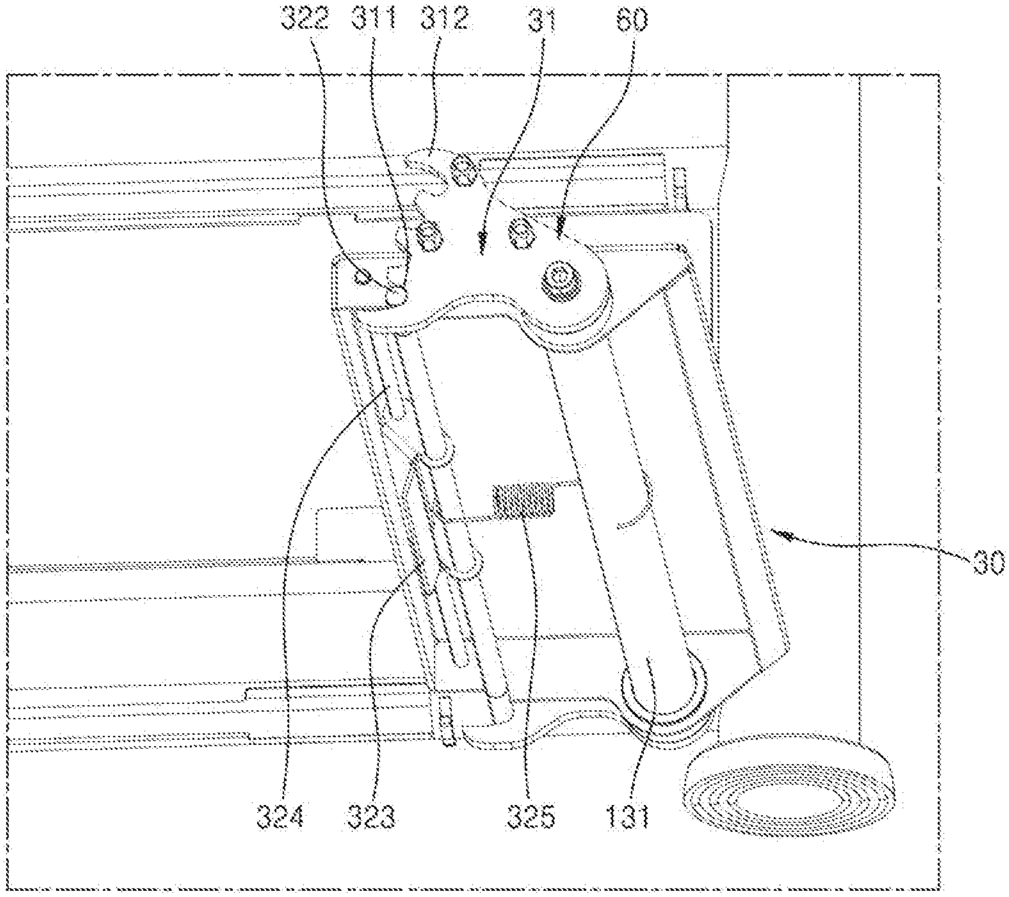
FIG. 12 is an enlarged perspective view of a second stretching member in a stretching apparatus according to an embodiment.

FIG. 10 is an enlarged perspective view of a second stretching member in a stretching apparatus according to an embodiment. FIG. 11 is a cross-sectional view of a second stretching member in a stretching apparatus according to an embodiment. FIG. 12 is an enlarged perspective view of a second stretching member in a stretching apparatus according to an embodiment.

Referring to FIGS. 1, 10, and 11, the second stretching member 30 may be disposed between the plurality of horizontal frames 12. The second stretching member 30 may be located between the pair of first horizontal frames 121. The second stretching member 30 may be located at a front side between the first horizontal frames 121.

The second stretching member 30 may be supported by the first horizontal frame 121 to rotate around a certain rotation shaft 301 with respect to the first horizontal frame 121. For example, the second stretching member 30 may be rotatably supported around the rotation shaft 301 by a rotation support 31 provided on the first horizontal frame 121.

Referring to FIGS. 10 to 12, the second stretching member 30 may be configured to adjust an angle thereof with respect to the body frame 10. For example, the second stretching member 30 may include a plate 321 for holding the sole of a user and an angle adjustment rod 322 provided below the plate 321. The rotation support 31 may include a plurality of angle adjustment grooves 311 into which the angle adjustment rod 322 is to be inserted.

The angle adjustment rod 322 may be rotatably configured by an angle adjustment handle 323. For example, the angle adjustment handle 323 may connect the angle adjustment rod 322 to a rotation shaft 324 such that the angle adjustment rod 322 may rotate around the rotation shaft 324. The angle adjustment handle 323 may connect a central portion of the angle adjustment rod 322 to a central portion of the rotation shaft 324. When a user pulls the angle adjustment handle 323, the angle adjustment rod 322 connected to the angle adjustment handle 323 may rotate around the rotation shaft 324 to be separated from the angle adjustment groove 311 of the rotation support 31. When the angle adjustment rod 322 is inserted into different angle adjustment grooves 311, the second stretching member 30 may have different angles with respect to the body frame 10.

The second stretching member 30 may further include a pressurization member 325 for pressurizing the angle adjustment rod 322 to rotate in a certain rotation direction around the rotation shaft 324. The pressurization member 325 may include an elastic body that provides an elastic force. An example of the elastic body may include a spring or a rubber member, but is not limited thereto. One end of the pressurization member 325 may be supported by the angle adjustment rod 322, and the other end of the pressurization member 325 may be supported by the first connection frame 131. A state in which the angle adjustment rod 322 is inserted into the angle adjustment groove 311 may be maintained by the pressurization member 325.

The rotation support 31 may include a rotation stopper 312 that limit a movement range of the angle adjustment rod 322 to prevent the angle adjustment rod 322 separated from the plurality of angle adjustment grooves 311 from being released from the rotation support 31. For example, the rotation stopper 312 protruding backward may be provided at both ends of the rotation support 31 in the upward and downward directions Z of the rotation support 31.

The first connection frame 131 provided to maintain an interval between the first horizontal frames 121 may be coaxially located with the rotation shaft 301 of the second stretching member 30. As the first connection frame 131 is coaxially located with the rotation shaft 301 of the second stretching member 30, the multifunctional stretching apparatus 1 may be miniaturized, and interference with stretching of the user may be prevented.

When the first connection frame 131 is located behind the second stretching member 30, the first connection frame 131 may interfere with movement of the 1st-1 stretching member 21 in the forward and backward directions X, and to prevent the interference, the length of the stretching apparatus 1 in the forward and backward directions X may be increased. When the first connection frame 131 is located at a front side of the second stretching member 30, for example, between the second support frames 112, the first connection frame 131 may interfere with an operation using the second stretching member 30 or interfere with an operation using the 1st-2 stretching member 22. When the first connection frame 131 is located below the second stretching member 30 and is not coaxially located with the rotation shaft 301 of the second stretching member 30, the first connection frame 131 may interfere with rotation of the second stretching member 30. On the other hand, in the multifunctional stretching apparatus 1 according to an embodiment, as the first connection frame 131 is coaxially located with the rotation shaft 301 of the second stretching member 30, the first connection frame 131 may not interfere with stretching of the user while the length of the multiple stretching apparatus 1 in the forward and backward directions X is reduced.

The second stretching member 30 may be located at the same level as the 1st-1 stretching member 21. In other words, at least portions of the second stretching member 30 and the 1st-1 stretching member 21 may be located to overlap in the forward and backward directions X. Here, being located at the same level may mean that at least a portion of the second stretching member 30 is located to overlap the 1st-1 stretching member 21 in forward and backward directions.

As an example, the 1st-1 stretching member 21 may be moveably installed in the forward and backward directions X on the first horizontal frame 121, and the second stretching member 30 may be rotatably installed on the first horizontal frame 121. The first horizontal frame 121 may include the first stopper 1112 that limits the movement distance of the 1st-1 stretching member 21. Contact between the 1st-1 stretching member 21 and the second stretching member 30 may be prevented by the first stopper 1112. However, the configuration of the first stretching member 20 or the second stretching member 30 described above may not be a required configuration of the stretching apparatus 1. Hereinafter, the configuration and function of the upward and downward adjustment module 40 of the stretching apparatus 1 will be described.

Figure 13A:
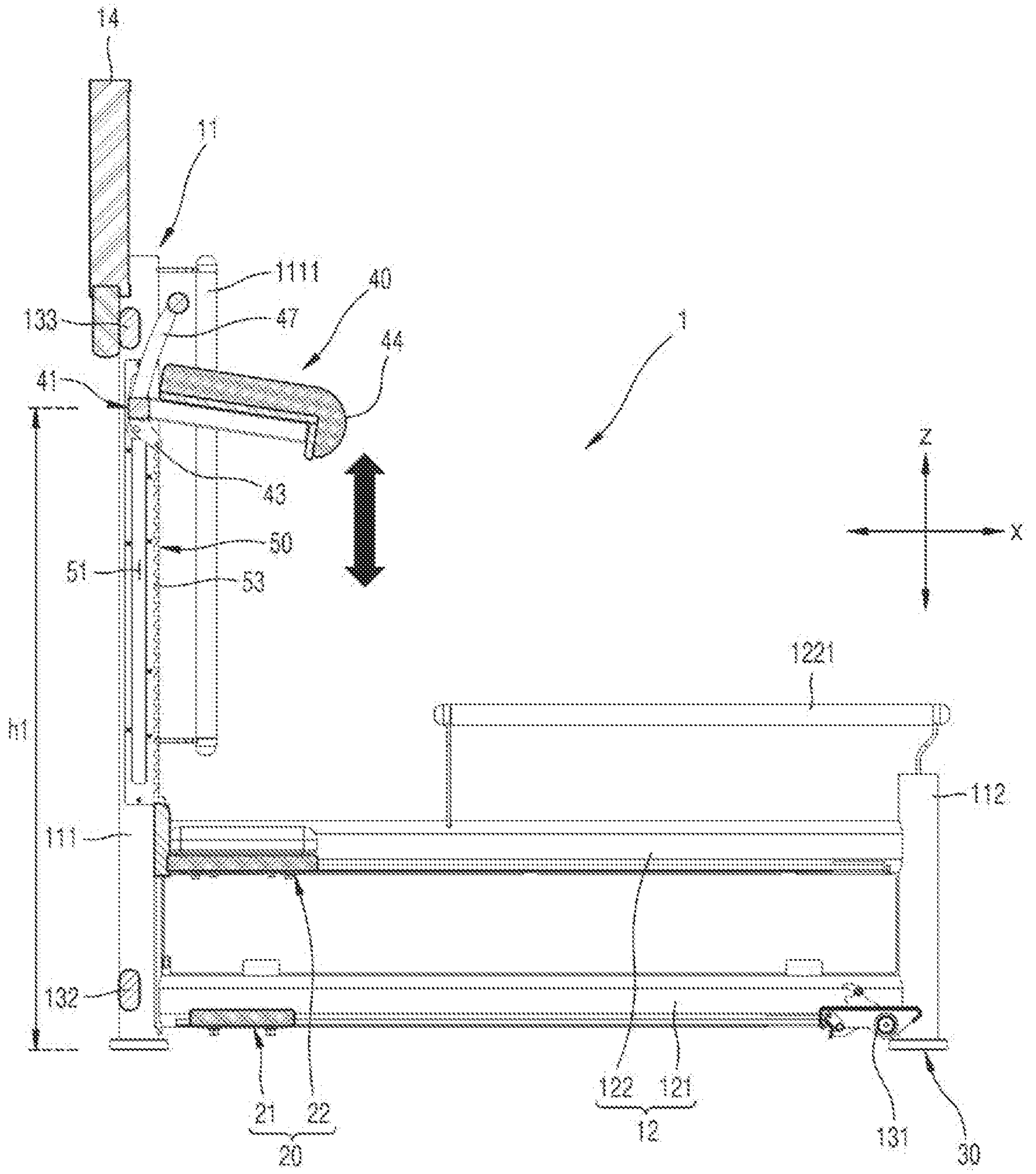
FIG. 13A is a side cross-sectional view for explaining movement of an upward and downward adjustment module in upward and downward directions according to an embodiment.
Figure 13B:
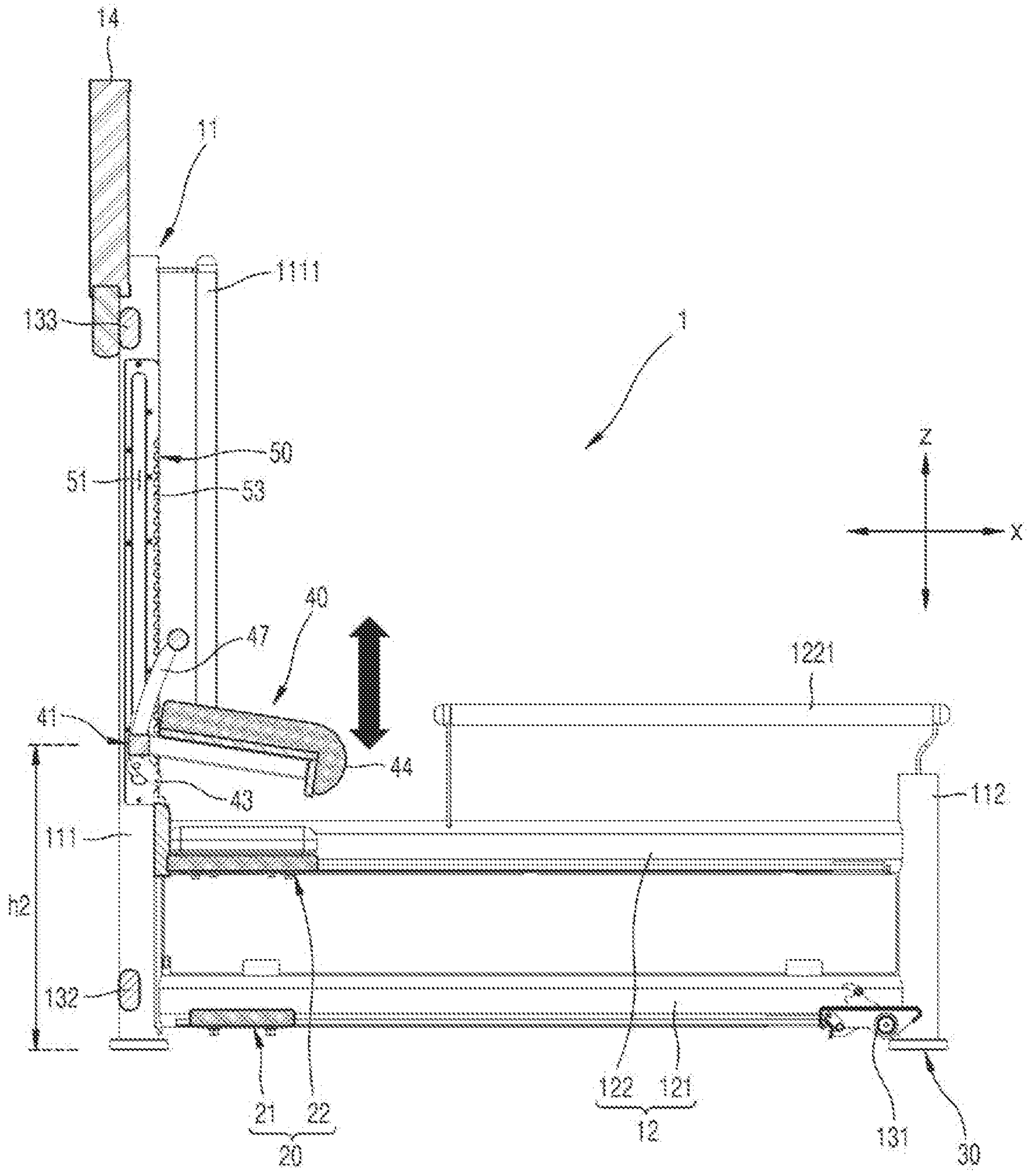
FIG. 13B is a side cross-sectional view for explaining movement of an upward and downward adjustment module in upward and downward directions according to an embodiment.
Figure 14A:
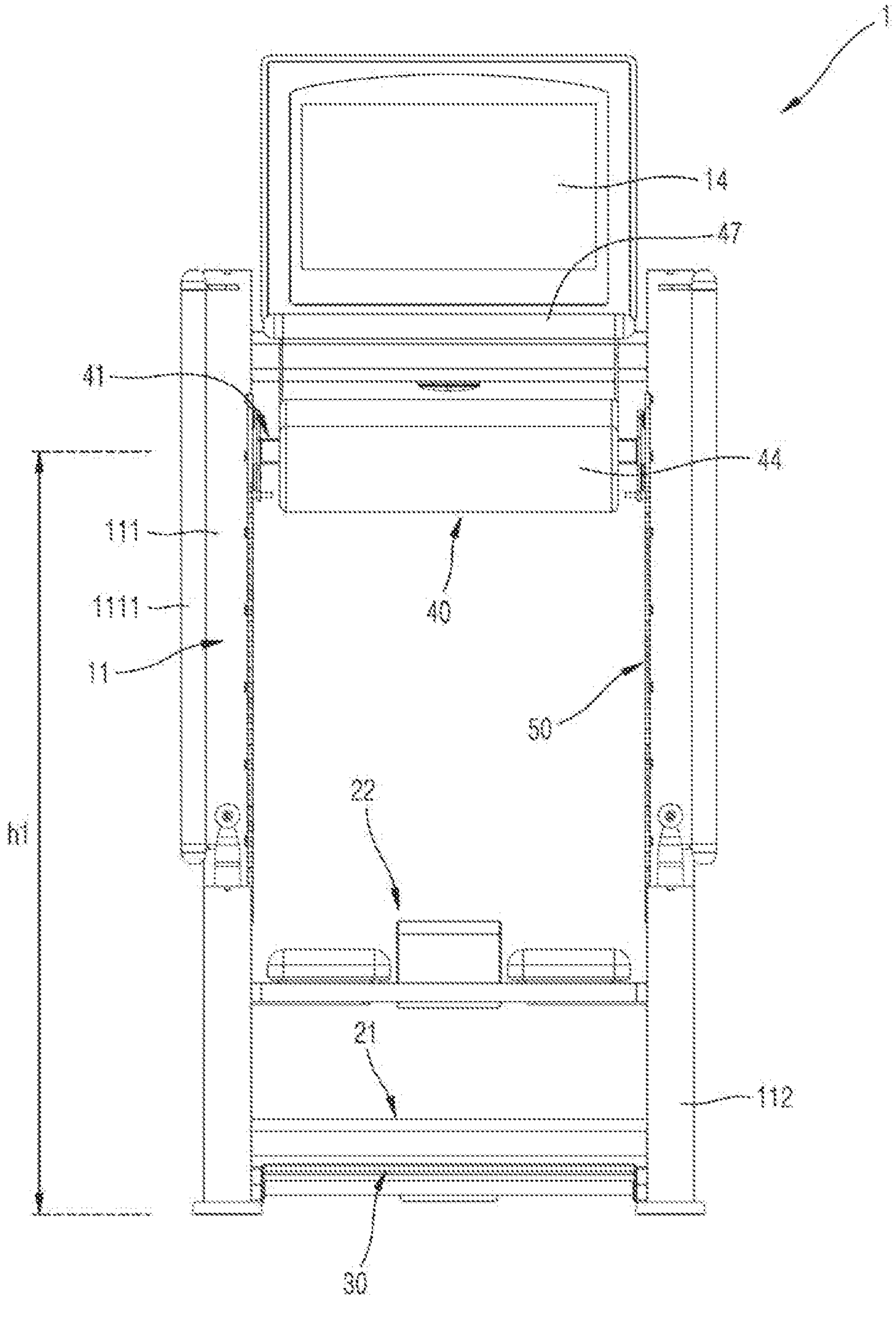
FIG. 14A is a front view for explaining movement of an upward and downward adjustment module in upward and downward directions according to an embodiment.
Figure 14B:
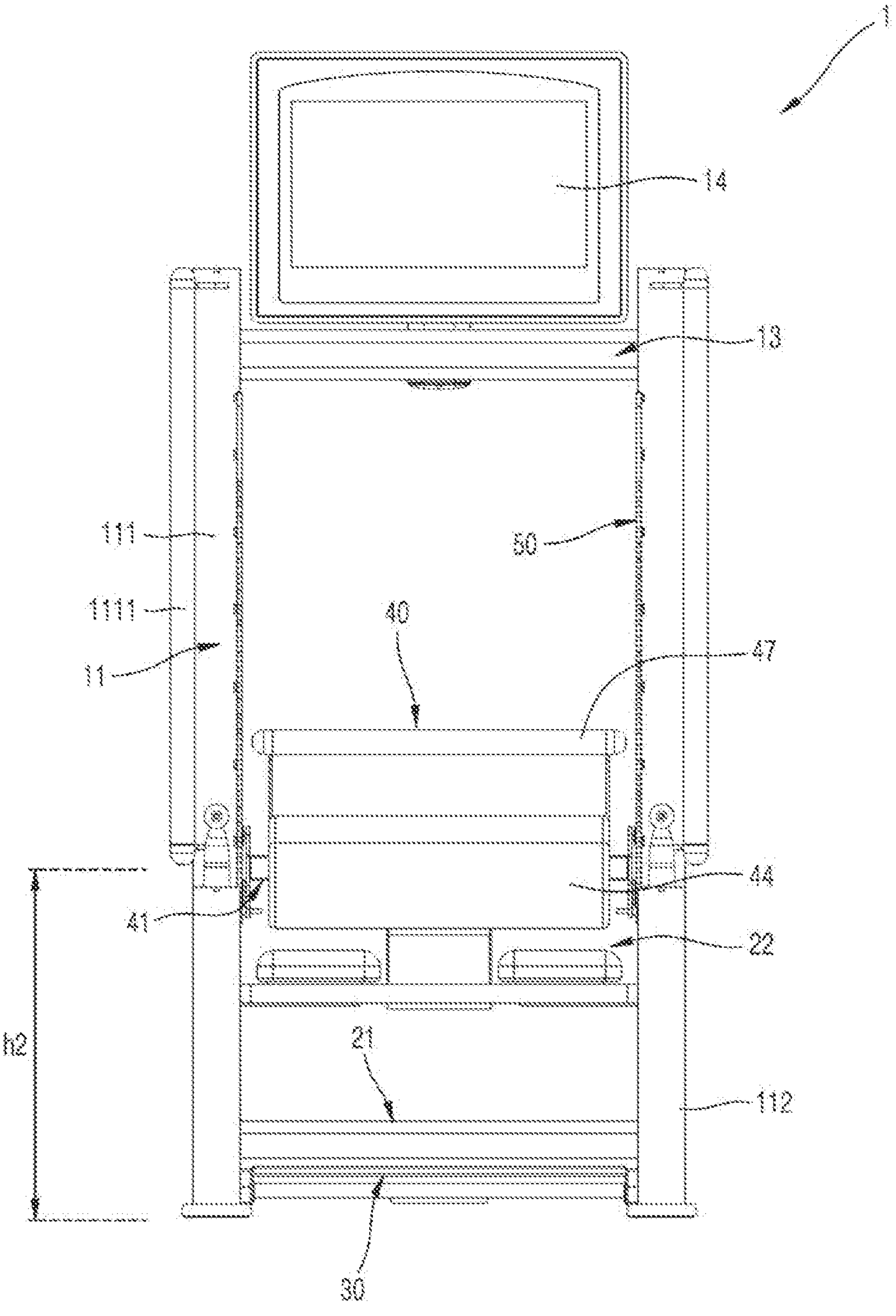
FIG. 14B is a front view for explaining movement of an upward and downward adjustment module in upward and downward directions according to an embodiment.

FIG. 13A is a side cross-sectional view for explaining movement of the upward and downward adjustment module 40 in the upward and downward directions Z, according to an embodiment. FIG. 13B is a side cross-sectional view for explaining movement of the upward and downward adjustment module 40 in the upward and downward directions Z, according to an embodiment. FIG. 14A is a front view for explaining movement of the upward and downward adjustment module 40 in the upward and downward directions Z, according to an embodiment. FIG. 14B is a front view for explaining movement of the upward and downward adjustment module 40 in the upward and downward directions Z, according to an embodiment.

Referring to FIGS. 13A to 14B, the stretching apparatus 1 according to an embodiment may include the upward and downward adjustment module 40 configured to adjust a level thereof in the upward and downward directions Z. The upward and downward adjustment module 40 may be the third stretching member described above.

The upward and downward adjustment module 40 may be located between the body frames 10. The upward and downward adjustment module 40 may be located between the pair of support frames 11. The upward and downward adjustment module 40 may be located between the first support frames 111. The upward and downward adjustment module 40 may be supported by the first support frame 111. However, a position at which the upward and downward adjustment module 40 is located may not be limited thereto.

A level of the upward and downward adjustment module 40 in the upward and downward directions Z may be adjusted between the pair of first support frames 111. The upward and downward adjustment module 40 may have a maximum height h1 and a minimum height h2 within a length in which the pair of first support frames 111 extend in the upward and downward directions Z. The maximum height h1 or the minimum height h2 may be measured from the ground to the position of the upward and downward adjustment module 40. Hereinafter, the first support frame 111 will be described as the pair of support frames 11.

A level of the upward and downward adjustment module 40 may be adjusted between the maximum height h1 and the minimum height h2. The upward and downward adjustment module 40 may have any level between the maximum height h1 and the minimum height h2.

The level of the upward and downward adjustment module 40 may be fixed at any height between the maximum height h1 and the minimum height h2. The fact that the level of the upward and downward adjustment module 40 is fixed may mean that the level of the upward and downward adjustment module 40 is not changed by a self load of the upward and downward adjustment module 40. The fact that the level of the upward and downward adjustment module 40 is fixed may also mean that the level of the upward and downward adjustment module 40 is not changed even if a load is applied to the upward and downward adjustment module 40. The load may be a load of the user applied to the stretching apparatus 1. For example, the load may be about 30 kg to about 150 kg. However, this is merely an exemplary description, and the load applied to the upward and downward adjustment module 40 is not limited to the above description.

The upward and downward adjustment module 40 according to an embodiment may include a third handle 47. The third handle 47 may be located at an upper end of the upward and downward adjustment module 40. The third handle 47 may extend in left and right directions. However, the arrangement of the third handle 47 is not limited to the above description.

The stretching apparatus 1 according to an embodiment may include a level support 50. The level support 50 may guide upward and downward movements of the upward and downward adjustment module 40. The level support 50 may guide the upward and downward adjustment module 40 to slide in the upward and downward directions Z. The level support 50 may fix the level of the upward and downward adjustment module 40. The level support 50 may extend in the upward and downward directions Z. The level support 50 may include a plurality of level supports. The level support 50 may be fixed to each of the pair of first support frames 111. The level support 50 may be fixed inside each of the pair of first support frames 111.

The upward and downward adjustment module 40 may slide in the upward and downward directions Z between the level supports 50. The upward and downward adjustment module 40 may be supported by the level support 50. The level support 50 may support the upward and downward adjustment module 40 to fix the level of the upward and downward adjustment module 40. However, the arrangement and function of the level support 50 is not limited to the above description.

The level of the upward and downward adjustment module 40 may be fixed at a certain height between the maximum height h1 and the minimum height h2 by the level support 50. The upward and downward adjustment module 40 may be fixed at a plurality of levels by the level support 50. For example, the upward and downward adjustment module 40 may be fixed at about 20 levels to about 30 levels between the maximum height h1 and the minimum height h2. However, a level at which the upward and downward adjustment module 40 is fixed may not be limited thereto.

Figure 15A:
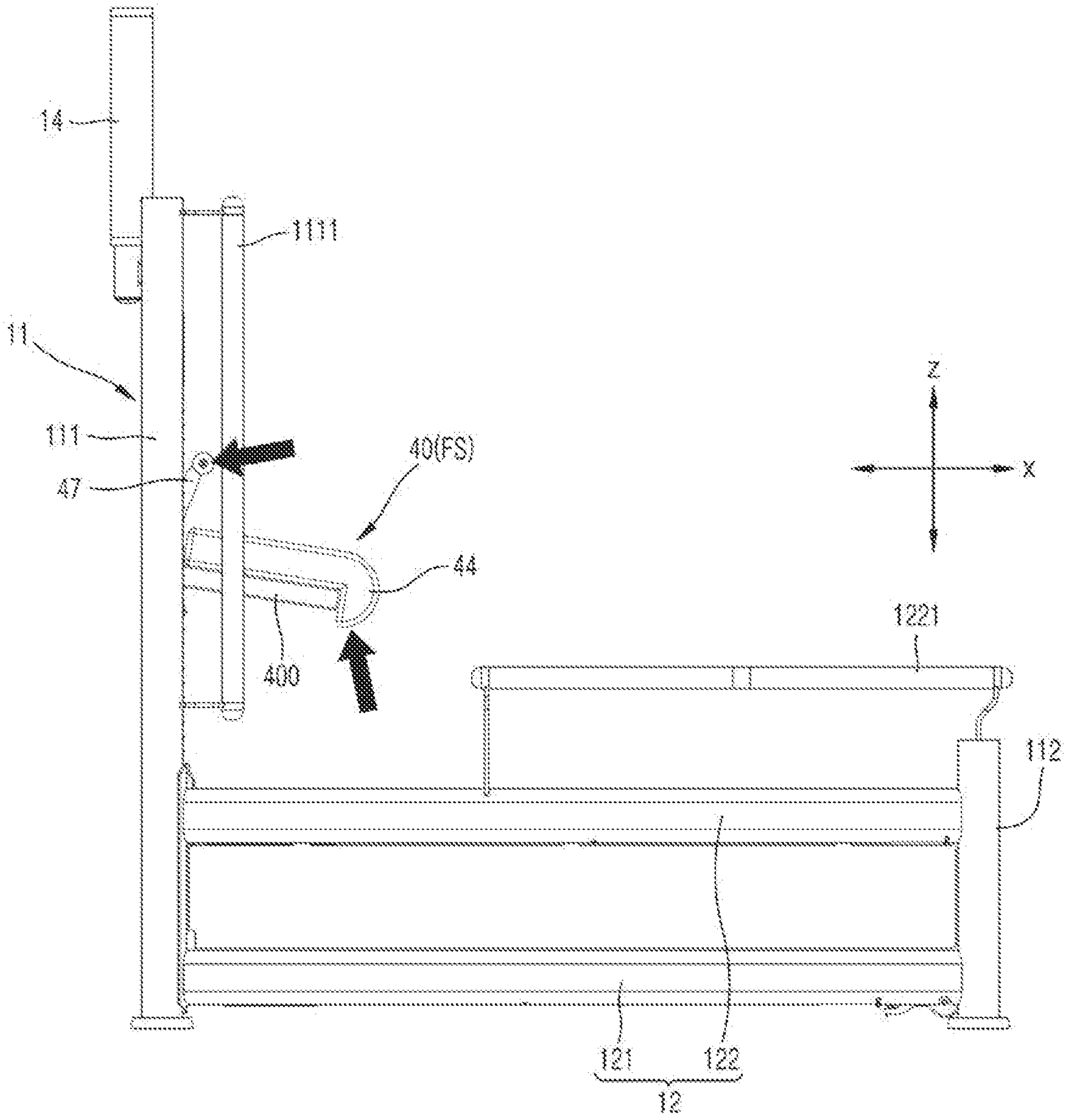
FIG. 15A is a side view for explaining an operation of converting an upward and downward adjustment module from a fixed state to a movable state, according to an embodiment.
Figure 15B:
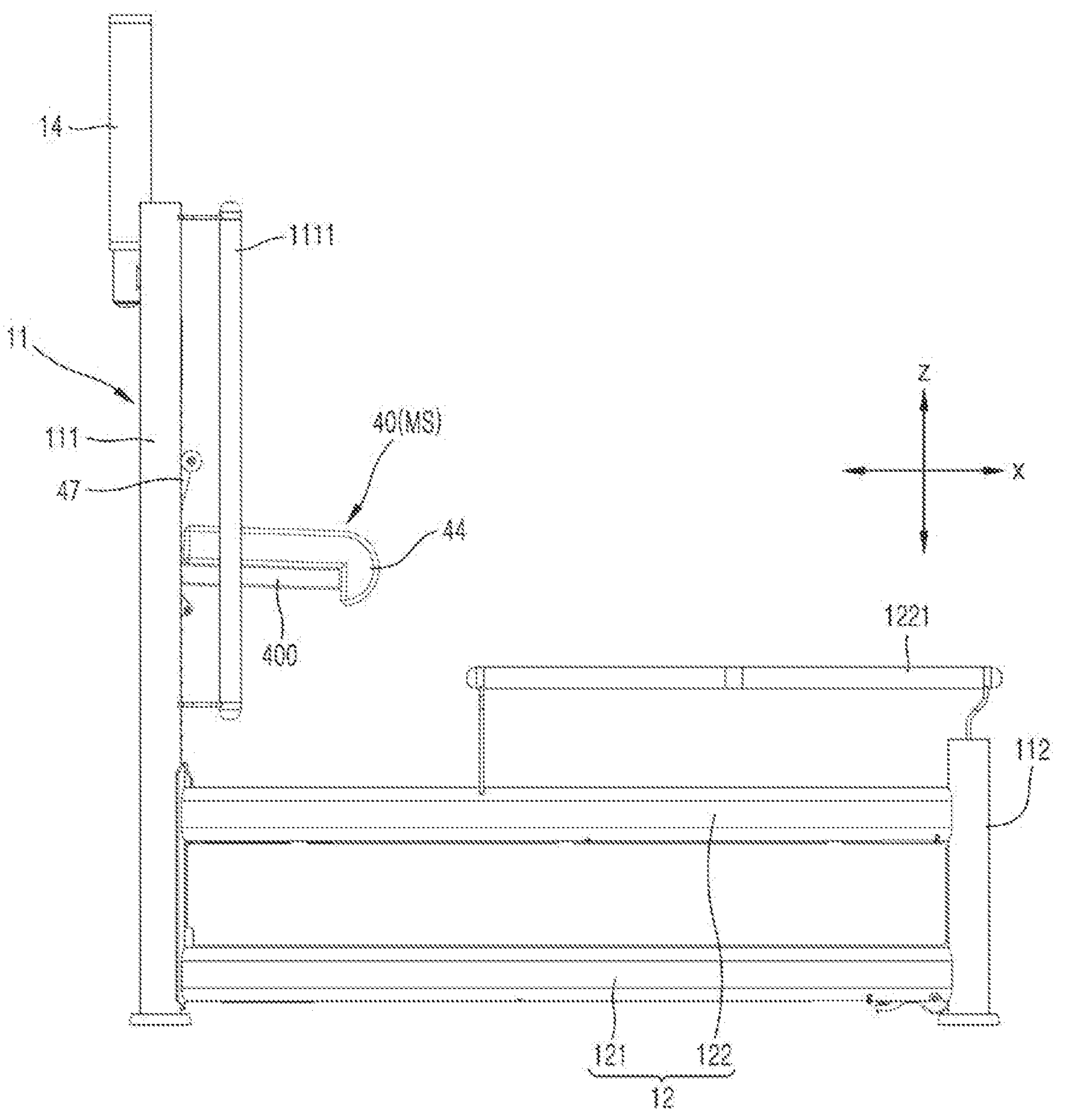
FIG. 15B is a side view for explaining a state in which an upward and downward adjustment module is converted into a movable state, according to an embodiment.

FIG. 15A is a side view for explaining an operation of converting the upward and downward adjustment module 40 from a fixed state FS to a movable state MS, according to an embodiment. FIG. 15B is a side view for explaining a state in which the upward and downward adjustment module 40 is converted to the movable state MS, according to an embodiment.

Referring to FIGS. 15A and 15B, the upward and downward adjustment module 40 according to an embodiment may have the fixed state FS and the movable state MS. The fixed state FS may be a state in which the level of the upward and downward adjustment module 40 is fixed. In the fixed state FS, the upward and downward movements of the upward and downward adjustment module 40 may be limited. The movable state MS may be a state in which the upward and downward adjustment module 40 is movable in the upward and downward directions Z. In the movable state MS, the upward and downward movements of the upward and downward adjustment module 40 may be allowed.

When an external force is not applied to the upward and downward adjustment module 40, the upward and downward adjustment module 40 may have the fixed state FS. When the upward and downward adjustment module 40 is in the movable state MS, the current state is a state in which an external force is applied to the upward and downward adjustment module 40. The external force applied to the upward and downward adjustment module 40 may be a force applied by a user. However, the external force applied to the upward and downward adjustment module 40 is not limited to the above description.

The upward and downward adjustment module 40 may be converted from the fixed state FS to the movable state MS. The user may have to force the upward and downward adjustment module 40 to convert the upward and downward adjustment module 40 from the fixed state FS to the movable state MS.

The user may apply the external force to the upward and downward adjustment module 40 to convert the upward and downward adjustment module 40 from the fixed state FS to the movable state MS. The upward and downward adjustment module 40 may be converted from the fixed state FS to the movable state MS by applying a force upward to a front end of the upward and downward adjustment module 40. The upward and downward adjustment module 40 may be converted from the fixed state FS to the movable state MS by applying a force backward to the third handle 47 of the upward and downward adjustment module 40. The upward and downward adjustment module 40 may be converted from the fixed state FS to the movable state MS by applying a rotational force backward to the upward and downward adjustment module 40. Backward rotation may be counterclockwise rotation based on a right side view of the stretching apparatus 1. However, a force to be applied to convert the upward and downward adjustment module 40 from the fixed state FS to the movable state MS is not limited to the above description.

Referring to FIGS. 13A to 15B, the upward and downward adjustment module 40 according to an embodiment may adjust a level thereof in the upward and downward directions Z in the movable state MS. The upward and downward adjustment module 40 may be lowered downward by a self load thereof in the movable state MS. The upward and downward adjustment module 40 may move in the upward and downward directions Z in the movable state MS.

The upward and downward adjustment module 40 may adjust a level thereof in the upward and downward directions Z and may then be converted back to the fixed state FS. The upward and downward adjustment module 40 may not be lowered downward by a self load thereof in the fixed state FS. Even if a load is applied to an upper side of the upward and downward adjustment module 40 in the fixed state FS, the upward and downward adjustment module 40 may support the load without a change in a level thereof.

The user may convert the upward and downward adjustment module 40 from the fixed state FS to the movable state MS to adjust the level of the upward and downward adjustment module 40, and may then convert the upward and downward adjustment module 40 from the movable state MS back to the fixed state FS.

Figure 16:
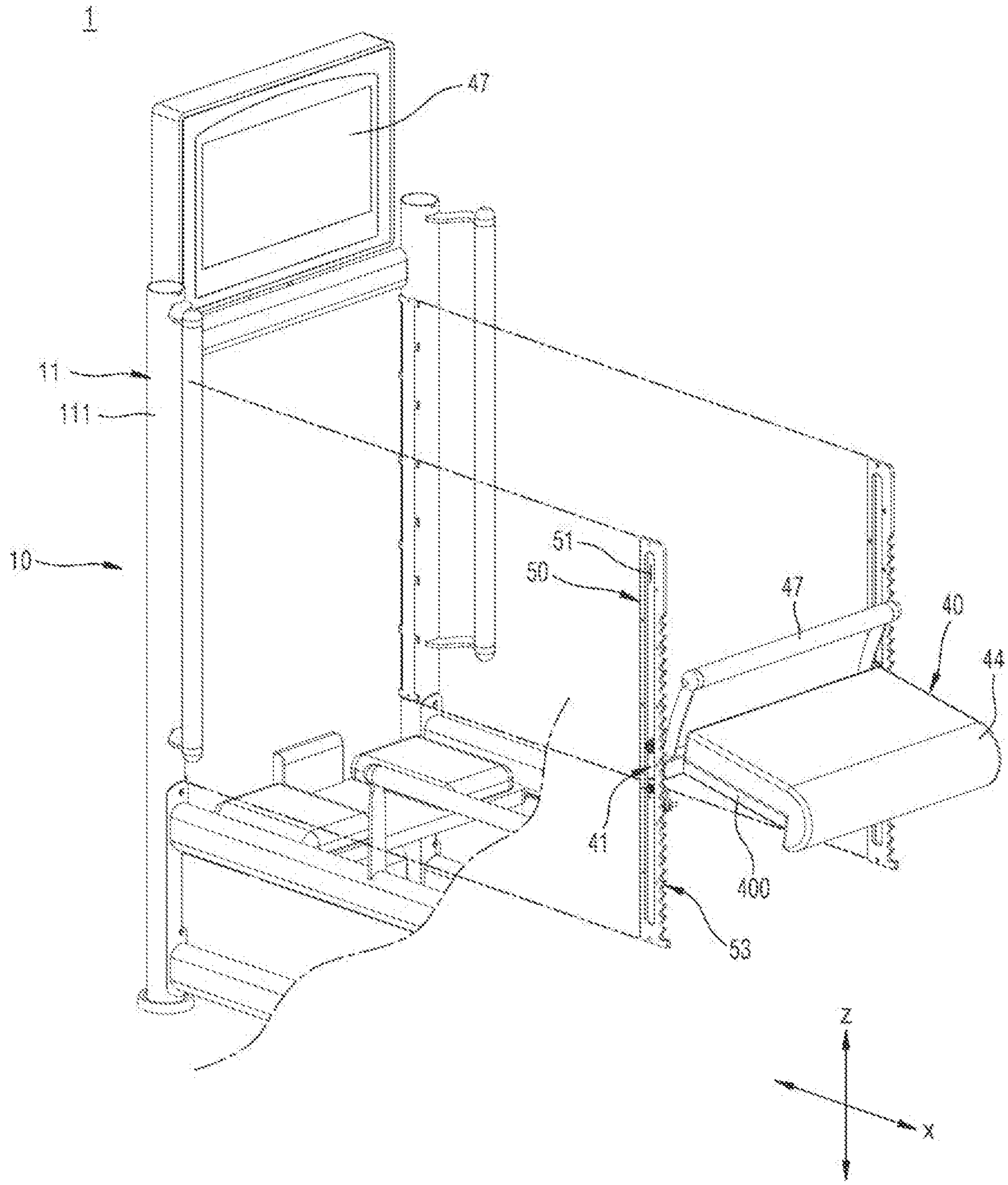
FIG. 16 is an exploded perspective view showing a state in which an upward and downward adjustment module and a level support are coupled to a body frame, according to an embodiment.

FIG. 16 is an exploded perspective view showing a state in which the upward and downward adjustment module 40 and the level support 50 are coupled to the body frame 10, according to an embodiment.

Referring to FIGS. 15A to 16, the upward and downward adjustment module 40 and the level support 50 may be coupled or decoupled to or from the body frame 10. The upward and downward adjustment module 40 and the level support 50 may be coupled or decoupled to or from the first support frame 111.

The sum of a width of the upward and downward adjustment module 40 and a width of the level support 50 may be greater than a width between the pair of first support frames 111. Here, the width may be a length in left and right directions of the stretching apparatus 1, which is measured from a front or rear surface of the stretching apparatus 1. However, the widths of the upward and downward adjustment module 40, the level adjustment module, and the first support frame 111 are not limited to the above description.

In a state in which the level support 50 is coupled to each of the pair of first support frames 111, it may be difficult to couple the upward and downward adjustment module 40 to the level support 50. To couple the upward and downward adjustment module 40 to the first support frame 111, the upward and downward adjustment module 40 may need to be coupled to the first support frame 111 together in a state in which the upward and downward adjustment module 40 and the first support frame 111 are coupled to the level support 50. However, a method of coupling the upward and downward adjustment module 40 between the first support frames 111 is not limited to the above description.

The level support 50 may be coupled to the first support frame 111. The level support 50 may be supported by the first support frame 111. The level support 50 may be fixed to the first support frame 111 by a coupling member (not shown). However, a method of fixing the level support 50 to the first support frame 111 is not limited to the above description.

Figure 17:
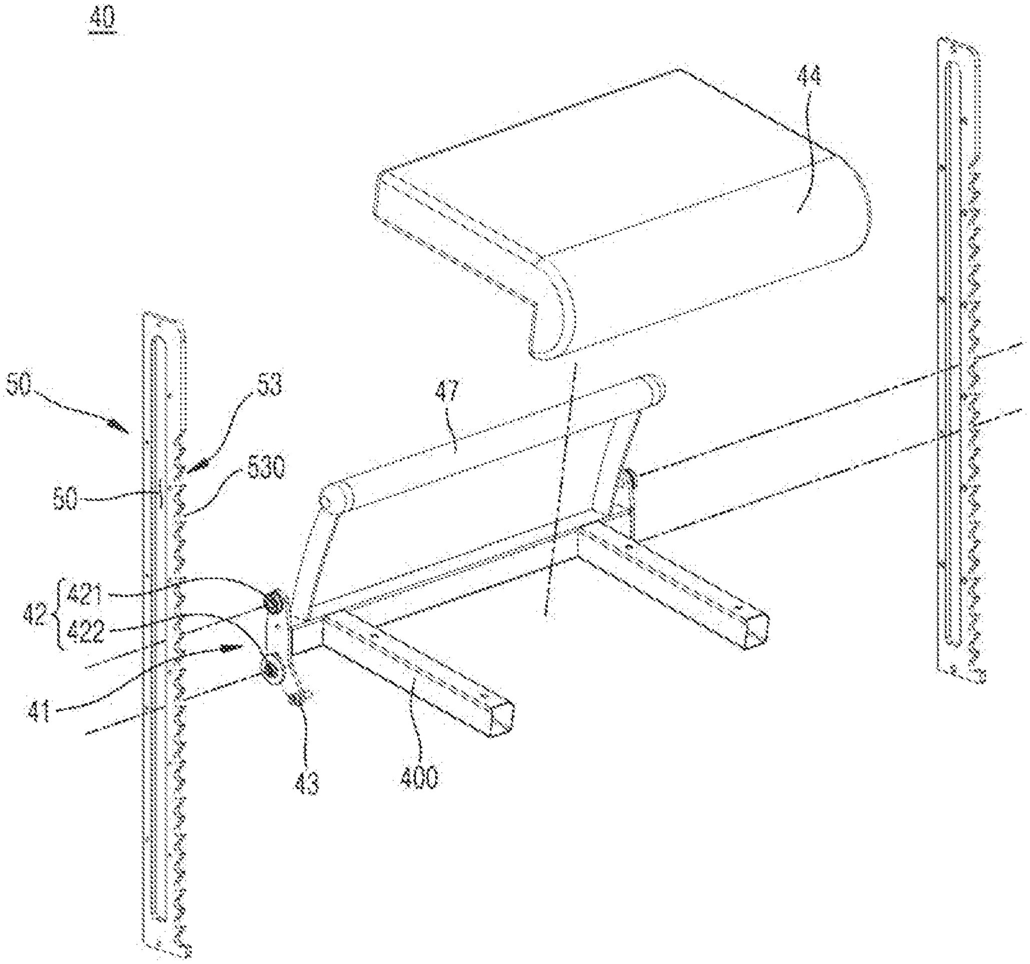
FIG. 17 is an exploded perspective view showing coupling between an upward and downward adjustment module and a level support of FIG. 16.

FIG. 17 is an exploded perspective view showing coupling between the upward and downward adjustment module 40 and the level support 50 of FIG. 16.

Referring to FIGS. 15A to 17, the upward and downward adjustment module 40 according to an embodiment may include a stretching member 41. The stretching member 41 may be the third stretching member described above. The stretching member 41 may move in upward and downward directions and may be configured to be in contact with a part of the body of the user. The stretching member 41 may include a base frame 400 and a sheet pad 44 supported by the base frame 400.

The stretching member 41 may slide in the upward and downward directions Z between the level supports 50. The upward and downward adjustment module 40 may slide in the upward and downward directions Z between the level supports 50 by the stretching member 41. The upward and downward adjustment module 40 may slide in the upward and downward directions Z between the pair of first support frames 111 by the stretching member 41.

The base frame 400 may be a portion of the upward and downward adjustment module 40, to which a user load is applied. The base frame 400 may support the user load. The base frame 400 according to an embodiment may extend forward in the stretching member 41. The user may apply a force upward to a front end of the upward and downward adjustment module 40 to convert the upward and downward adjustment module 40 from the fixed state FS to the movable state MS. The user may apply a force upward to a front end of the base frame 400 to convert the upward and downward adjustment module 40 from the fixed state FS to the movable state MS. However, a method of converting the upward and downward adjustment module 40 from the fixed state FS to the movable state MS by a user is not limited to the above description.

The upward and downward adjustment module 40 according to an embodiment may include the sheet pad 44. The sheet pad 44 may include an elastic material. The sheet pad 44 may be located on an upper side of the upward and downward adjustment module 40. The sheet pad 44 may be located on the base frame 400. The sheet pad 44 may be a portion to which a user load is directly applied. The sheet pad 44 may have a front side with a curved shape. Accordingly, the user may support a part of the lower body at the upper side of the sheet pad 44 or may support the back or the lower back at the front side of the sheet pad 44. However, the material, arrangement, and function of the sheet pad 44 is not limited to the above description.

Figure 18A:
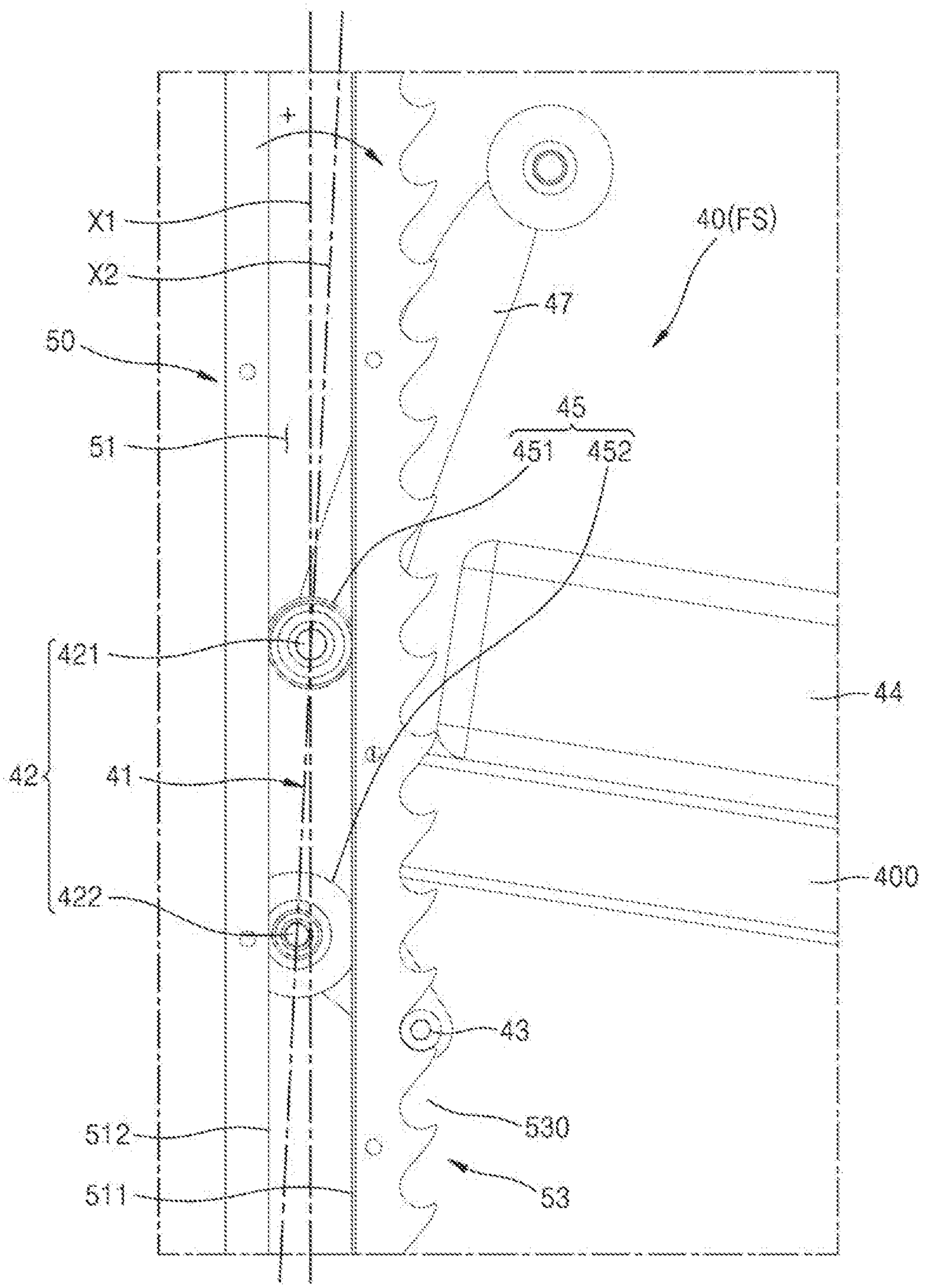
FIG. 18A is a side cross-sectional view for explaining a guide slit and a level adjustment bearing, according to an embodiment.
Figure 18B:
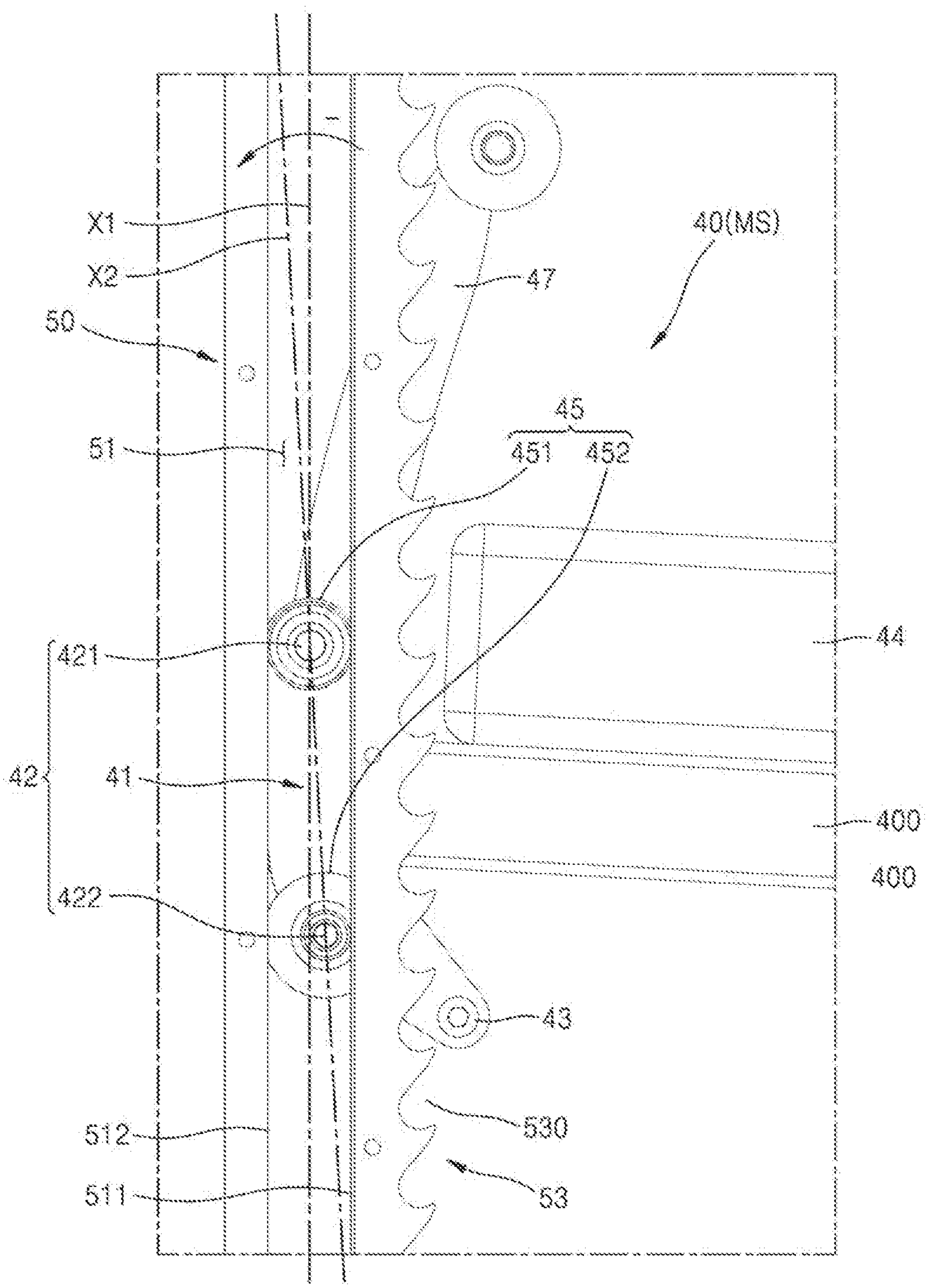
FIG. 18B is a side cross-sectional view for explaining a guide slit and a bearing, according to an embodiment.

FIG. 18A is a side cross-sectional view for explaining a guide slit 51 and a level adjustment bearing 42, according to an embodiment. FIG. 18B is a side cross-sectional view for explaining the guide slit 51 and a bearing, according to an embodiment.

Referring to FIGS. 17 to 18B, the upward and downward adjustment module 40 according to an embodiment may include the level adjustment bearing 42. The level adjustment bearing 42 may be configured to adjust the level of the upward and downward adjustment module 40. The level adjustment bearing 42 may adjust the level of the upward and downward adjustment module 40 through a rolling motion within the level support 50. The level adjustment bearing 42 may adjust the level of the upward and downward adjustment module 40 by performing a rolling motion within the level support 50.

The level adjustment bearing 42 according to an embodiment may include a first bearing 421 and a second bearing 422. The stretching member 41 may include the level adjustment bearing 42 located on each of both side ends of the stretching member 41. The first bearing 421 and the second bearing 422 may be located on the both side ends of the stretching member 41. The second bearing 422 may be located below the first bearing 421. However, the arrangement of the first bearing 421 and the second bearing 422 is not limited to the above description. For example, the second bearing 422 may be located above the first bearing 421. A separate embodiment in which the second bearing 422 is located above the first bearing 421 will be described below.

The level support 50 according to an embodiment may include a guide slit 51 configured to guide movement of the upward and downward adjustment module 40. The level support 50 may include the guide slit 51 configured to guide movement of the stretching member 41. The level support 50 may include the guide slit 51 configured to guide movement of the first bearing 421 and the second bearing 422.

The guide slit 51 according to an embodiment may extend in the upward and downward directions Z. The guide slit 51 may accommodate the first bearing 421 and the second bearing 422. The guide slit 51 may guide the first bearing 421 and the second bearing 422 to move in the upward and downward directions Z. The first bearing 421 and the second bearing 422 may slide in the upward and downward directions Z within the guide slit 51. The stretching member 41 may slide in the upward and downward directions Z between the level supports 50 through the first bearing 421 and the second bearing 422. The upward and downward adjustment module 40 may slide in the upward and downward directions Z between the level supports 50 through the first bearing 421 and the second bearing 422. The guide slit 51 may guide the stretching member 41 to move in the upward and downward directions Z. The guide slit 51 may guide the upward and downward adjustment module 40 to move in the upward and downward directions Z. However, the function of the guide slit 51 is not limited to the above description.

Figure 19:
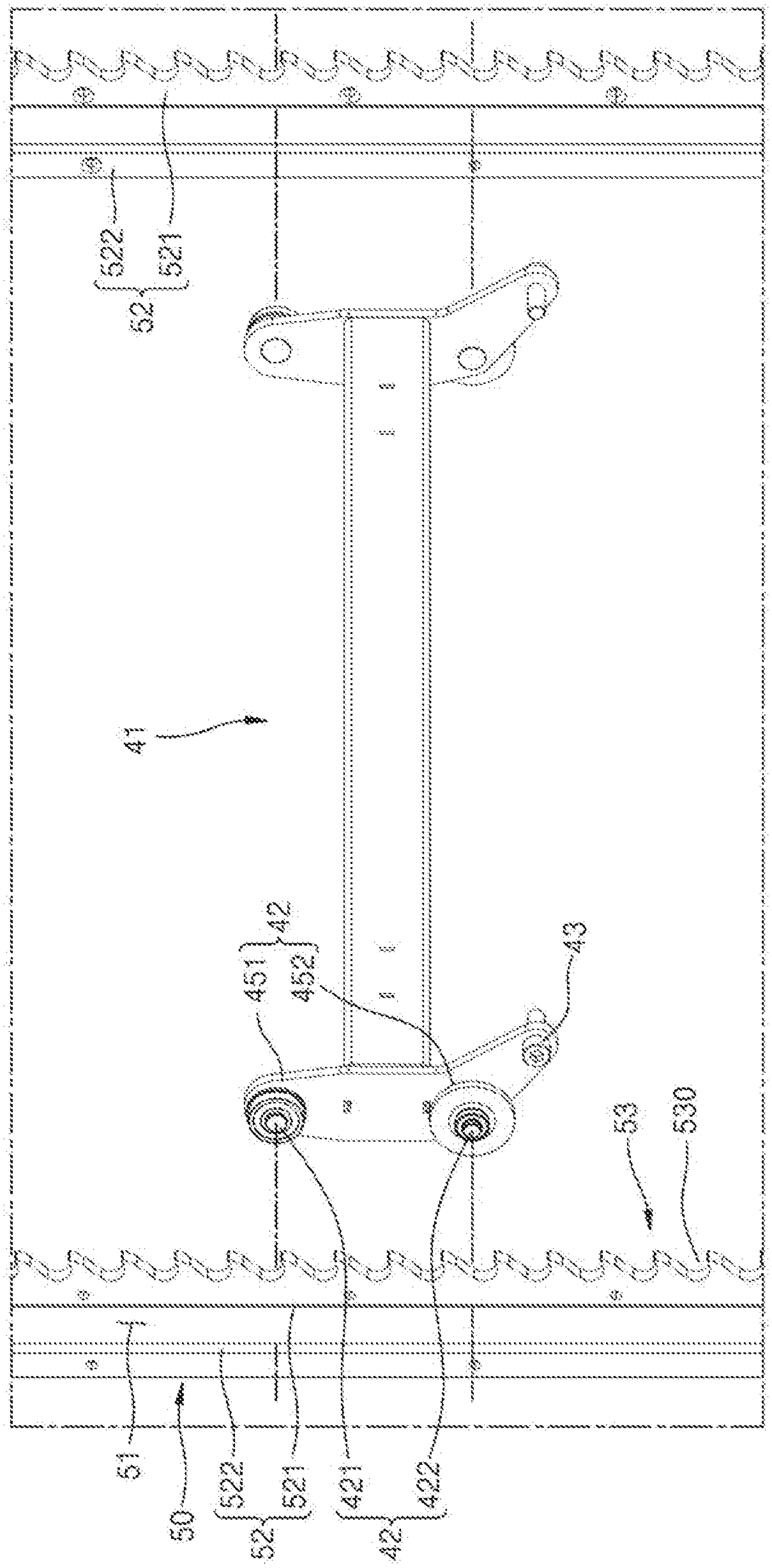
FIG. 19 is an exploded perspective diagram showing coupling between a stretching member and a guide slit, according to an embodiment.
Figure 20A:
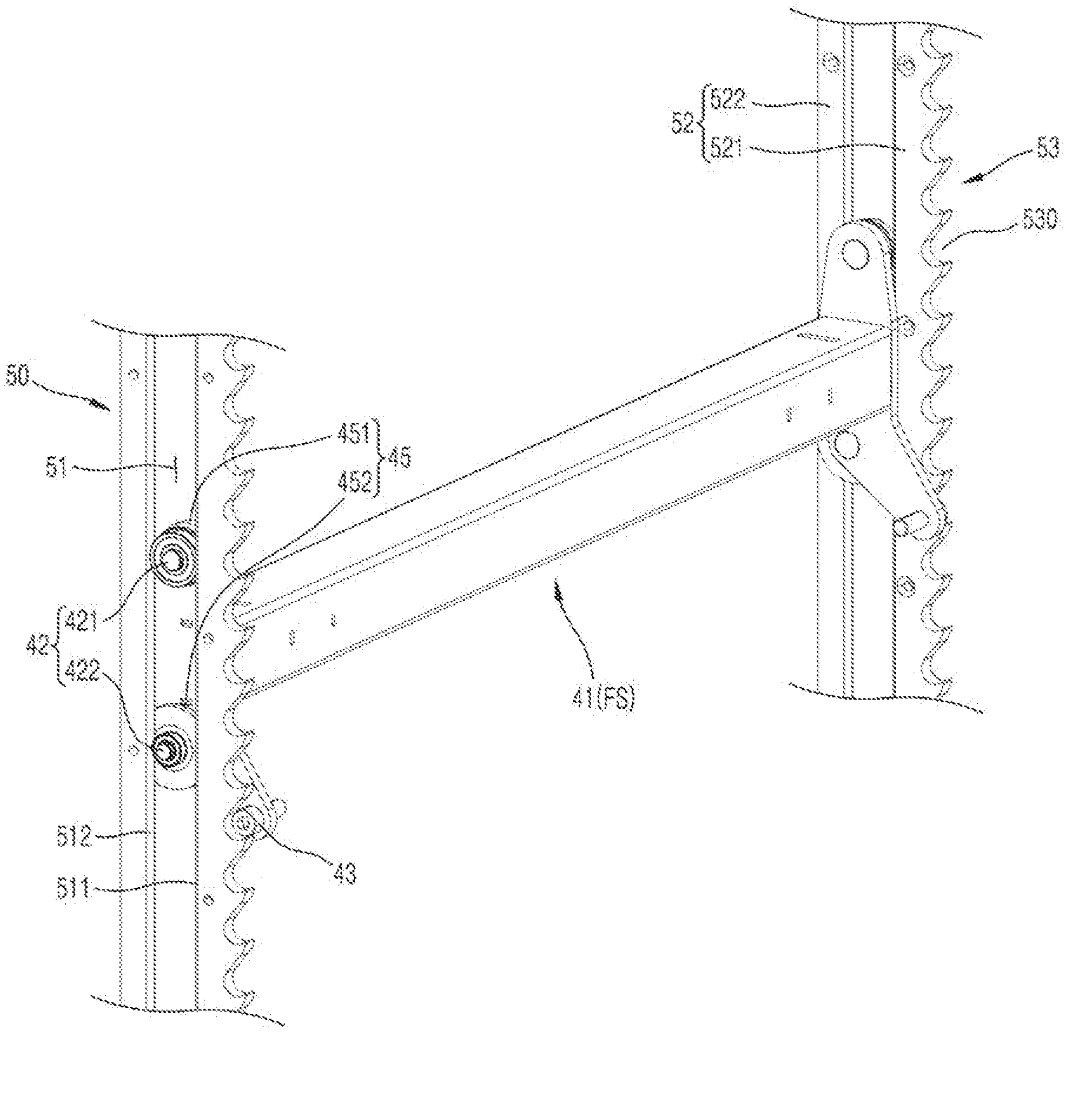
FIG. 20A is a side cross-sectional view for explaining a fixed state of a stretching member, according to an embodiment.
Figure 20B:
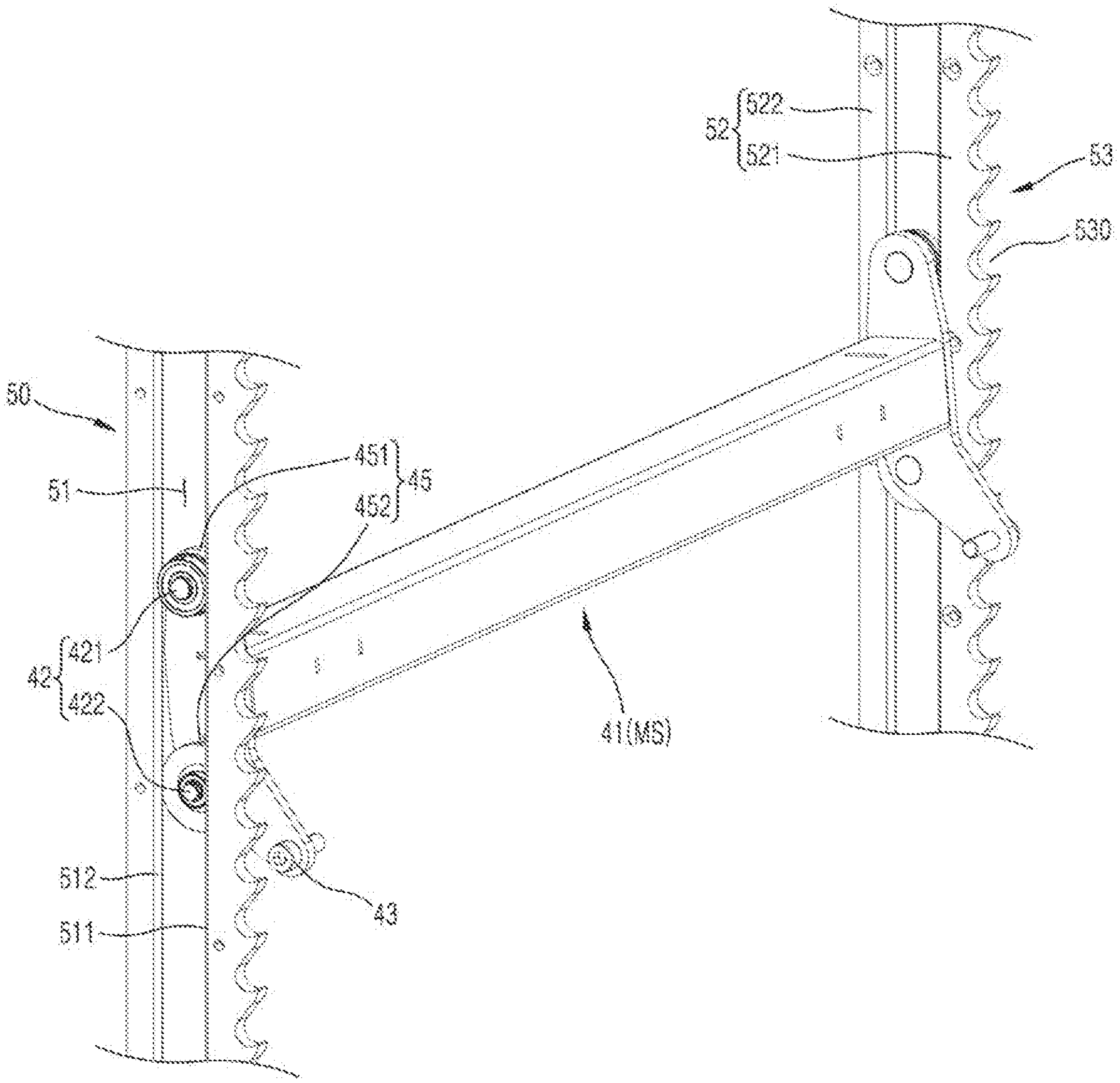
FIG. 20B is a side cross-sectional view for explaining a movable state of a stretching member, according to an embodiment.

FIG. 19 is an exploded perspective diagram showing coupling between the stretching member 41 and the guide slit 51, according to an embodiment. FIG. 20A is a side cross-sectional view for explaining the fixed state FS of the stretching member 41, according to an embodiment. FIG. 20B is a side cross-sectional view for explaining the movable state MS of the stretching member 41, according to an embodiment.

Referring to FIGS. 18A to 20B, the first bearing 421 and the second bearing 422 according to an embodiment may be inserted into the guide slit 51. The first bearing 421 and the second bearing 422 may be inserted into the level support 50 such that the upward and downward adjustment module 40 may slide in the upward and downward directions Z from the level support 50. When the first bearing 421 and the second bearing 422 are inserted into the guide slit 51, the stretching member 41 may be fixed between the level supports 50. When the first bearing 421 and the second bearing 422 are inserted into the guide slit 51, the upward and downward adjustment module 40 may be fixed between the level supports 50.

One of the stretching member 41 and the level support 50 according to an embodiment may include a locking protrusion 43 configured to fix the level of the upward and downward adjustment module 40. The other one of the stretching member 41 and the level support 50 may include a level adjustment groove 53 configured to support the locking protrusion 43. The stretching member 41 may include the locking protrusion 43. The level support 50 may include the level adjustment groove 53.

The level support 50 according to an embodiment may include a plurality of level adjustment grooves 53 arranged in the upward and downward directions Z. The stretching member 41 may include the locking protrusion 43 provided to be inserted into the level adjustment groove 53.

The locking protrusion 43 according to an embodiment may be supported in a locking manner by the level support 50. The locking protrusion 43 may be supported in a locking manner by the level adjustment groove 53. When the locking protrusion 43 is supported by the level support 50, the level of the stretching member 41 may be fixed. When the locking protrusion 43 is supported by the level support 50, the level of the upward and downward adjustment module 40 may be fixed. When the locking protrusion 43 is supported by the level support 50, the stretching member 41 may have the fixed state FS. When the locking protrusion 43 is supported by the level support 50, the upward and downward adjustment module 40 may have the fixed state FS. When the locking protrusion 43 is supported by the level support 50, the stretching member 41 may have the fixed state FS. The fixed state FS may be a state in which the level of the upward and downward adjustment module 40 is fixed.

The level adjustment groove 53 according to an embodiment may include a plurality of recesses 530 configured to accommodate the locking protrusion 43. The plurality of recesses 530 may accommodate the locking protrusion 43. The plurality of recesses 530 may support the locking protrusion 43. When the plurality of recesses 530 support the locking protrusion 43, the stretching member 41 may have the fixed state FS.

The level adjustment groove 53 according to an embodiment may be located in front of the guide slit 51. The plurality of recesses 530 may be located in front of the guide slit 51. The plurality of recesses 530 may each be inclined downward. When the plurality of recesses 530 are inclined downward, if the stretching member 41 is in the fixed state FS, the plurality of recesses 530 may stably support the locking protrusion 43. However, the arrangement and form of the plurality of recesses 530 is not limited to the above description. In the above description, although the arrangement relationship between the guide slit 51 and the level adjustment groove 53 is described on the assumption that the second bearing 422 is located below the first bearing 421, the arrangement relationship between the guide slit 51 and the level adjustment groove 53 may be determined according to the arrangement relationship between the first bearing 421 and the second bearing 422. In detail, the embodiment described above in which the second bearing 422 is located below the first bearing 421 may have a different arrangement relationship between the guide slit 51 and the level adjustment groove 53 from an embodiment in which the second bearing 422 is located above the first bearing 421. For example, when the second bearing 422 is located above the first bearing 421, the level adjustment groove 53 may be located behind the guide slit 51.

The guide slit 51 according to an embodiment may include a guide surface extending in the upward and downward directions Z. The guide surface may be a surface with which the level adjustment bearing 42 is in contact. The guide surface may be a surface with which the level adjustment bearing 42 is in contact while moving in the upward and downward directions Z within the guide slit 51. The guide surface may include a first guide surface 511 and a second guide surface 512. The first guide surface 511 and the second guide surface 512 may be located in parallel with each other in the upward and downward directions Z. The level adjustment bearing 42 may be located between the first guide surface 511 and the second guide surface 512. The level adjustment bearing 42 may move in the upward and downward directions Z between the first guide surface 511 and the second guide surface 512. The first guide surface 511 may be a surface adjacent to the level adjustment groove 53. The second guide surface 512 may be a surface facing the first guide surface 511.

When the upward and downward adjustment module 40 according to an embodiment has the fixed state FS, the first bearing 421 may be in contact with the first guide surface 511. When the upward and downward adjustment module 40 has the fixed state FS, the second bearing 422 may be in contact with the second guide surface 512. When the stretching member 41 has the fixed state FS, the first bearing 421 may be in contact with the first guide surface 511. When the stretching member 41 has the fixed state FS, the second bearing 422 may be in contact with the second guide surface 512. However, the relationship between the first bearing 421 and the second bearing 422, and the guide surface is not limited to the above description. For example, when the upward and downward adjustment module 40 is in the fixed state FS, the second bearing 422 may not be in contact with the second guide surface 512.

A distance between the first guide surface 511 and the second guide surface 512 of the guide surface according to an embodiment may be a width of the guide slit 51. The first guide surface 511 and the second guide surface 512 may define the width of the guide slit 51. However, the function and arrangement of the guide surface is not limited to the above description.

When the first bearing 421 moves in upward and downward directions within the guide slit 51, the first bearing 421 may be in contact with the second guide surface 512. When the first bearing 421 moves in upward and downward directions within the guide slit 51, the first bearing 421 may not be in contact with the first guide surface 511. When the first bearing 421 moves in upward and downward directions within the guide slit 51, the first bearing 421 may selectively be in contact with the first guide surface 511 or the second guide surface 512. When the first bearing 421 moves in upward and downward directions, if the first bearing 421 is selectively in contact with the first guide surface 511 or the second guide surface 512, friction may be prevented from being applied to the first bearing 421. When the first bearing 421 is selectively in contact with the first guide surface 511 or the second guide surface 512, friction may be prevented from being applied in an opposite direction to a rolling motion.

A diameter of the first bearing 421 according to an embodiment may be less than a width of the guide slit 51. The width of the guide slit 51 may be greater than the diameter of the first bearing 421. For example, the width of the guide slit 51 may be greater than the diameter of the first bearing 421 by 1 mm or more. For example, the width of the guide slit 51 may be greater than the diameter of the first bearing 421 by 0.5 mm or more.

When the width of the guide slit 51 is excessively greater than the diameter of the first bearing 421, the upward and downward adjustment module 40 may be inclined left and right in the movable state MS. In other words, when the width of the guide slit 51 is excessively greater than the diameter of the first bearing 421, the upward and downward adjustment module 40 may rotate in upward and downward directions as an axis. When the diameter of the guide slit 51 is excessively greater than the diameter of the first bearing 421, the upward and downward adjustment module 40 may be prevented from being inclined left and right in the movable state MS. For example, a difference between the width of the guide slit 51 and the diameter of the first bearing 421 may be about 1 mm to about 5 mm. For example, a difference between the width of the guide slit 51 and the diameter of the first bearing 421 may be about 0.5 mm to about 2 mm. However, the above description of the relationship between the width of the guide slit 51 and the diameter of the first bearing 421 is merely exemplary and is not limited thereto.

The diameter of the second bearing 422 according to an embodiment may be less than the width of the guide slit 51. A difference between the diameter of the second bearing 422 and the width of the guide slit 51 may be greater than a difference between the diameter of the first bearing 421 and the width of the guide slit 51.

The first bearing 421 of the level adjustment bearing 42 according to an embodiment may be located above the second bearing 422. The diameter of the first bearing 421 may be greater than the diameter of the second bearing 422. The diameter of the second bearing 422 may be less than the diameter of the first bearing 421. However, the size of the level adjustment bearing 42 and the guide slit 51 is not limited to the above description.

Axes of the first bearing 421 and the second bearing 422 according to an embodiment may be in parallel with each other. Axes of the first bearing 421, the second bearing 422, and the stretching member 41 may be in parallel with each other. The stretching member 41 may rotate around the first bearing 421. The second bearing 422 may rotate around the first bearing 421. Rotation of the second bearing 422 around the first bearing 421 may mean rotation of the second bearing 422 around the axis of the first bearing 421.

The first bearing 421 according to an embodiment may provide an axis around which the upward and downward adjustment module 40 is rotatable. The first bearing 421 may provide an axis around which the stretching member 41 is rotatable. The second bearing 422 may rotate around the first bearing 421 within the second bearing 422. The second bearing 422 may rotate around the first bearing 421 within the guide slit 51.

The positions of the first bearing 421, the second bearing 422, and the locking protrusion 43 may be fixed at both ends of the third stretching member. The positions of the first bearing 421, the second bearing 422, and the locking protrusion 43 may be fixed at both ends of the stretching member 41. As the upward and downward adjustment module 40 rotates around the first bearing 421, the locking protrusion 43 may rotate around the first bearing 421. As the stretching member 41 rotates around the first bearing 421, the locking protrusion 43 may rotate around the first bearing 421.

The locking protrusion 43 according to an embodiment may rotate around the first bearing 421. When the locking protrusion 43 rotates around the first bearing 421, the locking protrusion 43 may be separated from the level adjustment groove 53. Separation of the locking protrusion 43 from the level adjustment groove 53 may mean that the locking protrusion 43 is not supported by the level adjustment groove 53. Separation of the locking protrusion 43 from the level adjustment groove 53 may mean that the upward and downward adjustment module 40 is converted from the fixed state FS to the movable state MS.

When the upward and downward adjustment module 40 according to an embodiment has the fixed state FS, the center of gravity of the upward and downward adjustment module 40 may be located in front of the stretching member 41. When the upward and downward adjustment module 40 rotates around the first bearing 421, the center of gravity of the upward and downward adjustment module 40 may move. When the upward and downward adjustment module 40 rotates around the first bearing 421, the center of gravity of the upward and downward adjustment module 40 may move backward. When the level of the upward and downward adjustment module 40 is adjusted, if the center of gravity of the upward and downward adjustment module 40 moves excessively, a user may experience inconvenience. When the upward and downward adjustment module 40 rotates around the first bearing 421, the center of gravity of the upward and downward adjustment module 40 may be prevented from moving excessively, thereby preventing user inconvenience. When the upward and downward adjustment module 40 rotates around the first bearing 421, a limit in which the upward and downward adjustment module 40 is rotatable may be defined to prevent the center of gravity of the upward and downward adjustment module 40 from excessively moving, thereby preventing user inconvenience.

The second bearing 422 according to an embodiment may define a limit of rotation when the upward and downward adjustment module 40 rotates around the first bearing 421. The second bearing 422 according to an embodiment may define a limit of rotation when the stretching member 41 rotates around the first bearing 421.

When the upward and downward adjustment module 40 according to an embodiment rotates around the first bearing 421 in the fixed state FS and is converted to movable state MS, the upward and downward adjustment module 40 may rotate until the second bearing 422 is in contact with the first guide surface 511. When the stretching member 41 rotates around the first bearing 421 in the fixed state FS and is converted to the movable state MS, the second bearing 422 may rotate until the second bearing 422 is in contact with the first guide surface 511. When the second bearing 422 is in contact with the first guide surface 511, the upward and downward adjustment module 40 may no longer rotate around the first bearing 421. When the second bearing 422 is in contact with the first guide surface 511, the stretching member 41 may no longer rotate around the first bearing 421. However, the function of the second bearing 422 is not limited to the above description.

When the upward and downward adjustment module 40 according to an embodiment has the movable state MS, the first bearing 421 may be in contact with the second guide surface 512. When the upward and downward adjustment module 40 has the movable state MS, the second bearing 422 may be in contact with the first guide surface 511. When the stretching member 41 has the fixed state FS, the first bearing 421 may be in contact with the second guide surface 512. When the stretching member 41 has the fixed state FS, the second bearing 422 may be in contact with the first guide surface 511. However, the relationship between the first bearing 421 and the second bearing 422, and the guide surface is not limited to the above description.

The second bearing 422 according to an embodiment may define a movable range of rotation when the upward and downward adjustment module 40 rotates around the first bearing 421. The second bearing 422 may define a movable range of rotation when the stretching member 41 rotates around the first bearing 421.

Referring back to FIGS. 18A and 18B, there may be a virtual baseline X1 in an extension direction of the guide slit 51 according to an embodiment. The baseline X1 may be in parallel with the extension direction of the guide slit 51. The baseline X1 may be in parallel with an extension direction of the level support 50. The baseline X1 may be in parallel with a direction in which the level of the upward and downward adjustment module 40 is adjusted. The baseline X1 may be in parallel to upward and downward directions. The baseline X1 may pass through the central axis of the first bearing 421 but is not limited thereto.

There may be a virtual connection line X2 connecting the central axes of the first bearing 421 and the second bearing 422 according to an embodiment. The connection line X2 may be a line connecting the central axes of the first bearing 421 and the second bearing 422. The connection line X2 may be a virtual line distinct from the baseline X1. However, the relationship between the connection line X2 and the baseline X1 is not limited to the above description.

The connection line X2 according to an embodiment may have a certain angle with respect to the baseline X1. The certain angle of the connection line X2 with respect to the baseline X1 may be changed as the upward and downward adjustment module 40 rotates. The certain angle of the connection line X2 with respect to the baseline X1 may be changed as the stretching member 41 rotates.

Based on a right side view of the upward and downward adjustment module 40, the connection line X2 may have positive (+) and negative (−) angles with respect to the baseline X1. A case in which the connection line X2 has a positive (+) angle with respect to the baseline X1 may be a case in which the connection line X2 rotates clockwise with respect to the baseline X1. A case in which the connection line X2 has a negative (−) angle with respect to the baseline X1 may be a case in which the connection line X2 rotates counterclockwise with respect to the baseline X1. However, an angle between the connection line X2 and the baseline X1 is not limited to the above description.

A case in which the connection line X2 has the largest positive (+) angle with respect to the baseline X1 may be a case in which the locking protrusion 43 is accommodated in the level adjustment groove 53. A case in which the connection line X2 has the largest positive (+) angle with respect to the baseline X1 may be a case in which the upward and downward adjustment module 40 is in the fixed state FS. A case in which the connection line X2 has the smallest negative (−) angle with respect to the baseline X1 may be a case in which the second bearing 422 is in contact with the first guide surface 511. A case in which the connection line X2 has the smallest negative (−) angle with respect to the baseline X1 may be a case in which the upward and downward adjustment module 40 is in the movable state MS.

The movable range defined by the second bearing 422 may be defined as the second bearing 422 rotates around the first bearing 421 as an axis. The movable range defined by the second bearing 422 may be a value obtained by subtracting the smallest negative (−) angle from the largest positive (+) angle of the connection line X2 with respect to the baseline X1. The movable range defined by the second bearing 422 may be an angle at which the upward and downward adjustment module 40 is rotatable when the upward and downward adjustment module 40 is converted from the fixed state FS to the movable range. The movable range defined by the second bearing 422 may be an angle at which the stretching member 41 is rotatable when the stretching member 41 is converted from the fixed state FS to the movable range. The movable range defined by the second bearing 422 may be about 1° to about 15°. The movable range defined by the second bearing 422 may be about 3° to about 10°. The movable range defined by the second bearing 422 may be a movable range in which the upward and downward adjustment module 40 is rotatable. However, the movable range defined by the second bearing 422 is not limited to the above description.

The movable range of the upward and downward adjustment module 40 may be determined within a range in which the second bearing 422 is not in contact with the second guide surface 512. In other words, the movable range of the second bearing 422 may be determined within a range in which the second bearing 422 is not in contact with the second guide surface 512. The second bearing 422 may not be in contact with the second guide surface 512 when the upward and downward adjustment module 40 is in the fixed state FS. When the second bearing 422 is not in contact with the second guide surface 512, if the upward and downward adjustment module 40 is in the fixed state FS, a force may be prevented from being excessively applied to the second bearing 422. However, the arrangement relationship and movable range of the second bearing 422 and the second guide surface 512 is not limited to the above description.

Referring back to FIGS. 15A to 20B, the upward and downward adjustment module 40 according to an embodiment may receive a force to rotate forward by a self load thereof. Forward rotation may be clockwise rotation based on a right side view of the stretching apparatus 1. The upward and downward adjustment module 40 may receive the force to rotate forward around the first bearing 421. Forward rotation of the upward and downward adjustment module 40 may be a case in which the locking protrusion 43 is accommodated in the level adjustment groove 53. Forward rotation of the upward and downward adjustment module 40 may be a case in which the first bearing 421 is in contact with the first guide surface 511. Forward rotation of the upward and downward adjustment module 40 may be a case in which the locking protrusion 43 is accommodated in the level adjustment groove 53. However, the rotation of the upward and downward adjustment module 40 and the arrangement relationship of the locking protrusion 43 are not limited to the above description.

The level adjustment groove 53 may support the upward and downward adjustment module 40 by supporting the locking protrusion 43. The locking protrusion 43 may support the upward and downward adjustment module 40 through the level adjustment groove 53. When an external force is not applied to the upward and downward adjustment module 40, the upward and downward adjustment module 40 may have the fixed state FS. The level support 50 may support the upward and downward adjustment module 40.

The user may convert the upward and downward adjustment module 40 from the fixed state FS to the movable state MS. The user may apply a rotation force backward to the upward and downward adjustment module 40. The user may apply a force to the upward and downward adjustment module 40 such that the upward and downward adjustment module 40 receives the force to rotate around the first bearing 421. The user may rotate the upward and downward adjustment module 40 backward. The user may rotate the upward and downward adjustment module 40 backward around the first bearing 421. The user may apply a force upward to the front end of the upward and downward adjustment module 40 to rotate the upward and downward adjustment module 40 backward. The user may apply a force upward to the front end of the base frame 400 of the upward and downward adjustment module 40 to rotate the upward and downward adjustment module 40 backward. The user may apply a force backward to the third handle 47 of the upward and downward adjustment module 40 to rotate the upward and downward adjustment module 40 backward. Backward rotation of the upward and downward adjustment module 40 may be a case in which the locking protrusion 43 is separated from the level adjustment groove 53. Backward rotation of the upward and downward adjustment module 40 may be a case in which the first bearing 421 is in contact with the second guide surface 512. Forward rotation of the upward and downward adjustment module 40 may be a case in which the second bearing 422 is in contact with the first guide surface 511. Backward rotation of the upward and downward adjustment module 40 may be a case in which the upward and downward adjustment module 40 is converted from the fixed state FS to the movable state MS. However, a method of converting the upward and downward adjustment module 40 from the fixed state FS to the movable state MS is not limited to the above description.

When the upward and downward adjustment module 40 is in the movable state MS, the user may adjust the level of the upward and downward adjustment module 40. The user may move the level adjustment bearing 42 of the upward and downward adjustment module 40 in the upward and downward directions Z on the level support 50 to adjust the level of the upward and downward adjustment module 40. The user may move the first bearing 421 and the second bearing 422 of the upward and downward adjustment module 40 in the upward and downward directions Z on the guide slit 51 to adjust the level of the upward and downward adjustment module 40. Adjustment of the level of the upward and downward adjustment module 40 may be a case in which the upward and downward adjustment module 40 moves to an upper side or a lower side of the pair of first support frames 111. However, a method of adjusting the level of the upward and downward adjustment module 40 is not limited to the above description.

The user may convert the upward and downward adjustment module 40 from the movable state MS to the fixed state FS. The user may fix the level of the upward and downward adjustment module 40. The user may fix the level of the upward and downward adjustment module 40 by rotating the upward and downward adjustment module 40 forward. External force applied to the upward and downward adjustment module 40 may have to be removed to convert the upward and downward adjustment module 40 from the movable state MS to the fixed state FS. The user may fix the level of the upward and downward adjustment module 40 by removing the force applied to the upward and downward adjustment module 40. The user may remove the force upward to the front end of the upward and downward adjustment module 40 to convert the upward and downward adjustment module 40 from the movable state MS to the fixed state FS. The user may remove the force applied backward to the third handle 47 of the upward and downward adjustment module 40 to convert the upward and downward adjustment module 40 from the movable state MS to the fixed state FS. When the user removes the force applied to the upward and downward adjustment module 40, the upward and downward adjustment module 40 may receive a rotation force to rotate forward. The upward and downward adjustment module 40 may rotate forward by a self load thereof. When the upward and downward adjustment module 40 rotates forward, the locking protrusion 43 may be inserted into the level adjustment groove 53. When the upward and downward adjustment module 40 rotates forward, the level adjustment groove 53 may accommodate the locking protrusion 43. When the upward and downward adjustment module 40 rotates forward, the level adjustment groove 53 may support the locking protrusion 43. When the level adjustment groove 53 supports the locking protrusion 43, the upward and downward adjustment module 40 may have the fixed state FS. The level adjustment groove 53 may have the plurality of recesses 530. The user may adjust and fix the level of the upward and downward adjustment module 40 by selectively inserting the locking protrusion 43 into the plurality of recesses 530. However, a method of converting the upward and downward adjustment module 40 from the movable state MS to the fixed state FS is not limited to the above description.

When the level of the upward and downward adjustment module 40 is adjusted, the level adjustment bearing 42 may perform a rolling motion within the guide slit 51 of the level support 50. The first bearing 421 and the second bearing 422 may be in contact with surfaces of the first guide surface 511 and second guide surface 512 when the level of the upward and downward adjustment module 40 is adjusted. In this case, when the level adjustment bearing 42 is separated from the guide slit 51, the upward and downward adjustment module 40 may be separated from the level support 50. When the upward and downward adjustment module 40 is separated from the level support 50, the level of the upward and downward adjustment module 40 may not be fixed. When the level adjustment bearing 42 is separated from the guide slit 51, the upward and downward adjustment module 40 may be inclined left and right. When the upward and downward adjustment module 40 is inclined left and right, the user may experience inconvenience while adjusting the level of the upward and downward adjustment module 40. However, movement of the level adjustment bearing 42 and the arrangement relationship of the upward and downward adjustment module 40 is not limited to the above description.

Hereinafter, an anti-separation member 45 preventing the level adjustment bearing 42 from being separated from the guide slit 51 will be described.

Figure 21:
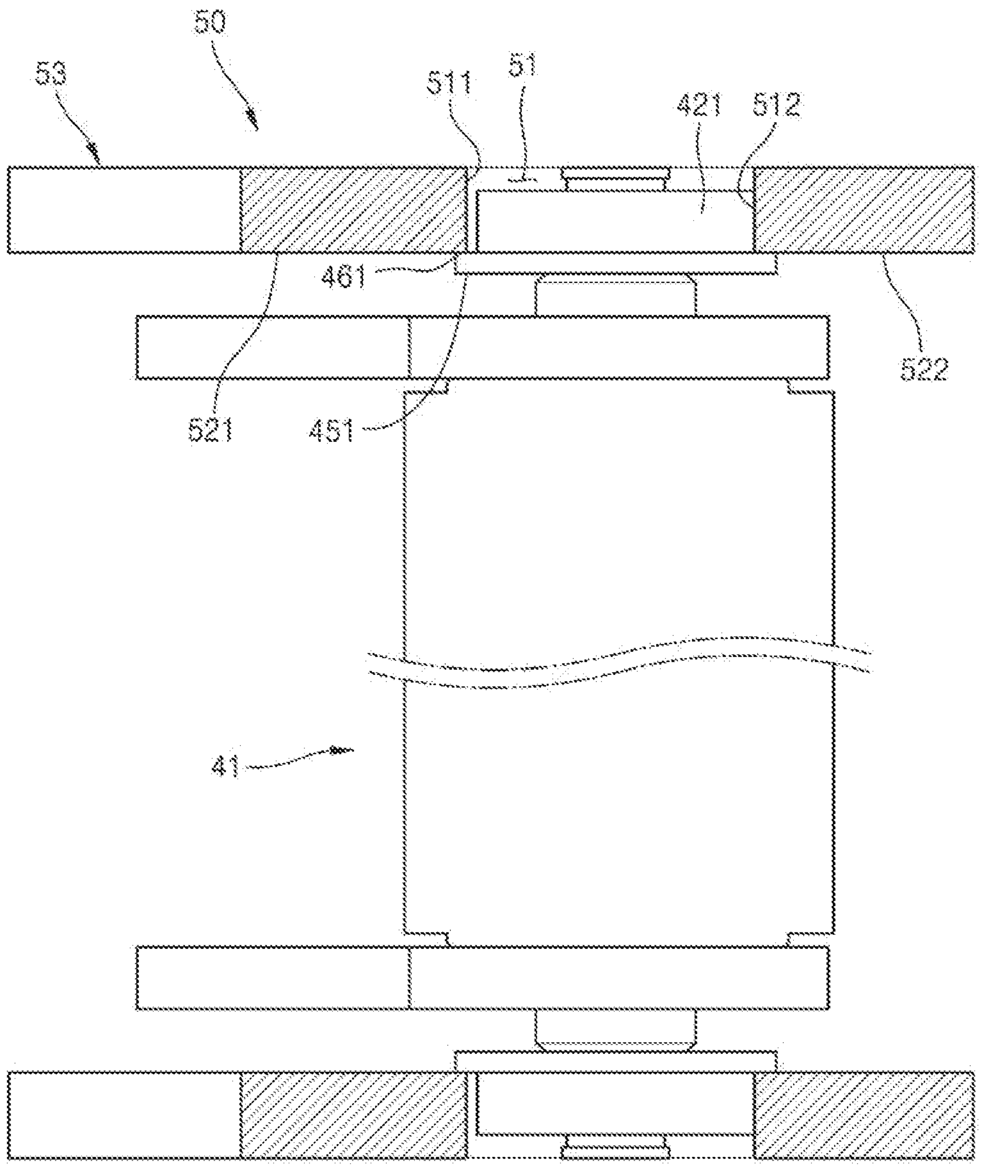
FIG. 21 is a conceptual diagram of a cross section of a stretching member and a level support to explain a first flange of a first bearing, according to an embodiment.
Figure 22:
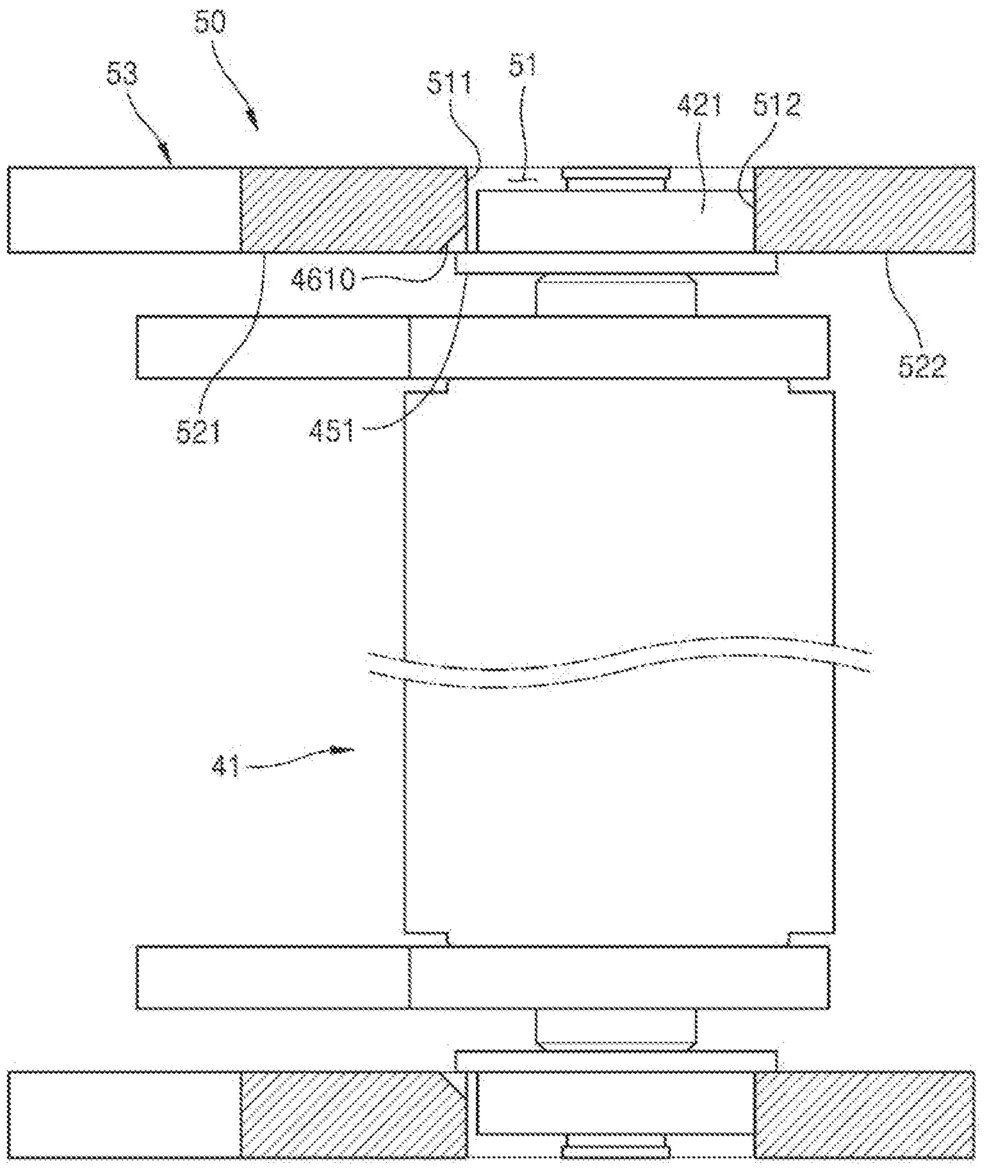
FIG. 22 is a conceptual diagram of a cross section of a stretching member and a level support to explain a first inclination surface of a first flange, according to an embodiment.
Figure 23:
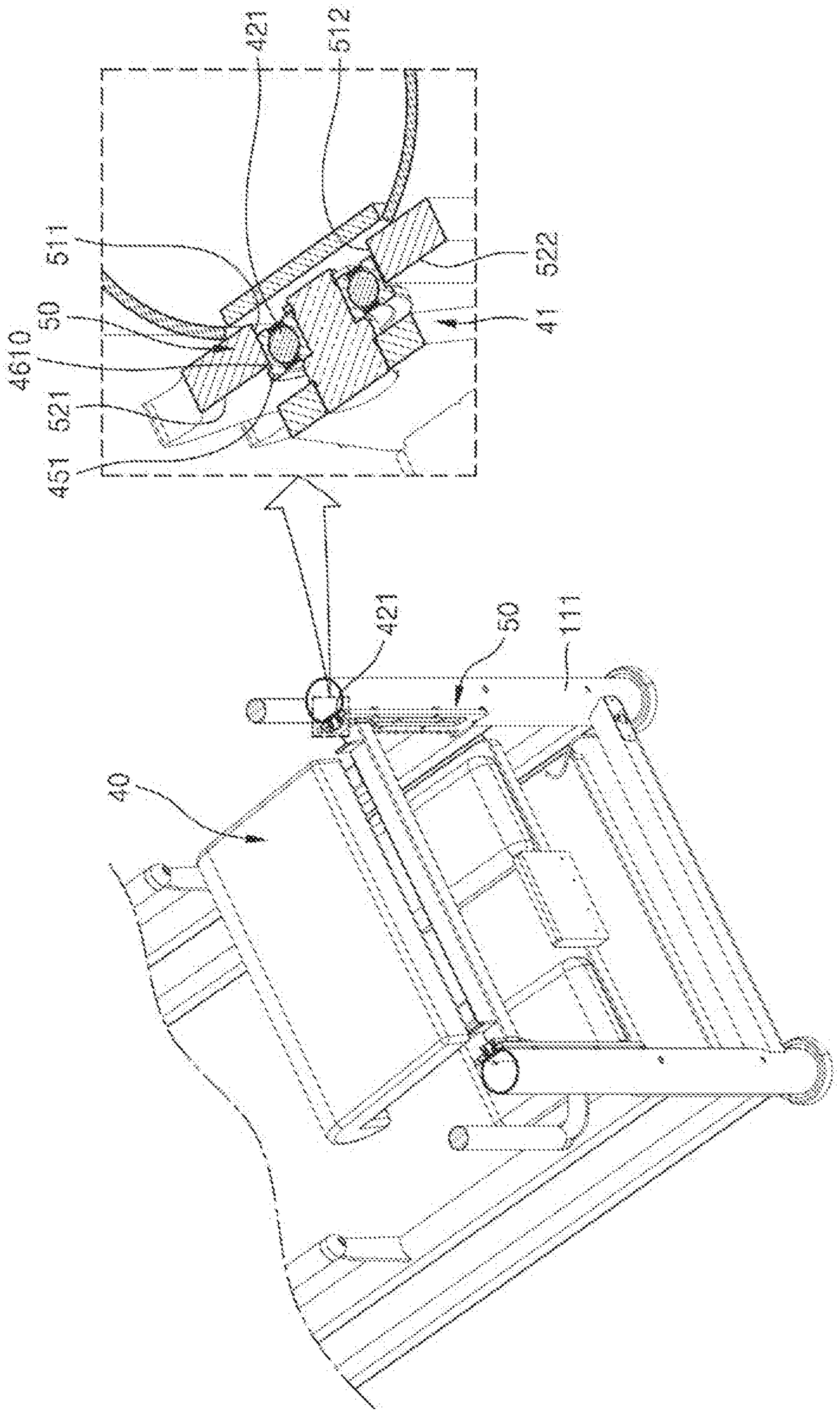
FIG. 23 is an enlarged cross-sectional perspective view of a first bearing inserted into a guide slit in a stretching apparatus according to an embodiment.

FIG. 21 is a conceptual diagram of a cross section of the stretching member 41 and the level support 50 to explain a first flange 451 of the first bearing 421, according to an embodiment. FIG. 22 is a conceptual diagram of a cross section of the stretching member 41 and the level support 50 to explain a first inclination surface 4610 of the first flange 451, according to an embodiment. FIG. 23 is an enlarged cross-sectional perspective view of the first bearing 421 inserted into the guide slit 51 in the stretching apparatus 1 according to an embodiment.

Referring to FIGS. 20B to 23, the level adjustment bearing 42 according to an embodiment may include the anti-separation member 45. The anti-separation member 45 may prevent the level adjustment bearing 42 from being separated from the level support 50. The anti-separation member 45 may prevent the level adjustment bearing 42 from being separated from the guide slit 51. The anti-separation member 45 may prevent the upward and downward adjustment module 40 from being inclined left and right. However, the function of the anti-separation member 45 is not limited to the above description.

The anti-separation member 45 according to an embodiment may include the first flange 451. The first bearing 421 may include the first flange 451. The first flange 451 may prevent the first bearing 421 from being separated from the level support 50, and the first flange 451 may prevent the first bearing 421 from being separated from the guide slit 51. The first flange 451 may prevent the upward and downward adjustment module 40 from being inclined left and right. However, the function of the first flange 451 is not limited to the above description.

The first flange 451 may be provided at one side of the first bearing 421 according to an embodiment. The first flange 451 may be located within the first bearing 421. An inner side of the first bearing 421 may be a lateral side of the first bearing 421, which is adjacent to the stretching member 41. The size of the first flange 451 may be greater than an interval between the first guide surface 511 and the second guide surface 512 of the guide slit 51. The size of the first flange 451 may be greater than the width of the guide slit 51. The size of the first flange 451 may be a diameter of the first flange 451. When the size of the first flange 451 is greater than the width of the guide slit 51, the first bearing 421 may be prevented from being separated from the guide slit 51. The first flange 451 may have a diameter greater than the diameter of the first bearing 421. The diameter of the first flange 451 may be about 100% to about 130% of the diameter of the first bearing 421. The diameter of the first flange 451 may be about 110% to about 120% of the diameter of the first bearing 421. The first flange 451 may prevent the first bearing 421 from being separated from the guide slit 51 when the upward and downward adjustment module 40 is in the movable state MS. However, the form and function of the first flange 451 is not limited to the above description.

The level support 50 according to an embodiment may include a contact surface 52 located to face the upward and downward adjustment module 40. The contact surface 52 may be in contact with at least a portion of the first flange 451. The first flange 451 may be in contact with the contact surface 52 of the level support 50. The contact surface 52 of the level support 50 may include a first contact surface 521 connected to the first guide surface 511 and a second contact surface 522 connected to the second guide surface 512.

When the upward and downward adjustment module 40 is in the movable state MS, the first bearing 421 may be in contact with the second guide surface 512. When the level of the upward and downward adjustment module 40 is adjusted, the first bearing 421 may perform a rolling motion in a state in contact with the second guide surface 512.

When the upward and downward adjustment module 40 according to an embodiment is in the movable state MS, the first flange 451 may move with the first bearing 421 within the guide slit 51. The first flange 451 may perform a rolling motion with the first bearing 421. When the first bearing 421 performs a rolling motion while being in contact with the second guide surface 512, the first flange 451 may be in contact with the second contact surface 522 connected to the second guide surface 512. However, the motion of the first flange 451 is not limited to the above description. For example, the first flange 451 may not perform a rolling motion when the upward and downward adjustment module 40 is in the movable state MS.

When a diameter of the first flange 451 is greater than a distance between the first guide surface 511 and the second guide surface 512, the first flange 451 may be in contact with the second contact surface 522 and simultaneously may be in contact with the first contact surface 521 connected to the first guide surface 511. However, a contact relationship between the first flange 451 and the contact surface 52 is not limited to the above description.

When the first flange 451 is in contact with the first contact surface 521 and the second contact surface 522 at the same time during the rolling motion, friction may be applied to the first flange 451. When the first flange 451 according to an embodiment is in contact with the first contact surface 521 and the second contact surface 522 at the same time during the rolling motion, friction interfering with the rolling motion of the first flange 451 may be applied to the first flange 451. The first contact surface 521 may apply friction that interferes with the rolling motion of the first flange 451. When friction is applied to the first flange 451, the user may experience inconvenience while adjusting the level of the upward and downward adjustment module 40. However, the force applied to the first flange 451 by the first contact surface 521 is not limited to the above description.

The level support 50 according to an embodiment may include the first inclination surface 4610 between the first contact surface 521 and a first guide surface. The first inclination surface 4610 may prevent the first flange 451 from being in contact with the first contact surface 521 when the upward and downward adjustment module 40 is in the movable state MS. The first inclination surface 4610 may prevent the first flange 451 from being in contact with the first contact surface 521 even if the first flange 451 is in contact with the second contact surface 522. When there is the configuration of the first inclination surface 4610, the area of the first flange 451, which is in contact with the first contact surface 521, may not be large. When there is the configuration of the first inclination surface 4610, the first flange 451 may not be in contact with the first contact surface 521. When the first flange 451 performs a rolling motion while being in contact with the first contact surface 521, if the first flange 451 is not in contact with the second contact surface 522, friction applied to the first flange 451 may be small. When friction applied to the first flange 451 is small, the user may easily adjust the level of the upward and downward adjustment module 40. The first inclination surface 4610 may have a second inclination surface 4620 between the first contact surface 521 and the first guide surface. The first inclination surface 4610 may have a curved shape between the first contact surface 521 and the first guide surface. However, the form and function of the first inclination surface 4610 is not limited to the above description.

Figure 24:
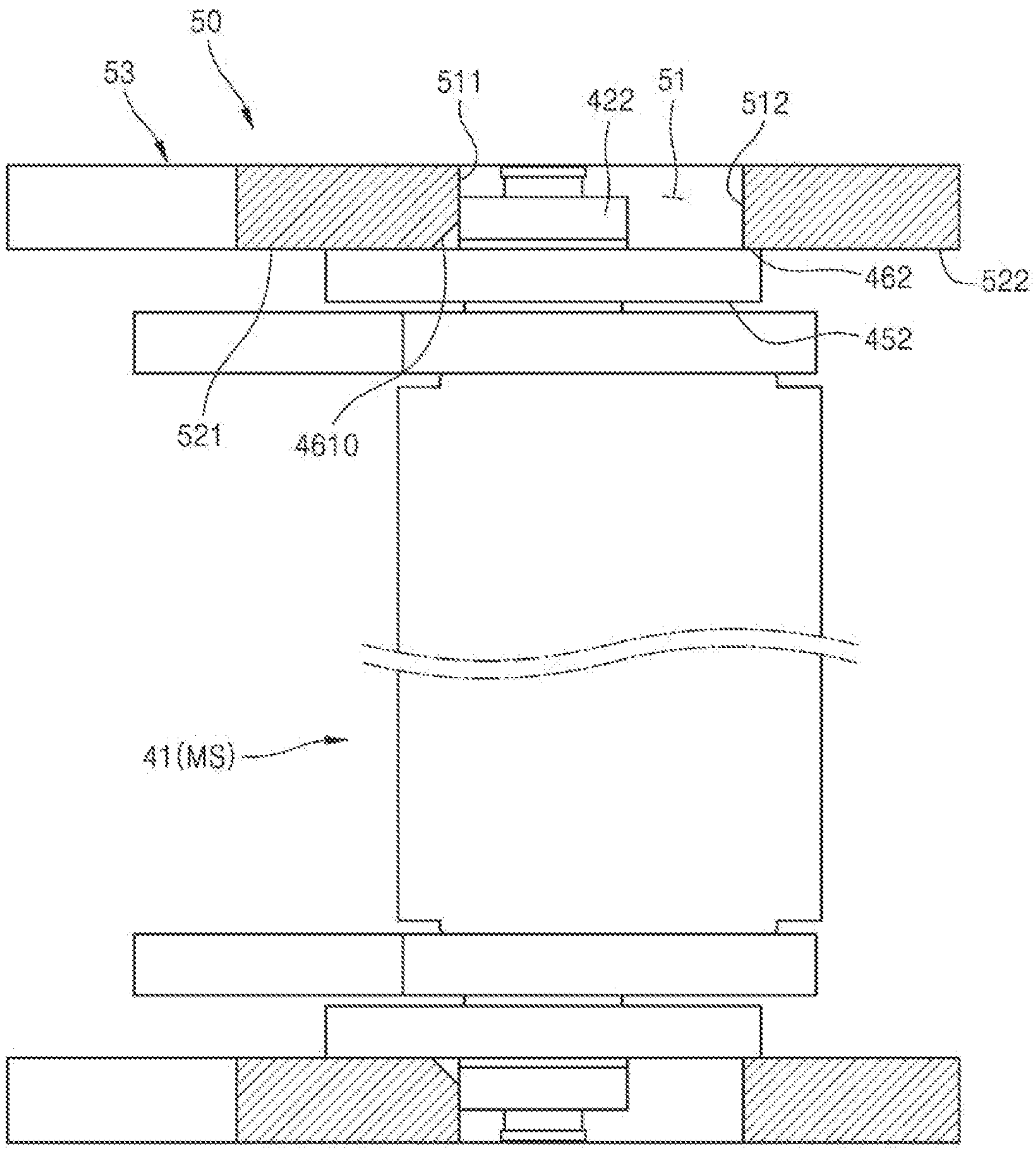
FIG. 24 is a conceptual diagram of a cross section of a stretching member and a level support to explain a second flange of a second bearing, according to an embodiment.
Figure 25:
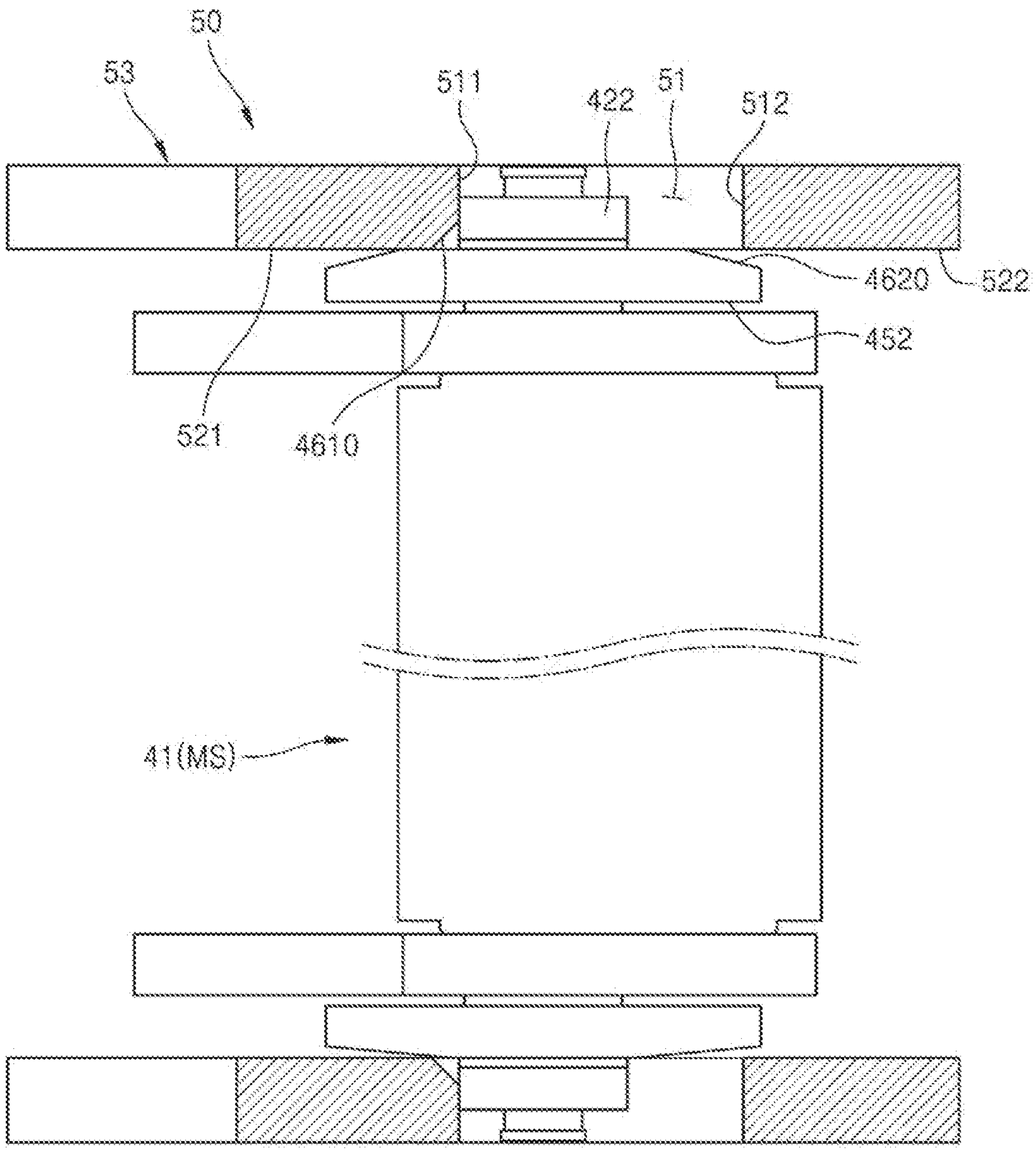
FIG. 25 is a conceptual diagram of a cross section of a stretching member and a level support to explain a second inclination surface of a second flange, according to an embodiment.
Figure 26:
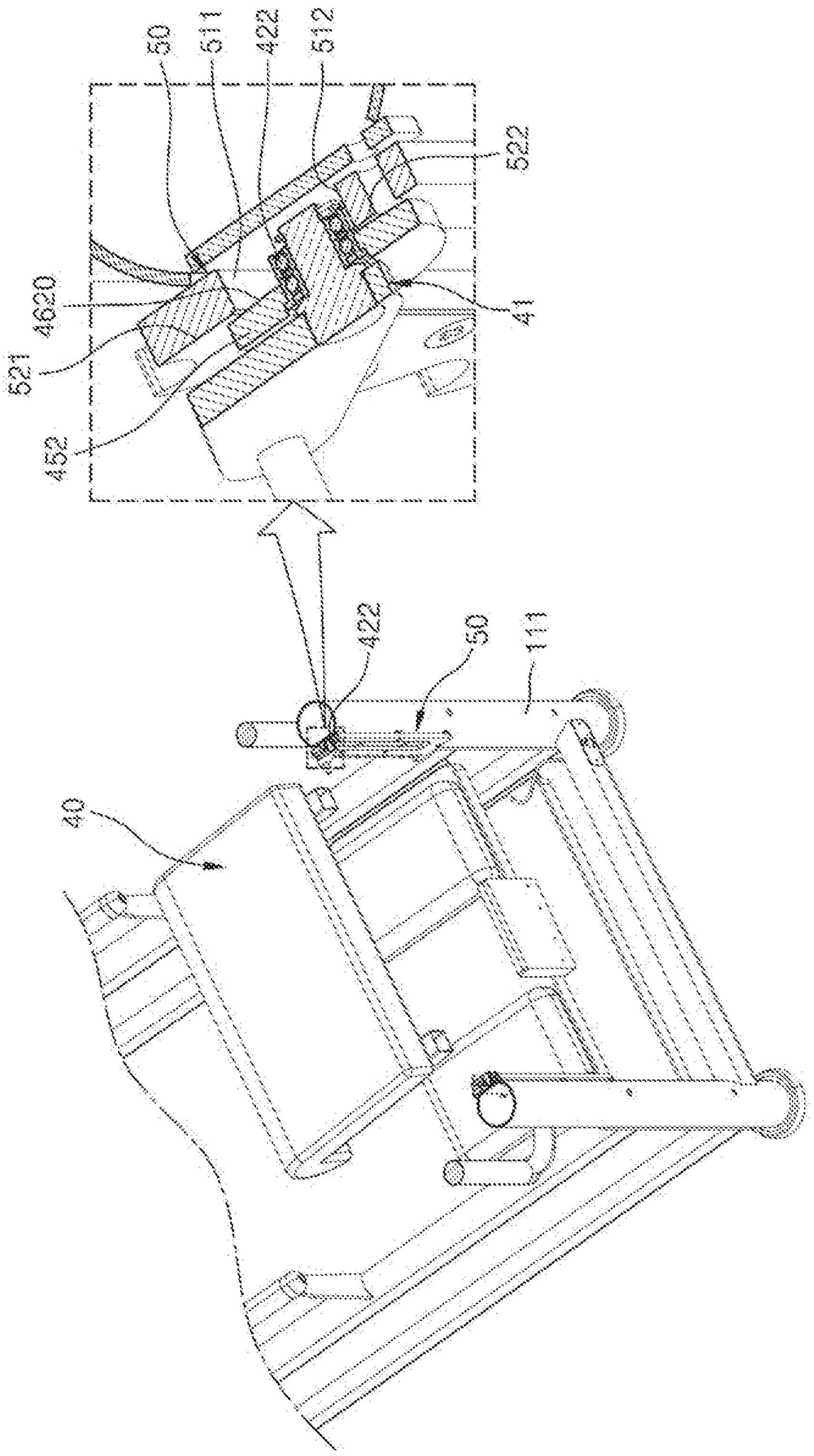
FIG. 26 is an enlarged cross-sectional perspective view of a second bearing inserted into a guide slit in a stretching apparatus according to an embodiment.

FIG. 24 is a conceptual diagram of a cross section of the stretching member 41 and the level support 50 to explain a second flange 452 of the second bearing 422, according to an embodiment. FIG. 25 is a conceptual diagram of a cross section of the stretching member 41 and the level support 50 to explain the second inclination surface 4620 of the second flange 452, according to an embodiment. FIG. 26 is an enlarged cross-sectional perspective view of the second bearing 422 inserted into the guide slit 51 in the stretching apparatus 1 according to an embodiment.

Referring to FIGS. 20, and 24 to 26, the second bearing 422 as an example may include the second flange 452. The second flange 452 may prevent the second bearing 422 from being separated from the level support 50, and the second bearing 422 may include the second flange 452. The second flange 452 may prevent the second bearing 422 from being separated from the guide slit 51. The second flange 452 may prevent the upward and downward adjustment module 40 from being inclined left and right. However, the function of the second flange 452 is not limited to the above description.

The second flange 452 may be provided at one side of the second bearing 422 according to an embodiment. The second flange 452 may be located within the second bearing 422. An inner side of the second bearing 422 may be a lateral side of the second bearing 422, which is adjacent to the stretching member 41. The size of the second flange 452 may be greater than an interval between the first guide surface 511 and the second guide surface 512 of the guide slit 51. The second flange 452 may a diameter greater than that of the first flange 451. The size of the second flange 452 may be greater than the width of the guide slit 51. The size of the second flange 452 may be a diameter of the second flange 452. When the size of the second flange 452 is greater than the width of the guide slit 51, the second bearing 422 may be prevented from being separated from the guide slit 51. The second flange 452 may have a diameter greater than the diameter of the second bearing 422. A diameter difference between the second flange 452 and the second bearing 422 may be about 100% to about 600% of the diameter of the second bearing 422. A diameter difference between the second flange 452 and the second bearing 422 may be about 120% to about 400% of the diameter of the second bearing 422. The diameter of the second flange 452 may be the diameter of the first flange 451. The second flange 452 may prevent the second bearing 422 from being separated from the guide slit 51 when the upward and downward adjustment module 40 is in the movable state MS. However, the form and function of the second flange 452 is not limited to the above description.

When the upward and downward adjustment module 40 is in the movable state MS, the second flange 452 may move with the second bearing 422 within the guide slit 51. When the second flange 452 is in contact with the contact surface 52 of the level support 50, friction may be applied to the second flange 452 when the level of the upward and downward adjustment module 40 is adjusted. When the level of the upward and downward adjustment module 40 is adjusted, if the second flange 452 is in contact with the contact surface 52 of the level support 50, friction may be applied to the second flange 452. When friction is applied to the second flange 452, the user may experience inconvenience while adjusting the level of the upward and downward adjustment module 40. However, the force applied to the second flange 452 is not limited to the above description.

The second flange 452 according to an embodiment may have the second inclination surface 4620 in a direction away from the guide slit 51. The second inclination surface 4620 of the second flange 452 may be provided to face the level support 50. The second inclination surface 4620 of the second flange 452 may be provided to face the contact surface 52 of the level support 50. When the second flange 452 has the second inclination surface 4620, if the upward and downward adjustment module 40 is in the movable state MS, the second flange 452 may be prevented from being in contact with the contact surface 52. If the second flange 452 is not in contact with the contact surface 52, friction applied to the second flange 452 may be small. When friction applied to the second flange 452 is small, the user may easily adjust the level of the upward and downward adjustment module 40. However, contact of the second flange 452 and the contact surface 52 and friction applied to the second flange 452 are not limited to the above description. For example, even if the second flange 452 has a second inclination surface 4620, the second flange 452 may be in contact with at least one contact surface 52 of the first contact surface 521 and the second contact surface 522.

However, the configuration of the anti-separation member 45 described above may include a configuration preventing the level adjustment bearing 42 from being separated from the guide slit 51 in addition to the configuration of the first flange 451 and the second flange 452.

Figure 27:
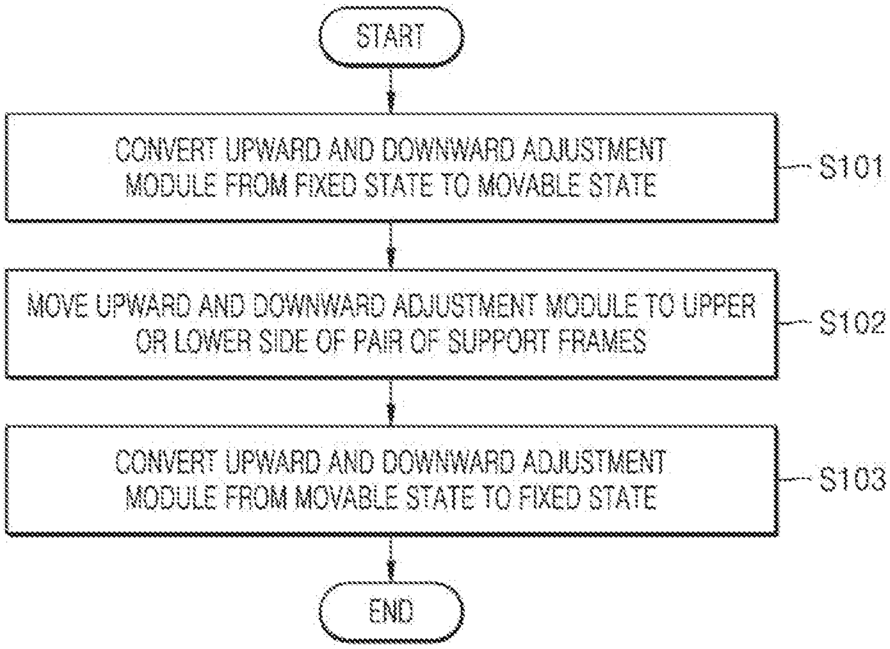
FIG. 27 is a diagram showing a method of adjusting a level of an upward and downward adjustment module in a stretching apparatus according to an embodiment.

FIG. 27 is a diagram showing a method of adjusting a level of the upward and downward adjustment module 40 in the stretching apparatus 1 according to an embodiment.

Referring to FIGS. 13A to 15B, 18A, 18B, and 27, the method of adjusting the level of the upward and downward adjustment module 40 may include converting the upward and downward adjustment module 40 from the fixed state FS to the movable state MS (S101).

Operation S101 of converting the upward and downward adjustment module 40 according to an embodiment from the fixed state FS to the movable state MS may include rotating the upward and downward adjustment module 40 around a certain rotation shaft. For example, operation S101 of converting the upward and downward adjustment module 40 from the fixed state FS to the movable state MS may include rotating the upward and downward adjustment module 40 around the first bearing 421. Operation S101 of converting the upward and downward adjustment module 40 from the fixed state FS to the movable state MS may include separating the locking protrusion 43 from the level adjustment groove 53. Operation S101 of converting the upward and downward adjustment module 40 from the fixed state FS to the movable state MS may include separating the locking protrusion 43 from the level adjustment groove 53 by rotating the upward and downward adjustment module 40 around the first bearing 421. Operation S101 of converting the upward and downward adjustment module 40 from the fixed state FS to the movable state MS may include separating the locking protrusion 43 supported on the level adjustment groove 53 from the level adjustment groove 53. Operation S101 of converting the upward and downward adjustment module 40 from the fixed state FS to the movable state MS may include applying a force upward to a front end of the upward and downward adjustment module 40. Operation S101 of converting the upward and downward adjustment module 40 from the fixed state FS to the movable state MS may include applying a force backward to the third handle 47 of the upward and downward adjustment module 40. Operation S101 of converting the upward and downward adjustment module 40 from the fixed state FS to the movable state MS may include rotating the upward and downward adjustment module 40 backward. However, operation S101 of converting the upward and downward adjustment module 40 from the fixed state FS to the movable state MS is not limited to the above description.

The method of adjusting the level of the upward and downward adjustment module 40 according to an embodiment may include moving the upward and downward adjustment module 40 to an upper side or a lower side of the pair of first support frames 111 (S102).

Operation S102 of moving the upward and downward adjustment module 40 according to an embodiment to the upper side or the lower side of the pair of first support frames 111 may include changing the level of the upward and downward adjustment module 40. Operation S102 of moving the upward and downward adjustment module 40 to the upper side or the lower side of the pair of first support frames 111 may include moving the stretching member 41 in the upward and downward directions Z between the level supports 50. Operation S102 of moving the upward and downward adjustment module 40 to the upper side or the lower side of the pair of first support frames 111 may include moving the level adjustment bearing 42 to the upper side or the lower side within the guide slit 51. Operation S102 of moving the upward and downward adjustment module 40 to the upper side or the lower side of the pair of first support frames 111 may include moving the first bearing 421 to the upper side or the lower side within the guide slit 51. However, operation S102 of moving the upward and downward adjustment module 40 to the upper side or the lower side of the pair of first support frames 111 is not limited to the above description.

The method of adjusting the level of the upward and downward adjustment module 40 according to an embodiment may include converting the upward and downward adjustment module 40 from the movable state MS to the fixed state FS (S103).

Operation S103 of converting the upward and downward adjustment module 40 according to an embodiment from the movable state MS to the fixed state FS may include rotating the upward and downward adjustment module 40 around a certain rotation shaft. For example, operation S103 of converting the upward and downward adjustment module 40 from the movable state MS to the fixed state FS may include rotating the upward and downward adjustment module 40 around the first bearing 421. Operation S103 of converting the upward and downward adjustment module 40 from the movable state MS to the fixed state FS may include locating the locking protrusion 43 on the level adjustment groove 53. Operation S103 of converting the upward and downward adjustment module 40 from the movable state MS to the fixed state FS may include locating the locking protrusion 43 on the level adjustment groove 53 by rotating the upward and downward adjustment module 40 around the first bearing 421. Operation S103 of converting the upward and downward adjustment module 40 from the movable state MS to the fixed state FS may include accommodating the locking protrusion 43 in the level adjustment groove 53. Operation S103 of converting the upward and downward adjustment module 40 from the movable state MS to the fixed state FS may include supporting the locking protrusion 43 by the level adjustment groove 53. Operation S103 of converting the upward and downward adjustment module 40 from the movable state MS to the fixed state FS may include rotating the upward and downward adjustment module 40 forward. Operation S103 of converting the upward and downward adjustment module 40 from the movable state MS to the fixed state FS may include removing a force applied to the upward and downward adjustment module 40. However, operation S103 of converting the upward and downward adjustment module 40 from the movable state MS to the fixed state FS is not limited to the above description.

Hereinafter, an example of stretching using the stretching apparatus 1 will be described.

Figure 28:
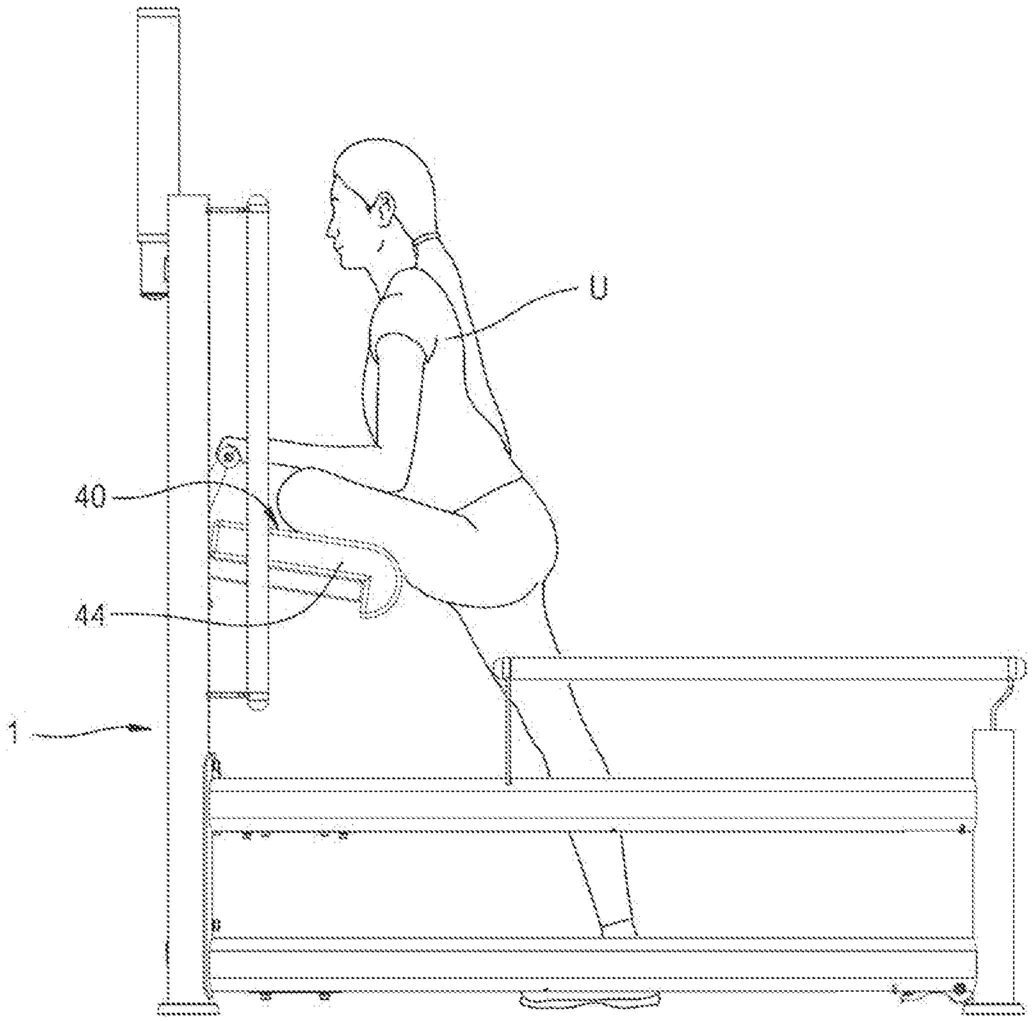
FIG. 28 is a diagram for explaining stretching using an upward and downward adjustment module.
Figure 29:
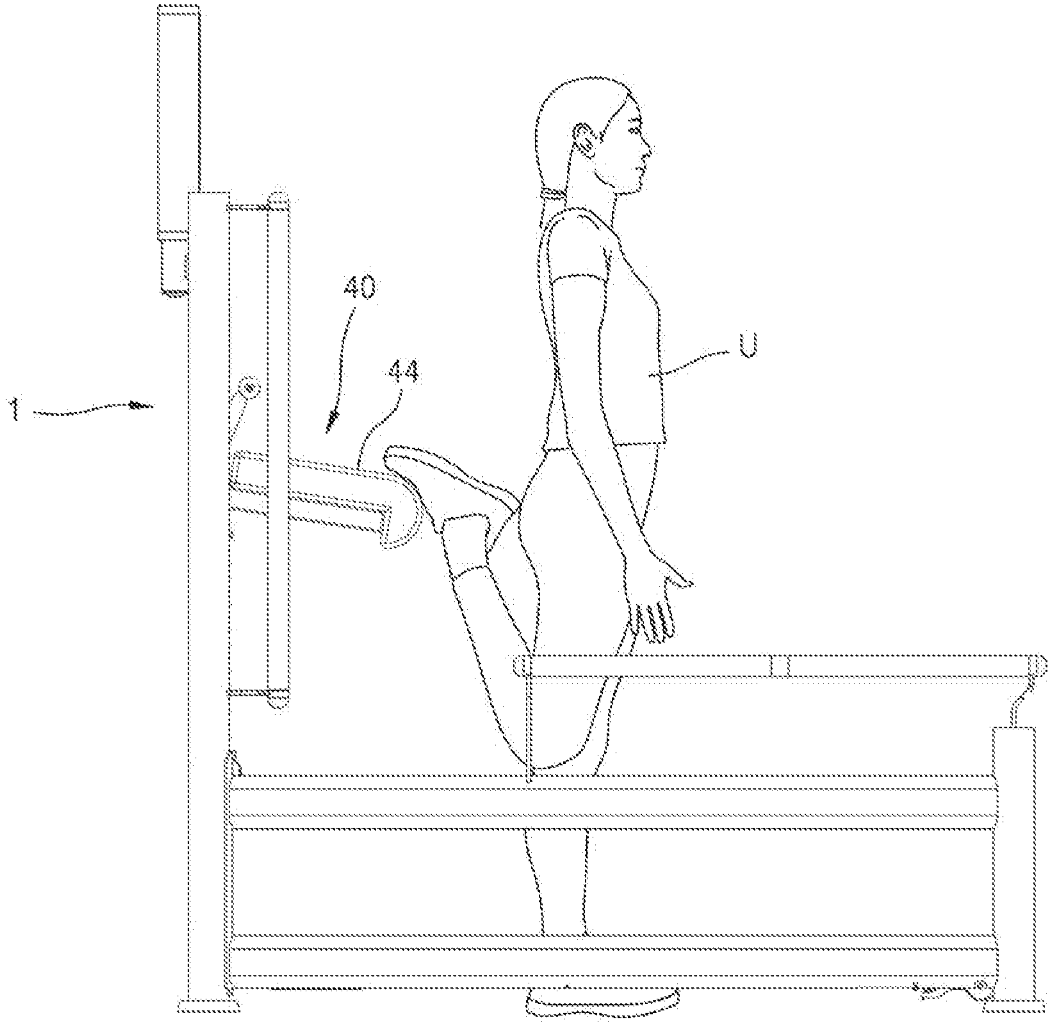
FIG. 29 is a diagram for explaining stretching using an upward and downward adjustment module.
Figure 30:
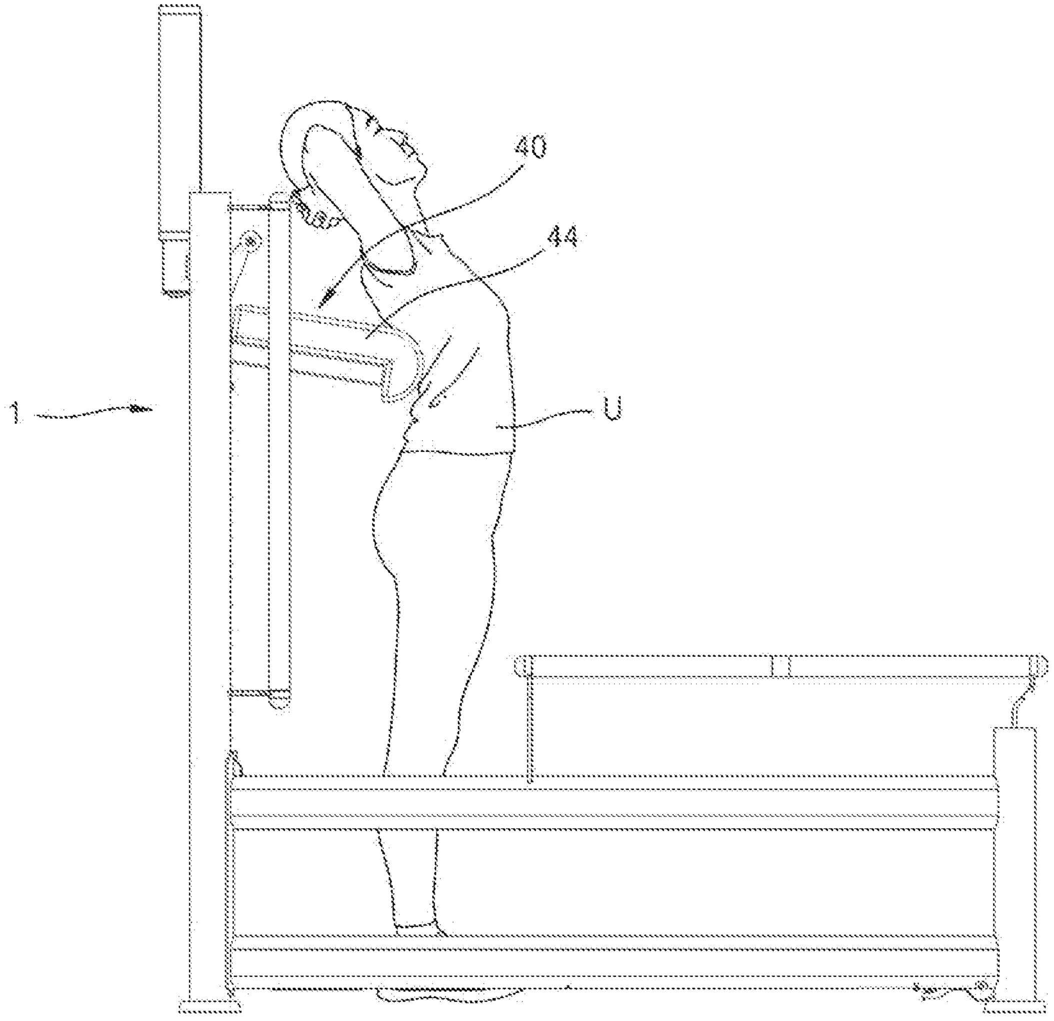
FIG. 30 is a diagram for explaining stretching using an upward and downward adjustment module.

FIG. 28 is a diagram for explaining stretching using the upward and downward adjustment module 40. FIG. 29 is a diagram for explaining stretching using the upward and downward adjustment module 40. FIG. 30 is a diagram for explaining stretching using the upward and downward adjustment module 40.

Referring to FIGS. 14A, 14B, and 27 to 30, a user may perform various stretching motions in a state in which a part of the lower body or the upper body is supported by the upward and downward adjustment module 40. For example, buttock stretching may be performed while the knee is bent and supported on the sheet pad 44 of the upward and downward adjustment module 40. For example, front thigh stretching may be performed with the back to the upward and downward adjustment module 40 and the toes supported on the sheet pad 44. For example, thoracic spine extension stretching or waist extension stretching may be performed by leaning the body in a state in which the back or waist is leaned against a front side of the sheet pad 44.

At this time, the user may adjust the level of the upward and downward adjustment module 40 in upward and downward directions depending on the purpose and the body type. The user may easily adjust the level of the upward and downward adjustment module 40 of the stretching apparatus 1 to fix the level of the upward and downward adjustment module 40.

Figure 31:
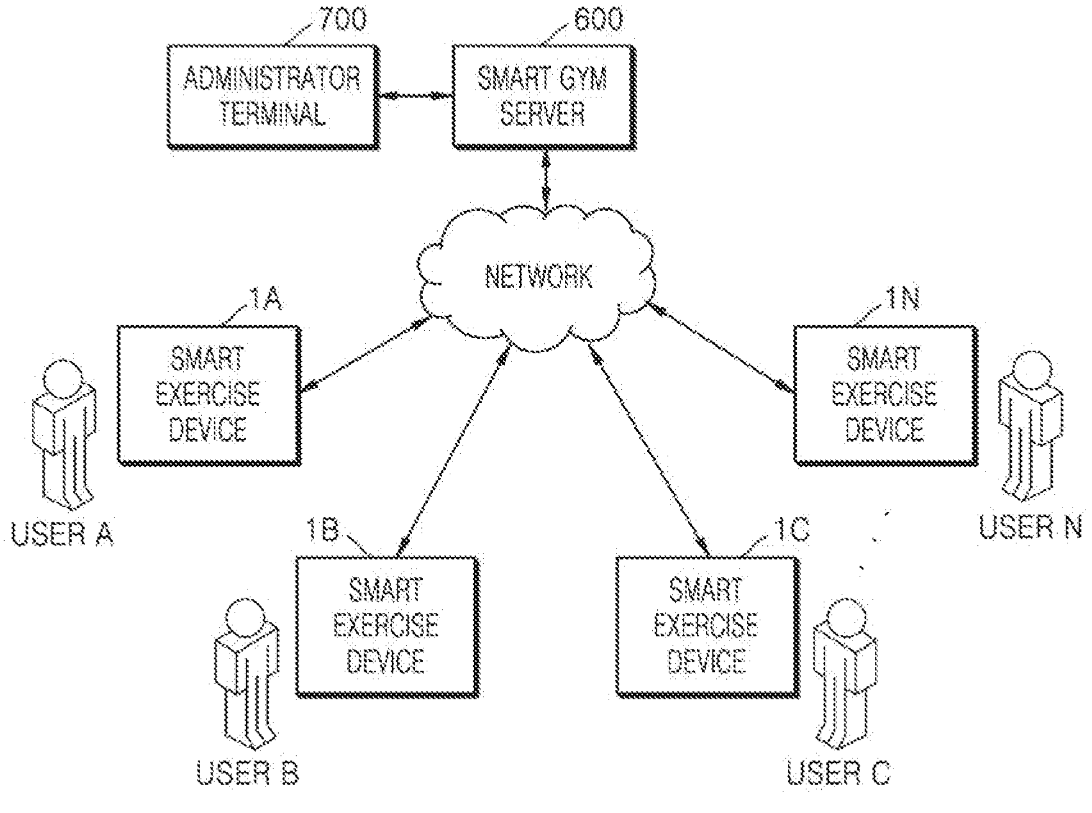
FIG. 31 is a diagram for explaining a smart gym environment in which a plurality of smart exercise devices are provided.

FIG. 31 is a diagram for explaining a smart gym environment in which a plurality of smart exercise devices are provided.

Referring to FIG. 31, a plurality of smart exercise devices 1A, 1B, 1C, and 1N are connected to a smart gym server 600 through a network. An administrator such as a trainer or a smart gym officer may access the smart gym server 600 through an administrator terminal 700.

Each of users USER A, USER B, USER C, and USER N who come to exercise on a smart gym may be identified using a wearable device or a terminal such as a smartphone when entering the smart gym and may then enter the smart gym. For example, a user may enter the smart gym after member verification by tagging a terminal on an unmanned terminal such as a kiosk at a smart gym entrance using a method of near field communication (NFC) or radio frequency identification (RFID). Information about the user who is verified may be transmitted to at least one of the smart exercise devices 1A, 1B, 1C, and 1N from the smart gym server 600 through a network. At least one of the smart exercise devices may be the stretching apparatus 1 according to the above-described embodiment.

When the user approaches any one of the smart exercise devices 1A, 1B, 1C, and 1N and tags a wearable device on the corresponding smart exercise device, the corresponding smart exercise device may automatically set an exercise program that is customized for the abilities and exercise performance history of the user based on information received from the smart gym server 600.

The smart gym server 600 may store user information of the plurality of users USER A, USER B, USER C, and USER N, device information of the smart exercise devices 1A, 1B, 1C, and 1N, and information used to operate facilities or smart gyms.

When an administrator such as a trainer registers an exercise program customized for the user in the administrator terminal 700, exercise process information stored in the smart gym server 600 may be updated. The smart exercise devices 1A, 1B, 1C, and 1N may receive the exercise process information from the smart gym server 600 connected through the network.

In the above-described embodiment, one of the smart exercise devices 1A, 1B, 1C, and 1N is exemplified as a stretching apparatus but is not limited thereto, and any exercise device for exercise may be applied in various ways.

In a stretching apparatus including a stretching member with an adjustable level according to an embodiment, the level of the stretching member may be adjusted depending on individual physical characteristics and exercise goals in a sports center, a gym, or the like, thereby improving space utilization.

An embodiment may be implemented in the form of a computer program to be executed through various components on a computer, and such a computer program may be recorded in a computer readable storage medium.

The above-described stretching apparatus may be implemented in the form of a computer readable storage medium including at least one program storing instructions executable by a processor. The computer is a device that calls a stored instruction from the storage medium and performs an operation as the disclosed example according to the called instruction and may include the stretching apparatus as the disclosed example. Examples of the computer readable storage medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. The storage medium may include an intangible medium implemented in a form to be transmitted over a network and, for example, may be implemented in the form of software or applications to be transmitted and distributed over the network.

The computer program may be specially designed and configured for the disclosure or be known to those skilled in the art of computer software. Examples of the computer program include a machine language code created by a compiler and a high-level language code executable by a computer using an interpreter and the like.

The disclosure has been particularly shown and described with reference to embodiments thereof. It will be understood by those skilled in the art that various changes in form and details may be made therein without departing from the spirit and scope of the disclosure. Therefore, the embodiments need to be considered in descriptive sense only and not for purposes of limitation. The scope of the disclosure is defined not by the detailed description but by the appended claims, and all differences within the scope will be construed as being included in the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A stretching apparatus comprising:

a body frame including a pair of support frames extending in parallel in upward and downward directions at a certain interval and a connection frame connecting the pair of support frames;

an upward and downward adjustment module that is movable in the upward and downward directions to adjust a level thereof in the upward and downward directions between the pair of support frames and rotatable within a certain angle range based on the upward and downward directions; and a level support fixed to an inner side of each of the pair of support frames and configured to allow upward and downward movements of the upward and downward adjustment module or limit a downward movement of the upward and downward adjustment module depending on a rotation angle of the upward and downward adjustment module, wherein the upward and downward adjustment module has a fixed state in which the upward and downward adjustment module has a first rotation angle and a downward movement is limited by the level support, and a movable state in which an upward and downward adjustment has a second rotation angle different from the first rotation angle and is movable downward based on the level support, wherein the level support includes a guide slit extending in the upward and downward directions, and the upward and downward adjustment module includes:

a stretching member moving in the upward and downward directions and configured to be in contact with a part of a body of a user;

a first support member located at each of both ends of the stretching member to be inserted into the guide slit; and a second support member located at each of the both ends of the stretching member to be inserted into the guide slit and configured to rotate around the first support member as an axis within the guide slit when the upward and downward adjustment module rotates.

2. The stretching apparatus of claim 1, wherein the first support member comprises a first bearing, and wherein the second support member comprises a second bearing.

3. The stretching apparatus of claim 2, wherein one of the stretching member and the level support includes a locking protrusion supported in a locking manner and configured to fix a level of the upward and downward adjustment module, and another one of the stretching member and the level support includes a level adjustment groove configured to support the locking protrusion.

4. The stretching apparatus of claim 3, wherein the second bearing is located below the first bearing, and a diameter of the second bearing is less than a diameter of the first bearing.

5. The stretching apparatus of claim 4, wherein the guide slit includes a guide surface extending in the upward and downward directions, the guide surface includes a first guide surface and a second guide surface facing the first guide surface, and a distance between the first guide surface and the second guide surface is greater than the diameter of the first bearing.

6. The stretching apparatus of claim 5, wherein a movable range in which the upward and downward adjustment module is rotatable is defined based on rotation of the second bearing around the first bearing as an axis within the guide slit when the upward and downward adjustment module rotates.

7. The stretching apparatus of claim 6, wherein the movable range is defined by an angle between a straight line connecting an axis of the first bearing and an axis of the second bearing when the locking protrusion is fixed to the level adjustment groove and the first bearing is in contact with the first guide surface, and a straight line connecting the axis of the first bearing and the axis of the second bearing when the first bearing is in contact with the second guide surface and the second bearing is in contact with the first guide surface, and the movable range is about 1° to about 15°.

8. The stretching apparatus of claim 5, wherein the upward and downward adjustment module becomes in a movable state in which the upward and downward adjustment module is movable in the upward and downward directions when the first bearing is in contact with the second guide surface and the second bearing is in contact with the first guide surface, and becomes in the fixed state in which the upward and downward adjustment module is fixed when the first bearing is in contact with the first guide surface and the locking protrusion is fixed to the level adjustment groove.

9. The stretching apparatus of claim 8, wherein the first bearing has one side at which a first flange is provided to prevent the first bearing from being separated from the guide slit when the upward and downward adjustment module is in the movable state, and a diameter of the first flange is greater than a distance between the first guide surface and the second guide surface.

10. The stretching apparatus of claim 9, wherein the level support includes a contact surface located to face the upward and downward adjustment module, the contact surface includes a first contact surface connected to the first guide surface and a second contact surface connected to the second guide surface, and the level support includes a first inclination surface provided between the first contact surface and the first guide surface to prevent the first flange from being in contact with the first contact surface when the upward and downward adjustment module is in the movable state.

11. The stretching apparatus of claim 10, wherein the second bearing has one side at which a second flange is provided to prevent the second bearing from being separated from the guide slit when the upward and downward adjustment module is in the movable state, and a diameter of the second flange is greater than the distance between the first guide surface and the second guide surface.

12. The stretching apparatus of claim 11, wherein, to prevent the second flange from being in contact with the second contact surface when the upward and downward adjustment module is in the movable state, and the second flange has a second inclination surface in a direction away from the guide slit.

13. The stretching apparatus of claim 3, wherein the level adjustment groove includes a plurality of recesses configured to accommodate the locking protrusion, and each of the plurality of recesses is inclined downward.

14. A method of adjusting a level of an upward and downward adjustment module in upward and downward directions in a stretching apparatus including the upward and downward adjustment module that is movable in the upward and downward directions to adjust a level thereof in the upward and downward directions between a pair of support frames and rotatable within a certain angle range based on the upward and downward directions, and a level support having a guide slit accommodating a first support member located at each of both ends of the upward and downward adjustment module and a level adjustment groove configured to support a locking protrusion included in the upward and downward adjustment module, the method comprising:

converting the upward and downward adjustment module from a fixed state to a movable state by rotating the upward and downward adjustment module around the first support member to separate the locking protrusion from the level adjustment groove;

moving the upward and downward adjustment module to an upper side or a lower side of the pair of support frames by moving the first support member within the guide slit of the level support; and converting the upward and downward adjustment module from the movable state to the fixed state by rotating the upward and downward adjustment module around the first support member to locate the locking protrusion on the level adjustment groove.

* * * * *